United States Patent
Ishikawa et al.

[11] Patent Number: 5,854,888
[45] Date of Patent: Dec. 29, 1998

[54] APPARATUS FOR DECODING CODE DATA AND PRINTING PIXEL DATA IN PARALLEL

[75] Inventors: Yuji Ishikawa; Masao Kiguchi, both of Yokohama; Atsushi Ohtani; Nobuyuki Hirai, both of Tokyo; Takeshi Toyama, Yokohama, all of Japan

[73] Assignee: Canon Kabushiki Kaisha, Tokyo, Japan

[21] Appl. No.: 22,699

[22] Filed: Mar. 1, 1993

[30] Foreign Application Priority Data

Mar. 31, 1992 [JP] Japan .................................. 4-077363
May 21, 1992 [JP] Japan .................................. 4-128859

[51] Int. Cl.$^6$ .................................................. H04N 1/419
[52] U.S. Cl. ......................... 395/116; 358/427; 358/439; 358/444
[58] Field of Search ..................... 358/406, 412, 358/427, 486, 401, 404, 444, 261.4, 426, 439; 395/110, 115, 116; H04N 1/04, 1/419

[56] References Cited

U.S. PATENT DOCUMENTS

| | | | |
|---|---|---|---|
| 4,521,813 | 6/1985 | Yoshida et al. | 358/486 |
| 4,597,018 | 6/1986 | Sonobe et al. | 358/296 |
| 4,713,699 | 12/1987 | Nakamura et al. | 358/486 |
| 4,733,308 | 3/1988 | Nakamura et al. | 358/412 |
| 4,775,893 | 10/1988 | Ishikawa . | |
| 4,887,224 | 12/1989 | Okano et al. . | |
| 5,032,923 | 7/1991 | Kurtin et al. | 358/296 |
| 5,163,123 | 11/1992 | Kadono | 395/116 |
| 5,280,348 | 1/1994 | Honma et al. | 358/401 |
| 5,299,027 | 3/1994 | Nakamura et al. . | |
| 5,355,151 | 10/1994 | Yoshida et al. . | |

FOREIGN PATENT DOCUMENTS

| | | |
|---|---|---|
| 0201772 | 11/1986 | European Pat. Off. . |
| 0442201 | 8/1991 | European Pat. Off. . |
| 0443247 | 8/1991 | European Pat. Off. . |
| 0449529 | 10/1991 | European Pat. Off. . |
| 2635627 | 2/1990 | France . |
| 2648657 | 12/1990 | France . |
| 2654282 | 5/1991 | France . |
| 3137903 | 6/1982 | Germany . |
| 2184913 | 7/1987 | United Kingdom . |
| 2237669 | 5/1991 | United Kingdom . |

*Primary Examiner*—Kim Vu
*Attorney, Agent, or Firm*—Fitzpatrick, Cella, Harper & Scinto

[57] ABSTRACT

There is disclosed an image processing apparatus which decodes code data to generate pixel data and prints an image on the basis of the pixel data by using a page printer, such as a laser beam printer, which prints an image on sheets of paper.

14 Claims, 42 Drawing Sheets

3.85 ℓ/mm → 15.4 ℓ/mm 7.7 ℓ/mm → 15.4 ℓ/mm

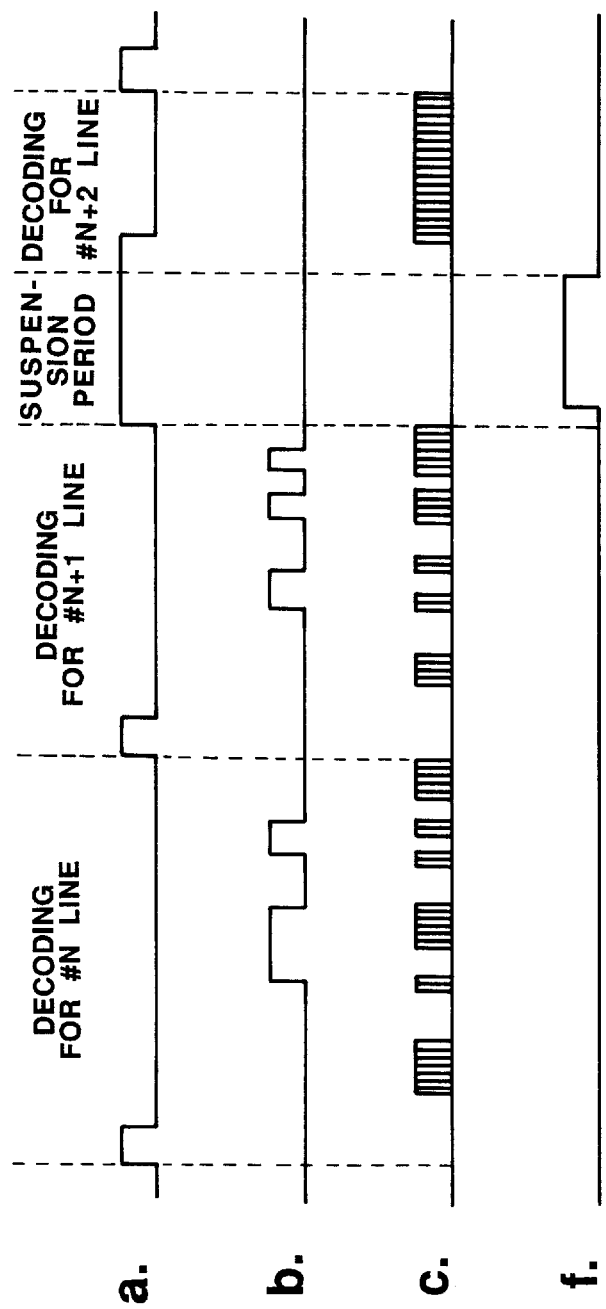

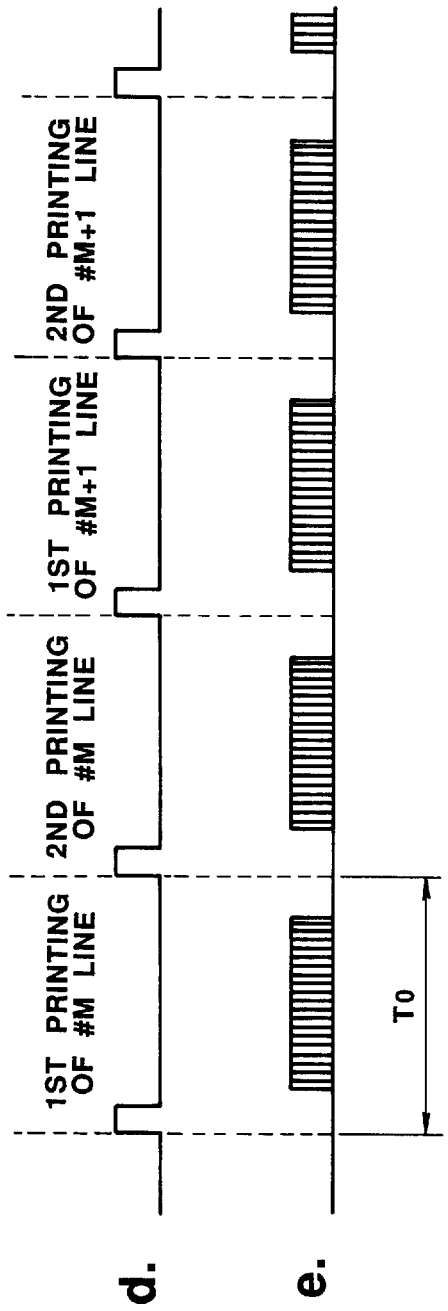

| | | |
|---|---|---|
| 401 — DECODER AREA | OPERATION STATE | ON |
| | LINE #0 | REF |
| | LINE #1 | CODE |
| | LINE #2 | OFF |
| | ⋮ | OFF |
| | LINE #N | ON |
| 402 — PRINTER AREA | OPERATION STATE | ON |
| | LINE #0 | ON |
| | LINE #1 | OFF |
| | LINE #2 | OFF |
| | ⋮ | OFF |
| | LINE #N | PRN |

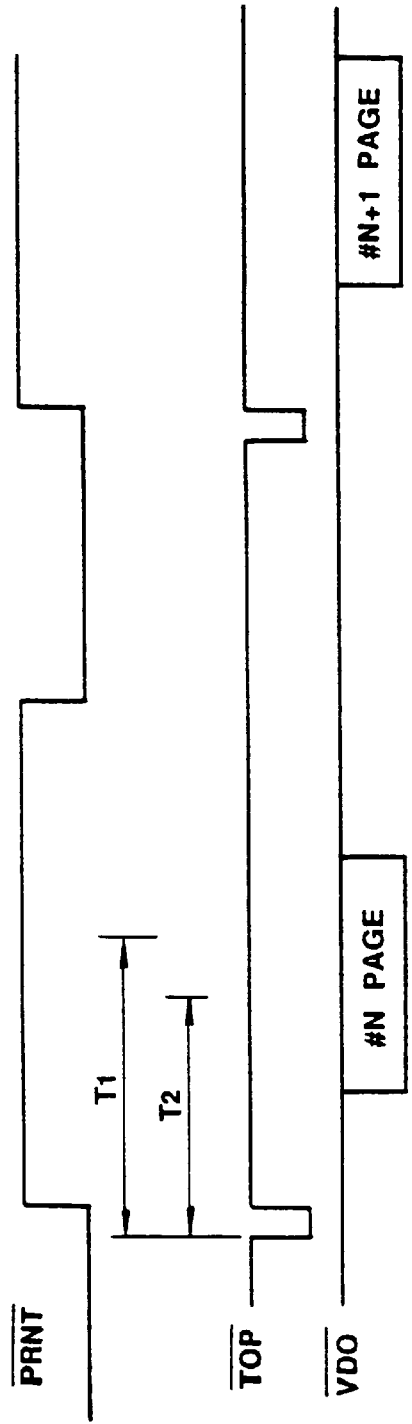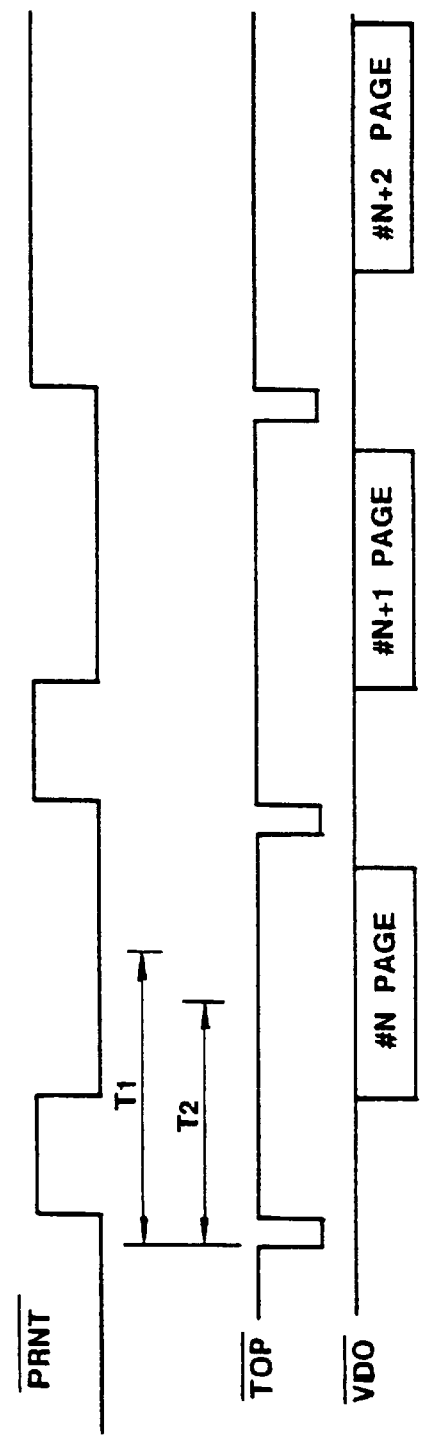

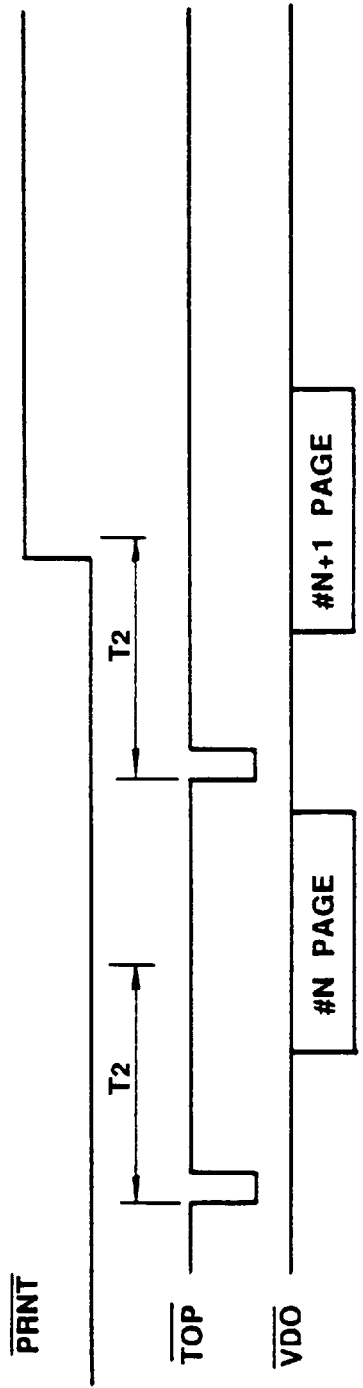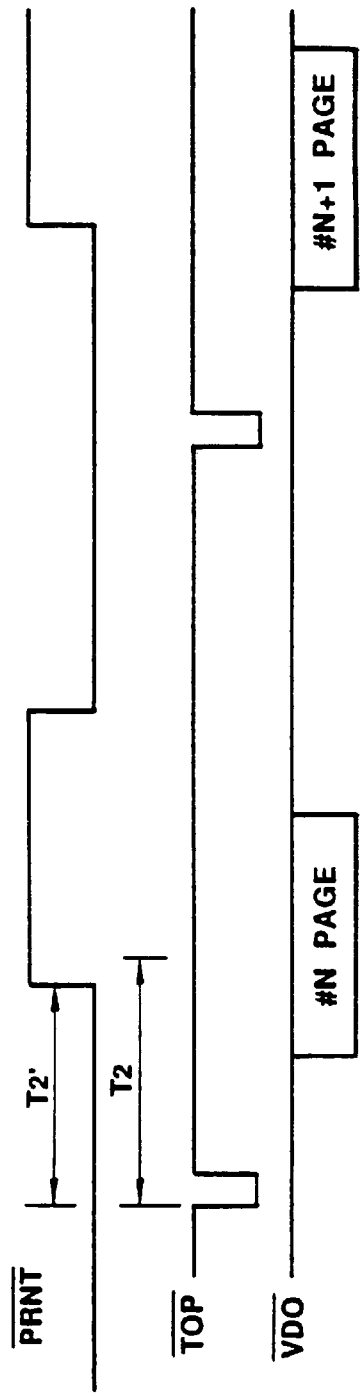

FIG.34

| | RECEPTION REFERENCE NUMBER | RECEPTION START TIME | | RECEPTION PAGE NUMBER | TOTAL PAGE NUMBER | PRINT PAGE NUMBER |
|---|---|---|---|---|---|---|
| 1-1 | RX1234 | 1992.01.23 | 12:23 | 01 | /02 | 01 |
| 1-2 | RX1234 | 1992.01.23 | 12:23 | 01 | /02 | 02 |
| 2 | RX1234 | 1992.01.23 | 12:23 | 02 | /02 | 03 |

APPARATUS FOR DECODING CODE DATA AND PRINTING PIXEL DATA IN PARALLEL

BACKGROUND OF THE INVENTION

This invention relates to an image processing apparatus, such as a facsimile apparatus which receives image data and prints an image on the basis of the received image data.

A facsimile apparatus, which comprises a page printer such as a laser beam printer (LBP) as a means for printing an image, is known.

Such a facsimile apparatus is provided with a page buffer, which stores a page of an image in the form of pixel data, between a decoder and a printer.

FIG. 1 is a flow diagram which shows reception operation in a general facsimile apparatus which is provided with a page printer.

The reception operation is composed of the following three processes.

(1) The code data which is received by a reception unit 31 is sequentially stored in an image memory 32. When at least a page of code data is stored in the image memory 32, the following process is initiated in parallel to the above process.

(2) The decoding unit 33 decodes the code data read out from the image memory 32 and stores pixel data in a page buffer 34. The decoding operation is repeatedly carried out until a page of pixel data is stored in the page buffer 34.

(3) When a page of pixel data is stored in the page buffer 34, the decoding unit 33 stops decoding. Then, the print controller 35 repeatedly reads out the pixel data in synchronism with the transport of a recording paper and the page printer 36 prints an image on the recording paper which is transported at a constant speed.

For printing an image on a large size of recording paper with high resolution, it is necessary to provide a page buffer having a large memory capacity.

For example, the amount of pixel data of the A4 size document is approximately 2M bit, though the resolution is minimum one in facsimile apparatus (8 pel/mm, 3.85 line/mm).

Furthermore, in cases where the width of the recording paper is B4 size or the resolution is fine one (7.7 line/mm), it is necessary to provide a page buffer having a large memory capacity which is more than 2M bit.

On the other hand, there is a following disadvantage in the facsimile apparatus having the page printer.

Namely, the printing operation for a page of an image cannot be interrupted in the page printer, accordingly the pixel data must be supplied to the page printer without interruption.

Therefore, if an error occurs in the received image and the pixel data cannot be supplied to the page printer, a complete printing operation cannot be done.

SUMMARY OF THE INVENTION

The present invention has been made in the light of the above problems and its object is to provide an image processing apparatus which can print an image on the basis of code data by using a page printer.

The present invention also provides an image processing apparatus which can print an image without providing page buffer which stores a page of pixel data obtained by decoding code data.

The present invention also provides an image processing apparatus which can print not only document image but also character image by a common process.

The present invention also provides an image processing apparatus which can print a plurality of pages of image at a high speed.

According to a first aspect of the present invention, there is provided an image processing apparatus, comprising decoding means for decoding code data to generate pixel data, memory means for storing a plurality of lines of the pixel data from said decoding means, and printing means for printing an image at a constant speed on the basis of the pixel data read out from said memory means, wherein said decoding means decodes the code data so that said memory means keeps valid pixel data while said printing means is printing a page of an image.

According to a second aspect of the present invention, there is provided an image processing apparatus, comprising code memory means for storing code data to be printed, decoding means for decoding the code data read out from said code memory means to generate pixel data, pixel memory means for storing a plurality of lines of pixel data from said decoding means, and printing means for printing an image at a constant speed on the basis of the pixel data read out from said pixel memory means, wherein said code memory means stores not only code data representing a document image but also code data representing a character image.

According to a third aspect of the present invention, there is provided an image processing apparatus, comprising decoding means for decoding code data to generate pixel data, memory means for storing a plurality of lines of pixel data from said decoding means, and printing means for printing an image at a constant speed on the basis of the pixel data read out from said memory means, wherein said printing means starts the printing operation in accordance with the state of code data to be decoded by said decoding means.

The above and other aspects, features and advantages of the present invention will become apparent from the following detailed description of the preferred embodiment.

BRIEF DESCRIPTION OF THE DRAWINGS

FIG. 5 is a timing chart which shows the communication between a decoder and a buffer controller;

FIG. 6 is a timing chart which shows the communication between a buffer controller and a print controller;

FIGS. 22(A) and 22(B) are timing charts which shows a time relation between PRNT signal, TOP signal and VDO signal;

FIG. 24 is a timing chart which shows a time relation between PRNT signal, TOP signal and VDO signal;

FIG. 34 is a drawing which shows examples of a footnote image;

DESCRIPTION OF THE PREFERRED EMBODIMENT

Preferred embodiments of the present invention will now be described in detail by reference to the drawings.

Figure 1:
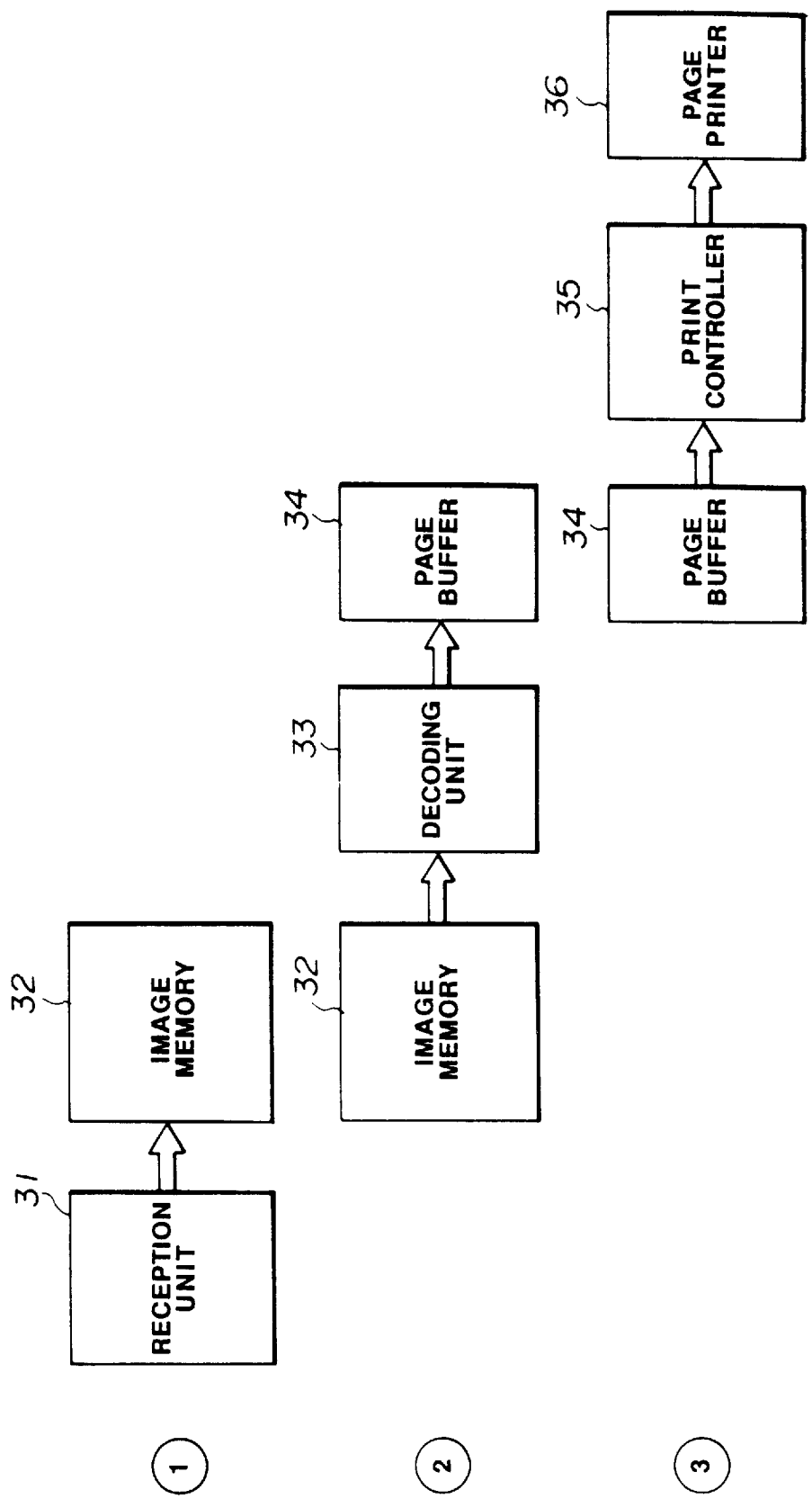
FIG. 1 is a flow diagram which shows a reception operation in a general facsimile apparatus.
Figure 2:
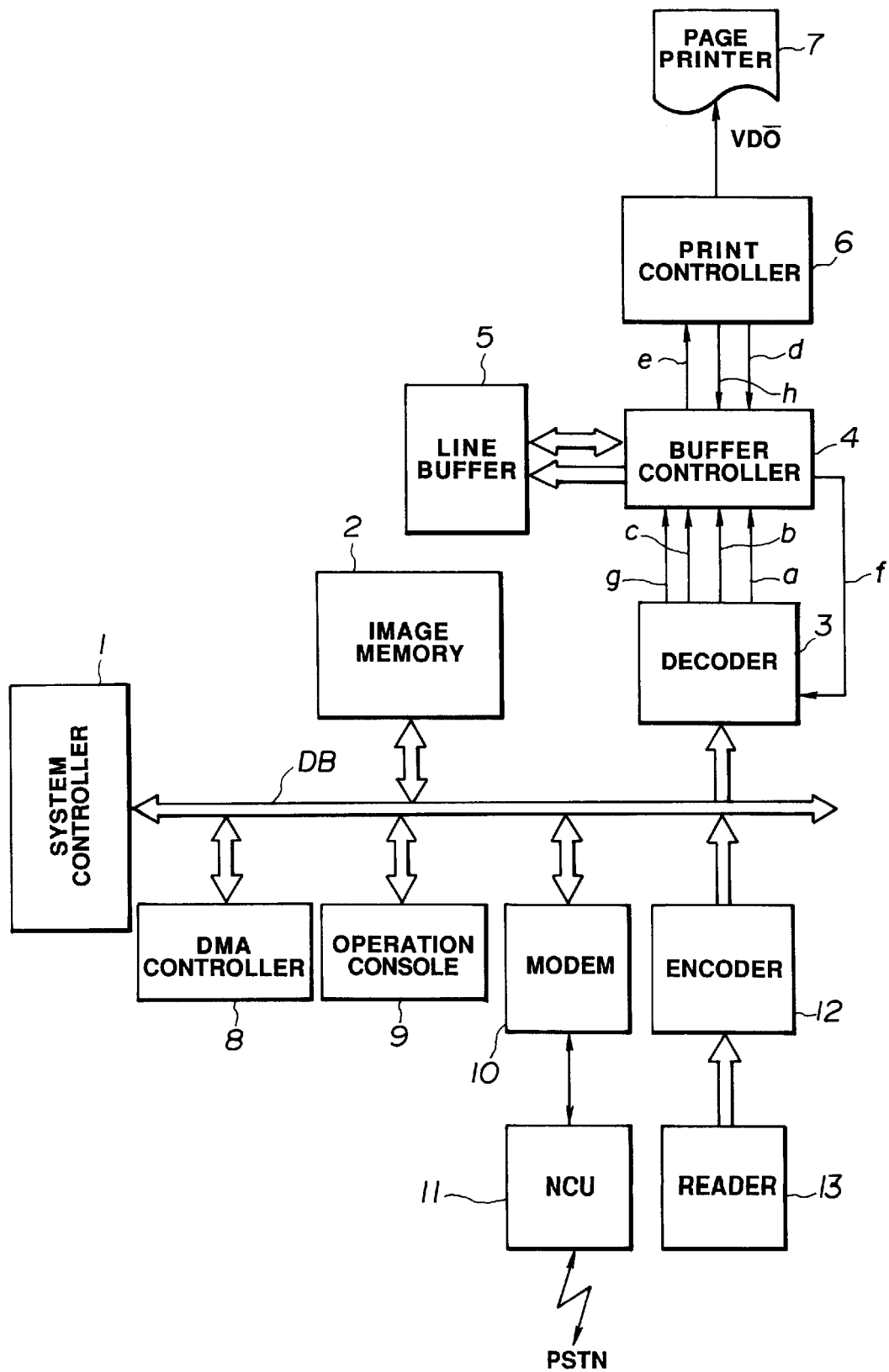
FIG. 2 is a block diagram which shows the structure of a facsimile apparatus to which the present invention may be applied.

FIG. 2 is a block diagram which shows the structure of a facsimile apparatus to which the present invention may be applied.

In the drawing, a system controller 1 controls the operation of the facsimile apparatus via a data bus. An image memory 2 has a large capacity so as to store dozens of pages of image data in the form of compressed and encoded data. A decoder 3 decodes the compressed and encoded data (code data) and converts it to pixel data representing an original image. A buffer controller 4 conducts the storage operation which receives the pixel data from the decoder 3 and stores it in a given address of a line buffer 5 and the output operation which outputs the pixel data to a print controller 6 in a predetermined order. The line buffer 5 has a sufficient capacity to store a plurality of lines of pixel data.

The print controller 6 receives the pixel data from the line buffer 5 in a constant cycle and controls the printing operation by a page printer 7 which prints an image at a constant speed. The page printer 7 comprises a laser beam printer (LBP) and prints an image on a recording paper being transported at a constant speed. A DMA controller 8 transfers the code data stored in the image memory 2 to the decoder 3 by means of the direct memory access (DMA) transfer.

An operation console 9 is composed of various instruction buttons, displays and so on. A MODEM 10 is composed of a modulator and a demodulator. A network control unit (NCU) 11 controls the connection to the public switched telephone network (PSTN) 120. An encoder 12 encodes pixel data to be transmitted. A reader 13 photoelectrically reads an image of an original document.

In FIG. 2, signal (a) is line start signal which is outputted whenever the decoder 3 initiates the decoding operation for each line. Signal (b) is pixel signal which is obtained by the decoding operation. Signal (c) is clock signal which is outputted in synchronism with the pixel signal. Signal (d) is line synchronization signal which indicates the start timing of the print operation for each line. Signal (e) is pixel signal (pixel data) for printing an image which is outputted in synchronism with the line synchronization signal. Signal (f) is buffer full signal (wait signal) which indicates that the line buffer 5 does not have enough space to store further pixel data. Signal (g) is page start signal which indicates the start timing of the decoding operation for each page. Signal (h) is sub-scanning synchronization signal which indicates the start timing of the print operation for each page.

Figure 3:
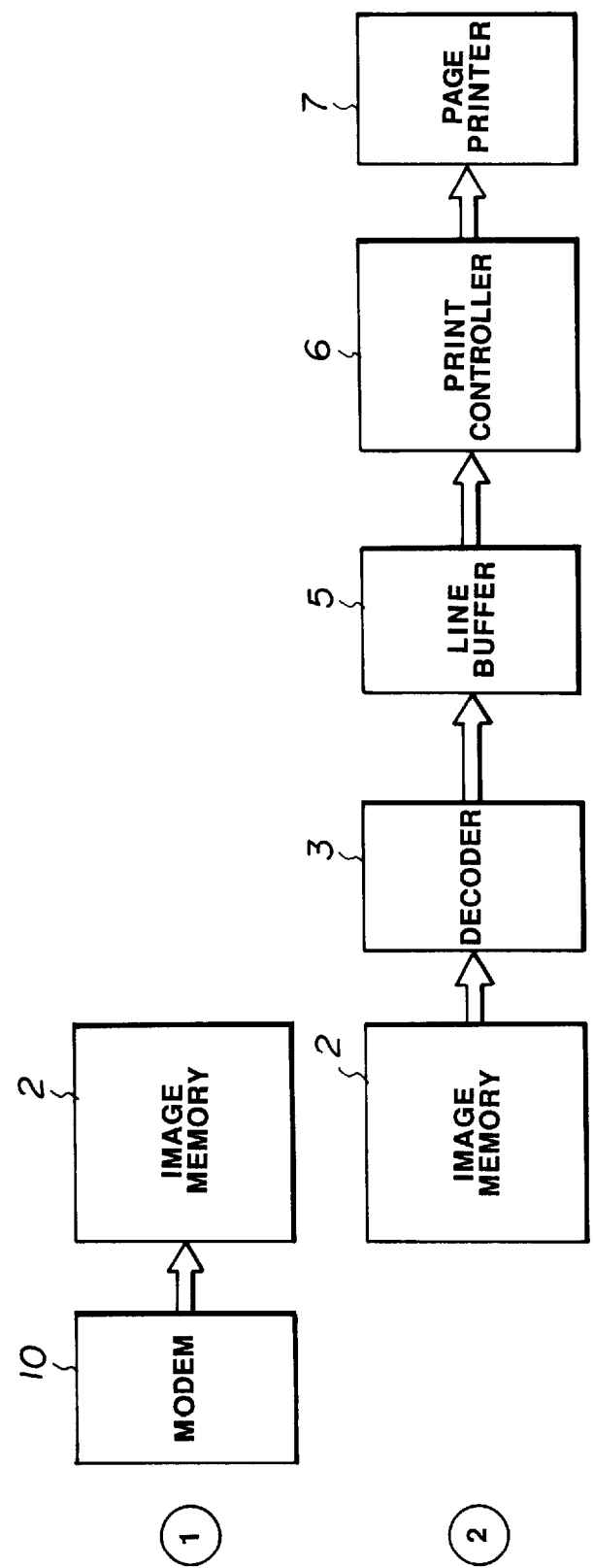
FIG. 3 is a flow diagram which shows a reception operation in the facsimile apparatus shown in FIG. 2.

FIG. 3 is a flow diagram which shows each process from the data reception to the print operation.

(1) The code data which is received by the MODEM 10 is sequentially stored in the image memory 2. When at least a page of code data is stored in the image memory 2, the following process is initiated in parallel to the above storage process.

(2) The decoder 3 decodes the code data read out from the image memory 2 and stores the pixel data in the line buffer 5. When a predetermined number of lines of pixel data is stored in the line buffer 5, the print controller 6 sequentially reads out the pixel data from the line buffer 5 and makes the page printer 7 print a page of an image. In this case, if the time necessary for decoding a line of code data is always shorter than the time necessary for printing a line of an image, effective code data can always exist in the line buffer 5.

FIG. 4 shows arrangements of dots printed by the page printer whose print resolution in the sub-scanning direction is 15.4 line/mm. In FIG. 4 (A) shows the arrangement of dots in case where the resolution of an original image is 3.85 line/mm and (B) shows that in case where the resolution of an original image is 7.7 line/mm.

Figure 4A:
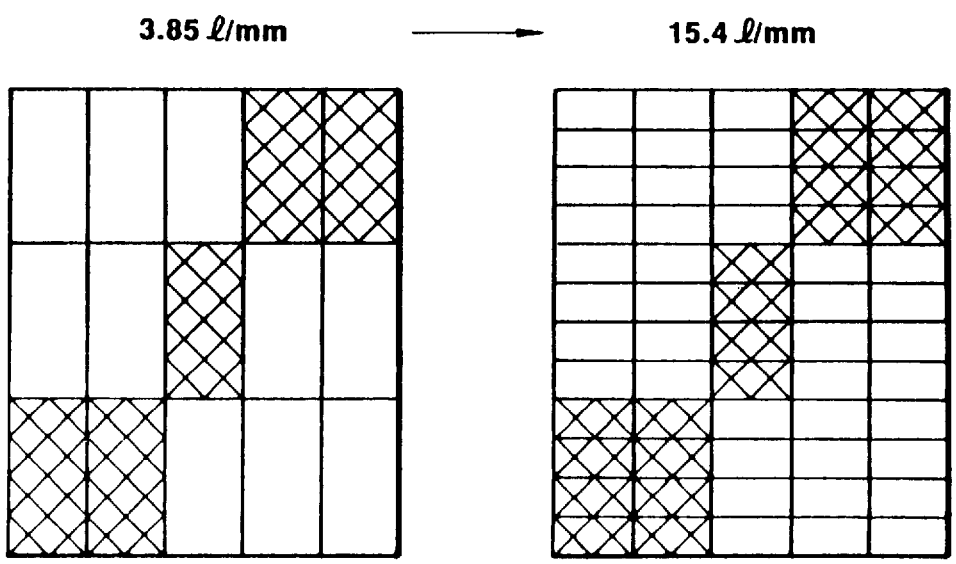
FIG. 4 is a drawing which shows arrangements of dots printed by a page printer.

In FIG. 4(A), in case where a line of the original image, whose resolution in the sub-scanning direction is 3.85 line/mm, is printed, the same line of the original image is repeatedly printed four times by the page printer whose print resolution is 15.4 line/mm.

Accordingly, a line of pixel data stored in the line buffer 5, which is obtained by the decoder 3, is repeatedly read out four times by the print controller 6, therefore a line of the original image represented by the read out pixel data is repeatedly printed four times.

Figure 4B:
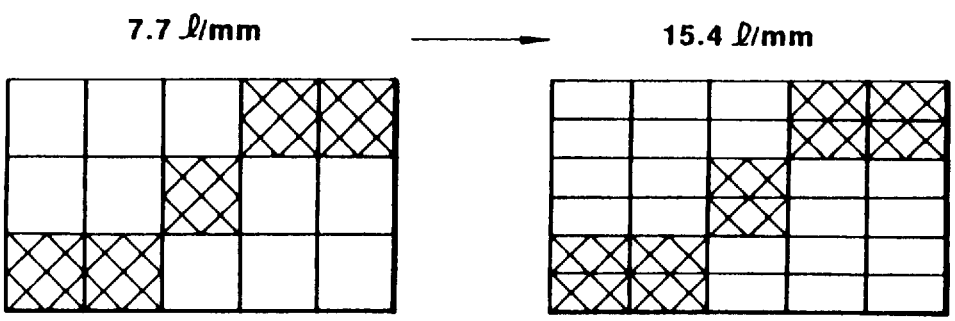

On the other hand, in case where a line of the original image, whose resolution in the sub-scanning direction is 7.7 line/mm, is printed, the same line of the original image is repeatedly printed twice as shown in FIG. 4(B).

Generally, it takes approximately 2 msec to print a line of an image by LBP, so in case where the original image, whose resolution in the sub-scanning direction is 7.7 line/mm, is printed, the decoding operation for a line may be completed in approximately 4 msec. The decoder which can carry out the decoding operation under the above condition can be made by means of a wired logic construction.

FIG. 5 is a timing chart which shows the communication between the decoder 3 and the buffer controller 4 shown in FIG. 2.

First, the decoder 3 informs the buffer controller 4 of the initiation of the decoding operation for a new line by using the signal (a). The buffer controller 4 changes the address for writing the pixel data in the line buffer 5 in response to the signal (a). In this time, if the line buffer does not have enough space to store further line of pixel data, the buffer controller 4 makes the decoder 3 suspend the outputting of the pixel data by using the signal (f).

The decoder 3 outputs the pixel data obtained by the decoding operation as signal (b) and outputs the sampling clock as the signal (c). The signal (c), the pixel data, is obtained by decoding the code data one by one, so that the decoder 3 outputs the signal (c) intermittently.

In the same way, the decoding operations for #n line, #n+1 line, #n+2 line etc. are sequentially carried out until all lines of a page are decoded.

FIG. 6 is a timing chart which shows the communication between the buffer controller 4 and the print controller 6 shown in FIG. 2.

The print controller 6 outputs the signal (d) which indicates the start timing of the print operation for each line at a constant interval. The buffer controller 4 sequentially reads out the pixel data from the line buffer 5 in synchronism with the signal (d) and outputs it as the signal (e). The buffer controller 4 repeatedly reads out the same line of pixel data a plurality of times in response to the given resolution in the sub-scanning direction of the print image as shown in FIG. 4. FIG. 6 shows the case where the original image, whose resolution is 7.7 line/mm is printed by the page printer whose print resolution is 15.4 line/mm.

Figure 7:
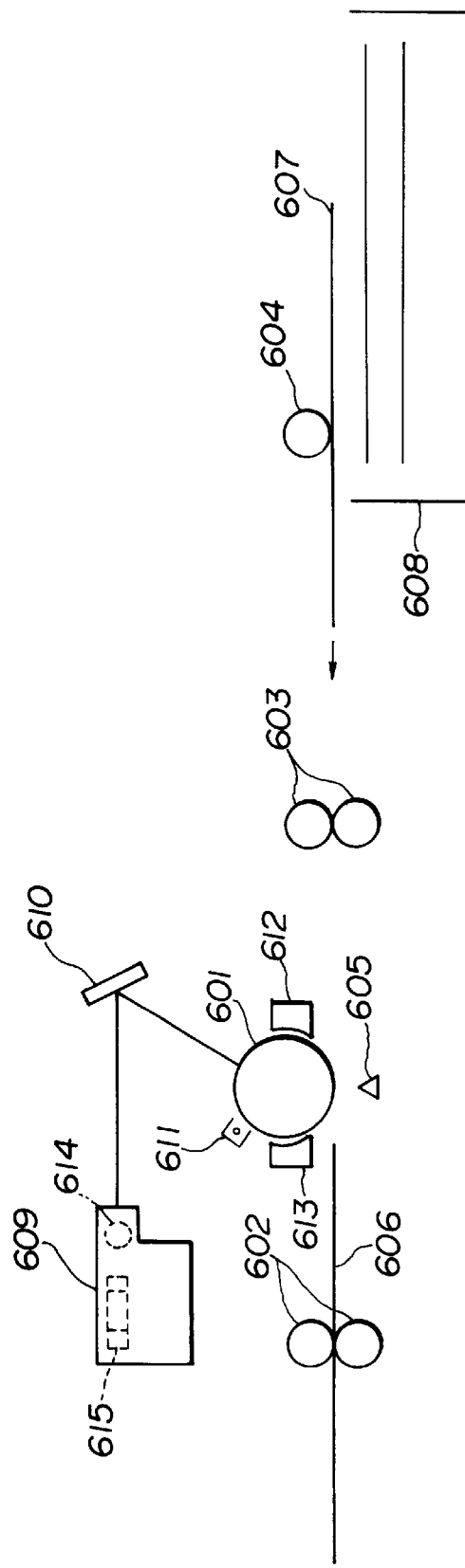
FIG. 7 is a drawing which shows a structure of LBP.

FIG. 7 shows a structure of the LBP which is included in the page printer 7.

A laser scanner unit 609 turns on and off the laser beam in accordance with laser drive signal formed on the basis of the pixel signal and the laser beam is reflected off by an internal polyhedral mirror 615 which rotates at a constant speed. The laser beam from the laser scanner unit 609 exposes a photosensitive drum 601 via a fixed mirror 610. The photosensitive drum 601 is rotated at a constant speed which synchronizes with the scanning speed of the laser beam and is repeatedly scanned by the laser beam.

The photosensitive drum 601 has been uniformly charged by a discharging unit 611, so the electrostatic latent image corresponding to the pixel signal is formed on the photosensitive drum 601 by scanning the laser beam. The latent image on the photosensitive drum 601 is developed by a developing unit 612 with a toner.

A feed roller 604 transports a recording paper 607 from a feed cassette 608 to a registration roller 603. The registration roller 603 feeds the recording paper 607 so that the leading edge of the recording paper 607 matches the leading edge of the image formed on the photosensitive drum 601. A transfer unit 605 transfers the toner image to the recording paper and a fixing roller 602 fixes the toner image on the recording paper. Then, the recording paper is discharged to the external of the LBP. The surface of the photosensitive drum 601 is cleaned by the cleaning unit 613 before the next printing cycle begins.

In the laser scanner unit 609, a beam detector 614 is provided for detecting that the laser beam arrives at the photosensitive drum 601. The output of the beam detector 614 is used as a line synchronization signal (BD) which indicates the starting timing of each scan of the laser beam.

In the aforementioned LBP, the print speed cannot be varied during the printing operation of a page and the printing operation of a page cannot be interrupted/restarted.

Accordingly, after the initiation of the printing operation, pixel data must be supplied to the LBP in synchronism with the scanning operation of the laser beam without suspension.

Figure 8:
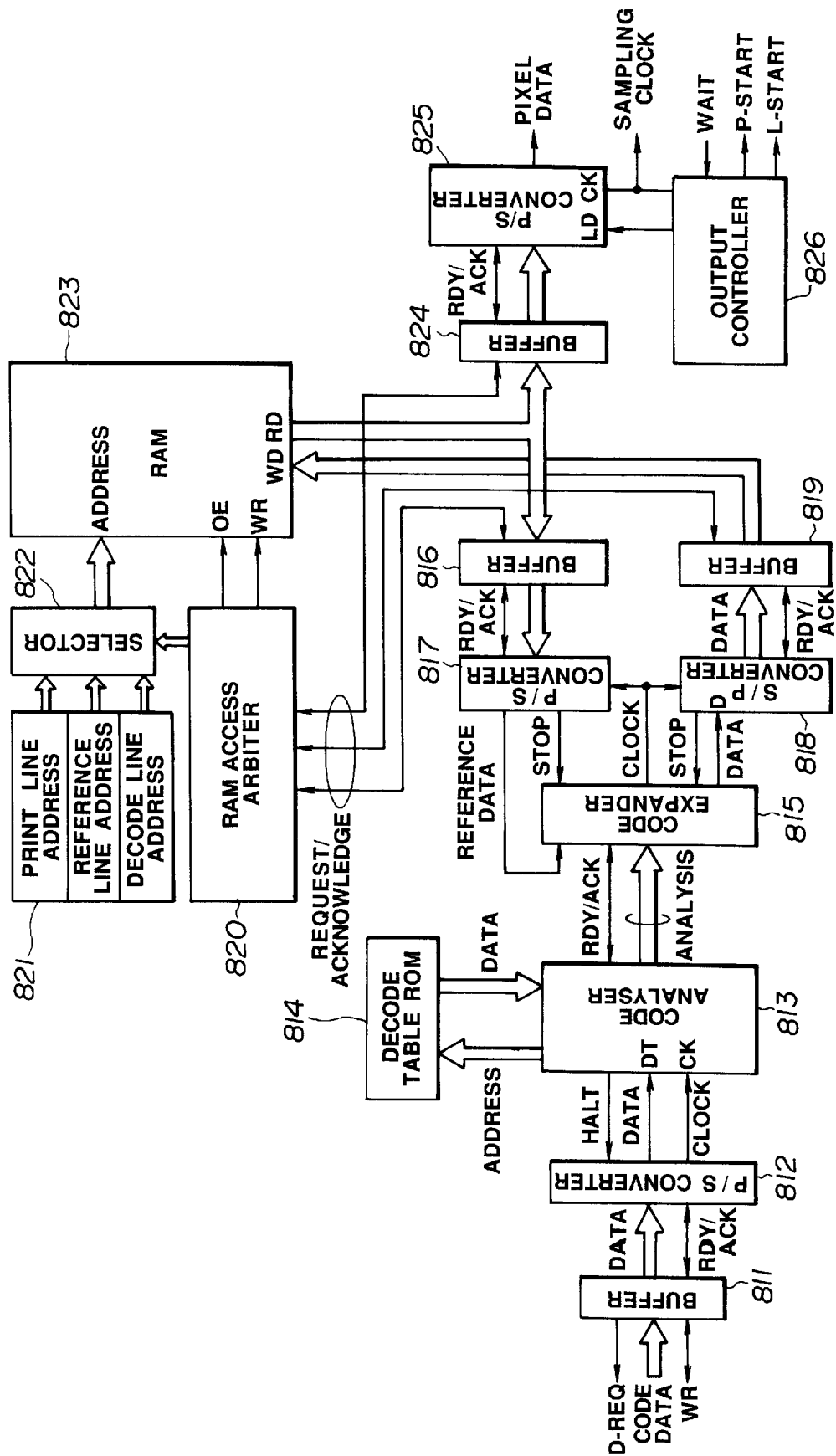
FIG. 8 is a drawing which shows a construction of a decoder.

FIG. 8 shows a construction of the decoder 3.

A buffer 811 outputs a data request signal (D-REQ) when it becomes empty. According to the D-REQ signal, the code data is read out from the image memory 2 and supplied to the buffer 811 via a data bus. When the code data is written in the buffer 811, the buffer 811 outputs a RDY signal to a parallel/serial (P/S) converter 812.

The P/S converter 812 receives the code data from the buffer 811 in response to the RDY signal and converts the parallel code data into serial data. The serial data is supplied to a code analyser 813 together with data clock. The P/S converter 812 suspends the output of the serial data when the suspension request signal (HALT) is inputted from the code analyser 813.

The code analyser 813 analyses the serial data from the P/S converter 812 with reference to a decode table ROM 814. Whenever the analysing of the code data is completed, the code analyser 813 outputs a signal representing the coding mode, such as vertical mode, pass mode or horizontal mode, to a code expander 815 together with a RDY signal. The code analyser 813 holds its state until a restart signal ACK is inputted from the code expander 815. At the same time, the code analyser 813 outputs the HALT signal to the P/S converter 812 so as to suspend the operation of the P/S converter 812.

The code expander 815 initiates its operation in response to the RDY signal from the code analyser 813 and generates the pixel data of the decode line on the basis of the analysis by the code analyser 813 with reference to the pixel data of the reference line from a P/S converter 817. The pixel data is output to a serial/parallel (S/P) converter 818.

Whenever the expansion of the code data is completed, the code expander 815 outputs the ACK signal to the code analyser 813 so as to restart the code analyser 813. Decode error is detected by counting the number of pixels of the decode line and determining that the count value is equal to a predetermined number of pixels included in a line.

Whenever the predetermined number of bits of pixel data are inputted, the S/P converter 818 converts the serial pixel data into parallel pixel data and outputs the parallel pixel data to a buffer 819 together with a RDY signal. The S/P converter 818 also outputs a STOP signal to the code expander 815 so as to suspend the operation of the code expander 815.

The buffer 819 outputs a RAM access request to a RAM access arbiter 820 when the buffer 819 receives the parallel pixel data. If the reading out of the pixel data of the reference line from a RAM 823 and the reading out of the pixel data of the print line from the RAM 823 are not being carried out, the RAM access arbiter 820 determines that the pixel data of the decode line can be written into the RAM 823 and outputs an acknowledge signal to the buffer 819.

At the same time, the RAM access arbiter 820 converts the RAM 823 to the write mode and causes a selector 822 to select the decode line address in an address manager 821. Therefore, the pixel data held in the buffer 819 is written into the RAM 823.

The buffer 819 outputs the ACK signal to the S/P converter 818 in response to the ACK signal from the RAM access arbiter 820. Accordingly, the S/P converter 818 stops the output of the STOP signal to the code expander 815 so as to restart the code expander 815.

As explained above, the code data read out from the image memory 2 is decoded to the pixel data and the pixel data is sequentially written in the RAM 823. In case where the code data has been obtained by the two-dimension encoding method, such as MR or MMR, the pixel data written in the RAM 823 is used as the pixel data of the reference line which is referred to expand the code data.

Namely, the pixel data of the reference line, which is used to expand the code data by the code expander 815, is read out from the RAM 823 and thus read out pixel data is supplied to the code expander 815 via a buffer 816 and the P/S converter 817.

The buffer 816 outputs a RAM access request to the RAM access arbiter 820 when it becomes empty. If the writing of the pixel data of the decode line into the RAM 823 and the reading out of the pixel data of the print line from the RAM 823 are not being carried out, the RAM access arbiter 820 determines that the pixel data of the reference line can be read out from the RAM 823 and outputs an acknowledge signal to the buffer 816.

At the same time, the RAM access arbiter 820 converts the RAM 823 to the read mode and causes the selector 822 to select the reference line address in the address manager 821. Therefore, the pixel data of the reference line is read out from the RAM 823 and written into the buffer 816.

The buffer 816 outputs the RDY signal to the P/S converter 817 when the pixel data is written into the buffer 816. The P/S converter 817 converts the pixel data from the buffer 816 into serial pixel data. The serial pixel data is supplied to the code expander 815 in synchronism with a clock signal from the code expander 815.

Whenever the supplying of the pixel data to the code expander 815 is completed, the P/S converter 817 outputs the STOP signal to the code expander 815 so as to suspend the operation of the code expander 815.

The pixel data written in the RAM 823 is also supplied to the buffer controller 4 via a buffer 824 and a P/S converter 825 and used as the pixel data of the print line.

The output of the pixel data of the print line is controlled by an output controller 826 which communicates with the buffer controller 4.

The output controller 826 outputs to the buffer controller 4 a line start signal (L-START) which indicates the initiation of the outputting of the pixel data. At this time, if a wait signal (WAIT) is not inputted from the buffer controller 4, the output controller 826 supplies a sampling clock to the P/S converter 825 so as to output the pixel data to the buffer controller 4.

The buffer 824 outputs a RAM access request to the RAM access arbiter 820 when it becomes empty. If the writing of the pixel data of the decode line into the RAM 823 and the reading out of the pixel data of the reference line from the RAM 823 are not being carried out, the RAM access arbiter 820 determines that the pixel data of the print line can be read out from the RAM 823 and outputs an acknowledge signal to the buffer 824.

At the same time, the RAM access arbiter 820 converts the RAM 823 to the read mode and causes the selector 822 to select the print line address in the address manager 821. Therefore, the pixel data of the print line is read out from the RAM 823 and written into the buffer 824.

The buffer 824 outputs the RDY signal to the P/S converter 825 when the pixel data is written in the buffer 824. The P/S converter 825 converts the pixel data from the buffer 824 into serial pixel data. The serial pixel data is supplied to the buffer controller 4 in synchronism with the sampling clock from the output controller 826.

However, in the case when the WAIT signal is input from the buffer controller 4, the output controller 826 suspends the output of the sampling clock so as to suspend the supply of the pixel data to the buffer controller 4.

As explained above, the decoder 3 can intermittently decode the code data stored in the image memory 2 at a high speed.

Accordingly, by decoding the code data intermittently in accordance with the WAIT signal from the buffer controller 4 which indicates that the line buffer 5 does not have enough space to store further pixel data, the line buffer 5 can always keep valid pixel data which can be used for the printing operation.

Figure 9:
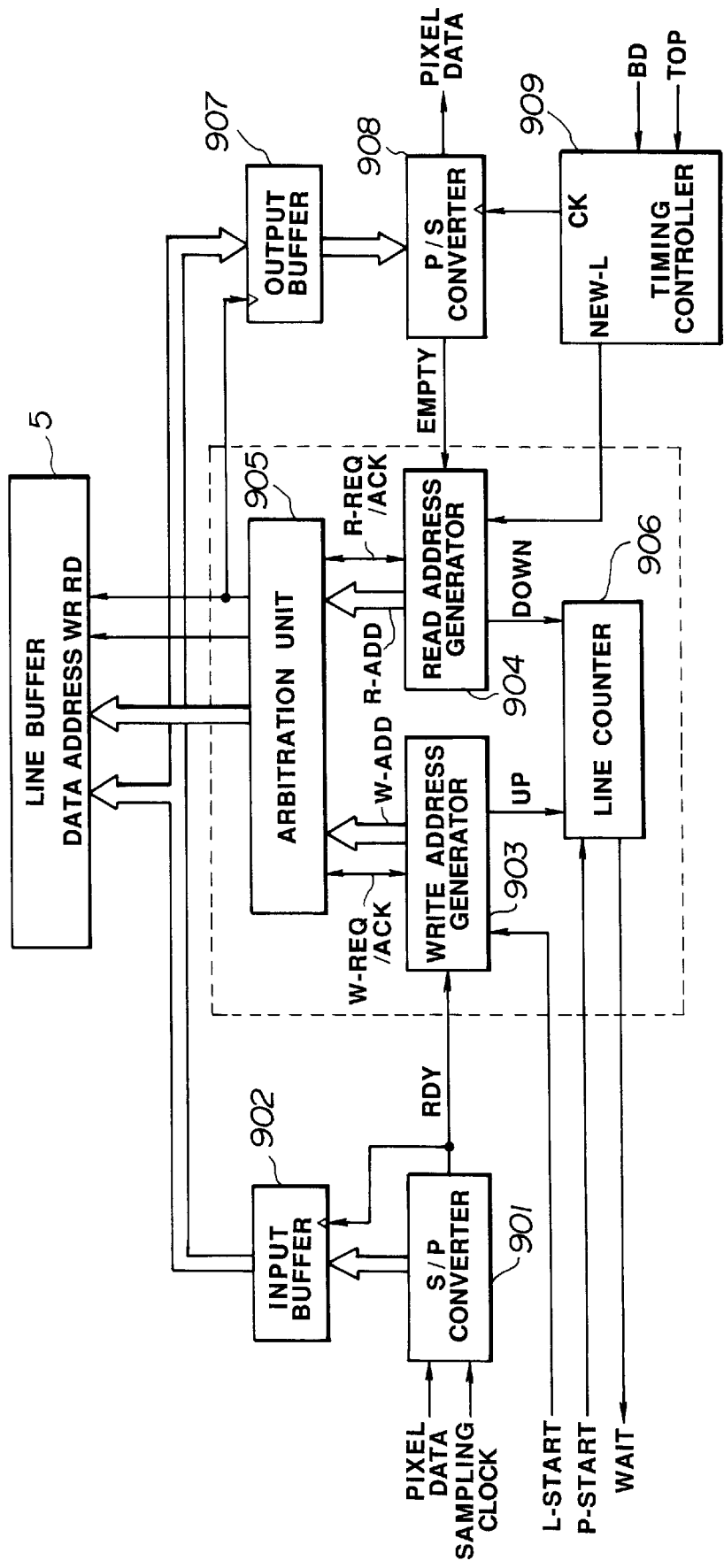
FIG. 9 is a drawing which shows a construction of a buffer controller.

FIG. 9 shows a construction of the buffer controller 4.

The writing operation of the pixel data into the line buffer 5 will be described first.

An S/P converter 901 converts the pixel data from the decoder 3 into parallel pixel data having a predetermined bit length. Whenever the serial to parallel conversion is completed, the S/P converter 901 outputs a RDY signal to an input buffer 902 and a write address generator 903 and supplies the parallel pixel data to the input buffer 902. The input buffer 902 temporarily holds the parallel pixel data from the S/P converter 901.

The write address generator 903 outputs a write request signal (W-REQ) to an arbitration unit 905 when the RDY signal is inputted from the S/P converter 901. If the reading out of the pixel data from the line buffer 5 is not being carried out, the arbitration unit 905 determines that the pixel data can be written into the line buffer 5 and outputs an acknowledgement signal (ACK) to the write address generator 903.

The arbitration unit 905 also supplies a write address which is inputted from the write address generator 903 to the line buffer 5 and converts the line buffer 5 to the write mode.

Therefore, the parallel pixel data which is held in the input buffer 902 is written into the line buffer 5 in accordance with the write address supplied from the arbitration unit 905. The write address generator 903 renews the write address in response to the input of the L-START signal from the decoder 3 and increases the write address by one in response to the input of the ACK signal from the arbitration unit 905.

When the writing of a line of the pixel data is completed by repeating the aforementioned operation, the write address generator 903 outputs a count up signal (UP) to a line counter 906.

Next, the reading operation of the pixel data from the line buffer 5 will be described.

The reading operation is controlled by a timing controller 909 in accordance with a sub-scanning synchronization signal (TOP) and a line synchronization signal (BD), of the page printer 7 which prints an image at a constant speed, which are supplied from the print controller 6.

When the timing controller 909 receives the TOP signal and then receives a predetermined number of the BD signals from the print controller 6, the timing controller 909 outputs to a P/S converter 908 a clock signal for outputting a line of the pixel data in synchronism with the BD signal.

The P/S converter 908 converts the parallel pixel data from an output buffer 907 into serial pixel data and supplies the serial pixel data to the print controller 6 in synchronism with the clock signal from the timing controller 909.

Whenever the output of the serial pixel data is completed, the P/S converter 908 outputs an EMPTY signal to a read address generator 904 and takes in the parallel pixel data which is already held in the output buffer 907. Then the P/S converter 908 supplies the pixel data serially to the print controller 6 in the same manner as described above.

The read address generator 904 outputs a read request signal (R-REQ) to the arbitration unit 905 when the EMPTY signal is inputted from the P/S converter 908. If the writing of the pixel data into the line buffer 5 is not being carried out, the arbitration unit 905 determines that the pixel data can be read out from the line buffer 5 and outputs an acknowledgement signal (ACK) to the read address generator 904.

The arbitration unit 905 also supplies a read address which is inputted from the read address generator 904 to the line buffer 5 and converts the line buffer 5 to the read mode.

Therefore, the parallel pixel data is read out from the line buffer 5 in accordance with the read address supplied from the arbitration unit 905 and is held in the output buffer 907. The read address generator 904 increases the read address by one in response to the input of the ACK signal from the arbitration unit 905.

By repeating the aforementioned operation, a line of the pixel data is read out from the line buffer 5. The read address generator 904 outputs the read address so that the same line of the pixel data is repeatedly read out from the line buffer 5 until a new line signal (NEW-L) is inputted from the timing controller 909. Namely, when the same line of the pixel data has been supplied to the print controller 6 the requisite number of times, the timing controller 909 outputs the NEW-L signal so as to renew the read address of the read address generator 904. At the same time, the read address generator 904 outputs a countdown signal (DOWN) to the line counter 906.

The line counter 906 is cleared by a page start signal (P-START), and then is counted up by one in response to the UP signal from the write address generator 903 and counted down by one in response to the DOWN signal from the read address generator 904.

Accordingly, the count value of the line counter 907 indicates the number of lines of the valid pixel data stored in the line buffer 5. The line counter 906 determines whether the line buffer 5 has enough space to store further pixel data on the basis of the count value and the storage capacity of the line buffer 5. When the line counter 906 determines that further pixel data cannot be written into the line buffer 5, the WAIT signal representing a buffer full state is outputted to the decoder 3. Therefore, the decoder 3 suspends the output of the pixel data to the buffer controller 4 as described above.

If the result of reading out of the pixel data from the line buffer 5 results in the line buffer 5 having enough space to store further pixel data, the line counter 906 stops outputting the WAIT signal so as to restart the decoder 3.

As explained above, the buffer controller 4 supplies the pixel data stored in the line buffer 5 to the print controller 6 in synchronism with the printing operation of the page printer 7 which prints an image at a constant speed and operates the decoder 3 intermittently so that the valid pixel data always exists in the line buffer 5.

Accordingly, the decoding operation of the code data by the decoder 3 and the printing operation based on the decoded data by the page printer 7 can be carried out at the same time. Therefore, it is not necessary to provide a large memory, such as a page memory, as the line buffer 5 which stores the pixel data obtained by the decoding operation.

In the above embodiment, the pixel data of the reference line which is used for decoding the two-dimension encoded data is stored in the RAM 823 of the decoder 3. Alternatively the pixel data of the reference line may be read out from the line buffer 5 whenever the code expander 815 needs it.

In consideration of the difference between the resolution of the original image represented by the code data and the print resolution of the page printer 7, each line of the pixel data can be repeatedly read out from the line buffer 5. Accordingly, by changing the number of repeats at predetermined lines, the reduction of the image in the sub-scanning direction can be carried out without thinning out the original image.

On the other hand, the reduction of the image in the main scanning direction can be carried out by thinning out the pixel data. For example, the thinning operation may be made by thinning out the sampling clock to be supplied to the S/P converter 901 while the pixel data from the decode 3 is written into the line buffer 5.

The aforementioned reduction process may be necessary in case where the size of the original image stored in the memory is bigger than the size of a recording paper when the original image stored in the memory is printed on the recording paper.

The above embodiment uses the page printer which comprises a laser beam printer (LBP), however other types of printer, such as a thermal printer which can intermittently print an image on a heat-sensitive paper transported by a stepping motor, may be used instead of the LBP. Namely, by adopting the decoding construction in the above embodiment, the heat-sensitive paper may be transported at a constant speed in the thermal printer. Thus uneveness in the print image, due to the intermittent transport of the heat-sensitive paper, can be removed.

As described above, according to the first embodiment, the facsimile apparatus which prints an image by the page printer can be constructed by using the line memory whose storage capacity is very small and accordingly the cost of the facsimile apparatus can be reduced.

The second embodiment of the present invention will now be described by reference to the drawings.

Figure 10:
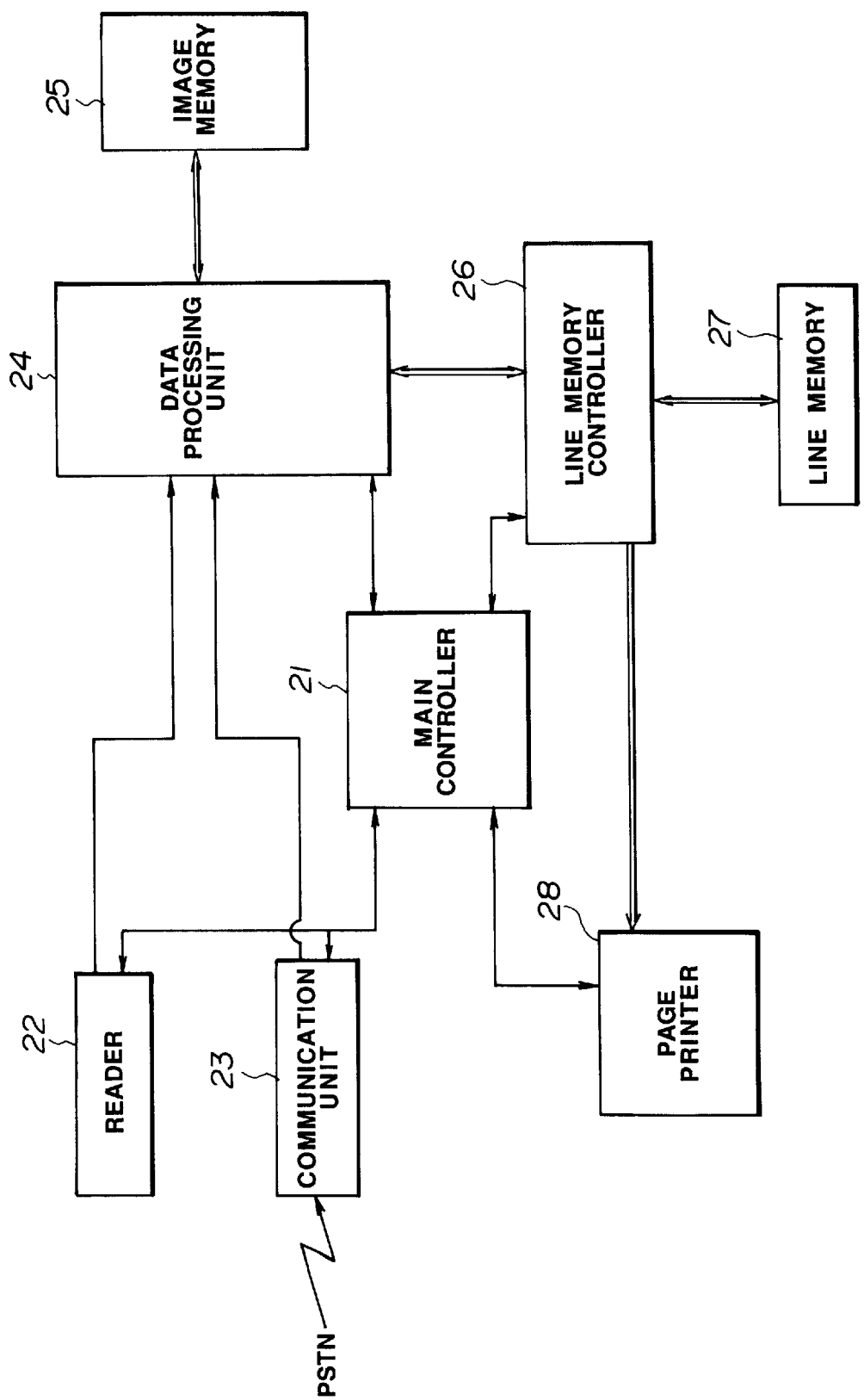
FIG. 10 is a block diagram which shows a structure of a facsimile apparatus of a second embodiment.

FIG. 10 is a block diagram which shows the structure of a facsimile apparatus of the second embodiment.

In the drawing, a main controller 21 controls the operation of the facsimile apparatus. A reader 22 reads an image of an original document and outputs pixel data in the binary form. A communication unit 23 communicates with other communication apparatuses via the public switched telephone network (PSTN). A data processing unit 24 encodes the pixel data and decodes the code data. An image memory 25 stores the code data from the data processing unit 24. A line memory controller 26 receives the pixel data from the data processing unit 24 and stores it into a line memory 27. The line memory controller 26 also outputs the pixel data to a page printer 28. The line memory 27 stores a plurality of line of the pixel data. The page printer 28 comprises a laser beam printer (LBP) and prints an image at a constant speed.

The operation of the second embodiment, particularly the data reception, will now be described by reference to FIG. 11 and FIG. 12.

Figure 11:
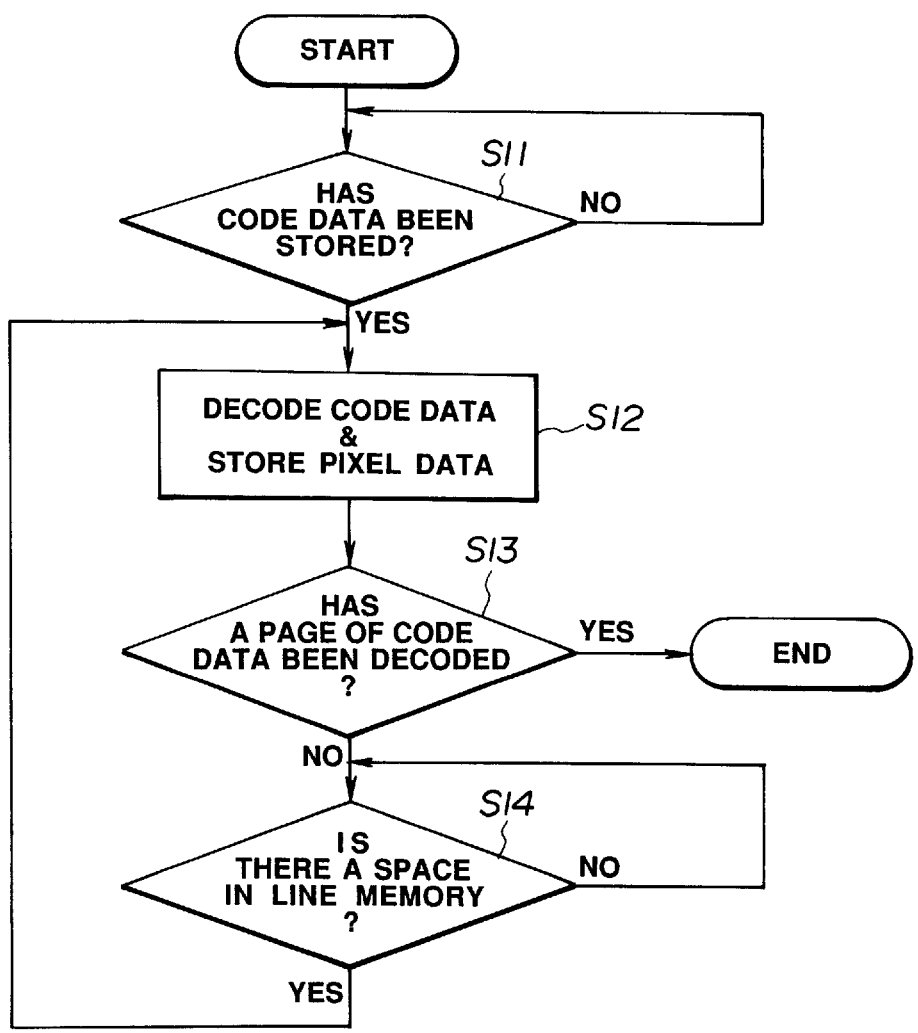
FIG. 11 is a flow chart which shows a decoding operation.

FIG. 11 is a flow chart which shows an operation to decode the code data in the image memory 25 and supply the pixel data to the line memory 27.

Figure 12:
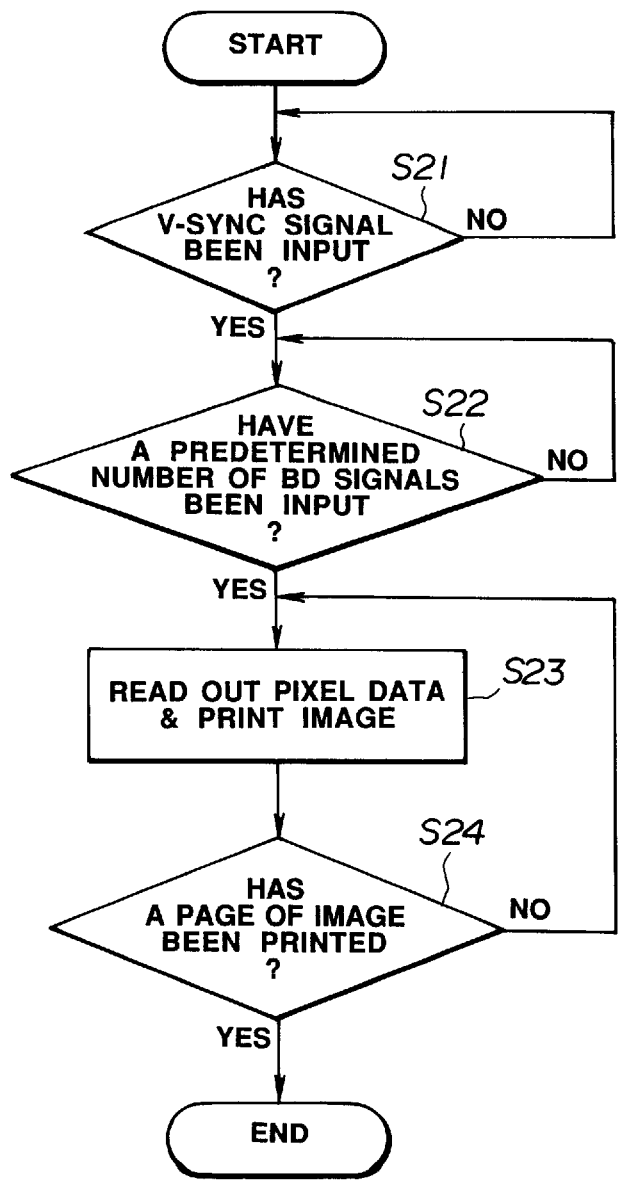
FIG. 12 is a flow chart which shows a read out operation.

FIG. 12 is a flow chart which shows an operation to read out the pixel data from the line memory 27 and print an image by the page printer 28.

In step S11, the main controller 21 determines whether at least one page of the code data is stored in the image memory 25 via the communication unit 23 and the data processing unit 24.

If at least one page of the code data has been stored, the main controller 21 makes the data processing unit 24 decode the code data in the image memory 25 sequentially and makes the line memory controller 26 supply the pixel data obtained by the decoding operation to the line memory 27 in step S12.

In step S13, the main controller 21 determines whether a page of the code data is decoded. If a page of the code data has not been decoded, the main controller 21 determines whether there is enough space to store the pixel data in the line memory 27 in step S14.

If the line memory 27 has enough space, the main controller 21 returns to the step S12 so as to decode further code data.

On the other hand, the main controller 21 initiates the page printer 28 when a predetermined number of lines of the pixel data has been stored in the line memory 27. Then, the main controller 21 determines whether the sub-scanning synchronization signal is inputted from the page printer 28 in step S21. If the sub-scanning synchronization signal is inputted, the main controller 21 determines whether a predetermined number of the BD signals are inputted from the page printer 28 in step S22. If the predetermined number of the BD signals are inputted, the main controller 21 advances step S23.

In the step S23, the main controller 21 makes the line memory controller 26 read out the same line of the pixel data from the line memory 27 at a plurality of times, so as to match the resolution in the sub-scanning direction of the pixel data to the print resolution of the page printer 28. The page printer 28 prints an image on the basis of the pixel data read out from the line memory 27 at a constant speed. The time which is necessary to print each line of an image by the page printer 28 is constant.

The page printer 28 continues the above printing operation until the main controller 21 determines that a page of an image has been printed in step S24.

In the above printing operation, as far as the data processing unit 24 can supply the pixel data at a speed which is higher than that of the reading out of the pixel data from the line memory 27 to the page printer 28, the lien memory 27 always holds valid pixel data, even if the decoding operation of the code data and the printing operation based on the pixel data obtained by the decoding operation may be carried out at the same time.

This condition is expressed by the following equation.

$$T(SUP) < R \times A \times T(PRT)$$

Wherein T(SUP) represents time which is necessary to decode a line of the code data by the data processing unit 24 and to supply the pixel data to the line memory 25, T(PRT) represents time which is necessary to print a line of an image in the main scanning direction by the page printer 28, A represents the ratio of the print resolution to the resolution of the pixel data and R represents the reduction rate in the sub-scanning direction of the print image.

The example will now be described under the following conditions.

the size of the recoding paper: A4 size T(PRT)=2.709 msec the print resolution: 15.4 line/mm the size of the original document: B4 size the resolution of the pixel data: 7.7 line/mm Under the above conditions, the resolution ratio A is expressed by the following equation. Accordingly, the page printer 28 prints the same line of an image twice.

$$A = 15.4 - 7.7 = 2.0$$

The B4 size of the original image is printed on the A4 size of the recoding paper, so the reduction rate R is 9/11.

$$R \times A \times T(PRT) = (9/11) \times 2.0 \times 2.709 = 4.43 \text{ msec.}$$

Accordingly, if the time T(SUP) is always less than 4.43 (msec), valid pixel data always exists in the line memory 27.

However, the line memory 27 can store a plurality of lines of the pixel data, so the time T(SUP) can be regarded as an average of time which is used for decodin a line of the code data. Accordingly, every time which is used for decoding a line of the code data may not be less than 4.43 (msec).

As explained above, the pixel data is read out from the line memory 27 and the page printer 28 prints an image on the basis of the read out pixel data in parallel with the supplying of the pixel data to the line memory 27 by the data processing unit 24. Accordingly, the decoding operation of the code data and the printing operation based on the pixel data obtained by the decoding operation can be carried out at the same time by using the line memory which has a small capacity regardless of the size or the resolution of an image to be printed, without using a page buffer which has a large capacity. So the memory capacity can be reduced and the cost of the facsimile apparatus can be reduced.

The third embodiment of the present invention will now be described with reference to the drawings.

Figure 13:
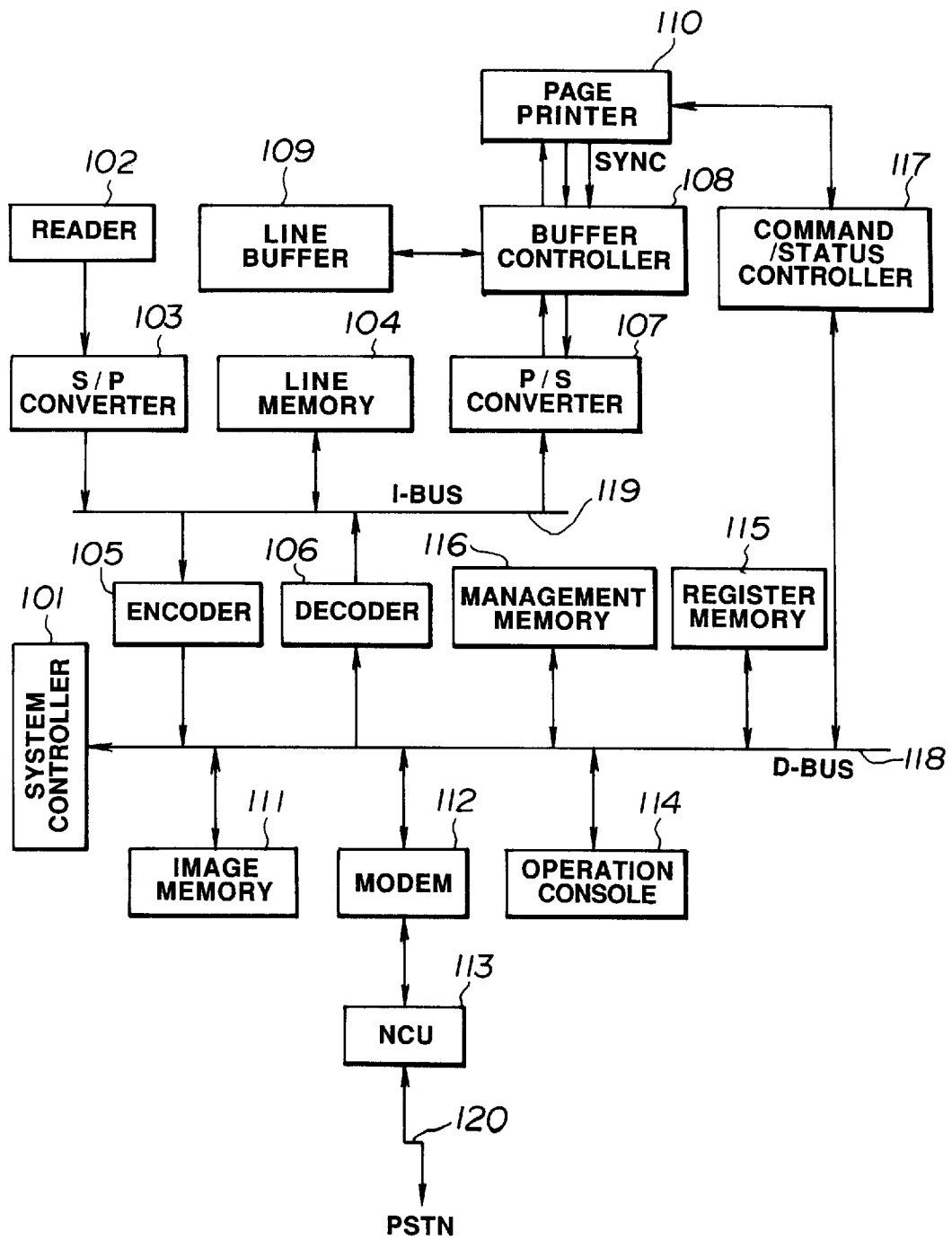
FIG. 13 is a block diagram which shows a structure of a facsimile apparatus of a third embodiment.

FIG. 13 is a block diagram which shows a structure of a facsimile apparatus of the third embodiment.

In the drawing, a system controller 101 comprises MPU, ROM and RAM and controls the operation of the facsimile apparatus. A reader 102 reads an image of an original document and serially outputs pixel data in the binary form. A S/P converter 103 converts the serial pixel data from the reader 102 into parallel data and outputs a line memory 104 which temporarily stores a plurality of lines of the pixel data. An encoder 105 reads out a predetermined pixel data from the line memory 104 and encodes the pixel data into code data. A decoder 106 decodes the code data from an image memory III (described below) at a high speed and stores the pixel data obtained by the decoding operation in the line memory 104.

A P/S converter 107 reads out a predetermined pixel data from the line memory 104 and serially outputs the pixel data and subjects the pixel data to a reduction process in accordance with an instruction from the system controller 101. The reduction process is carried out in the main scanning direction by thinning out the pixel data at a predetermined interval.

A buffer controller 108 carries out a first and a second process in parallel manner, wherein in the first process the buffer controller 108 converts the serial pixel data from the P/S converter 107 into parallel data and stores the parallel data in the line buffer 109 and in the second process the buffer controller 108 reads out the pixel data stored in the line buffer 109 in synchronism with the line synchronization signal from a page printer 110 and converts the read out pixel data into serial pixel data.

The buffer controller 108 also subjects the pixel data to the reduction process in the sub-scanning direction by thinning out several lines of the pixel data in accordance with the instruction from the system controller 101.

A line buffer 109 temporarily stores a plurality of lines of the pixel data. A page printer 110 comprises a laser beam printer (LBP) and prints an image on the basis of the pixel data from the line buffer 109. The page printer 110 outputs the line synchronization signal every time a line of an image is printed.

An image memory III comprises DRAM etc. and stores the pixel data in the form of compressed and encoded data. A MODEM 112 communicates the data via the public switched telephone network (PSTN) and modulates/demodulates the data. A network control unit (NCU) 113 controls the interface to the PSTN.

An operation console 114 is composed of various instruction buttons, displays and so on. A register memory 115 is composed of a memory which stores management informations for controlling the facsimile apparatus and a character generator ROM (CG-ROM) which stores character font data.

A management memory 116 stores the data which is necessary to manage the pixel data stored in the image memory III and various data concerning the data communication.

A command/status controller 117 controls the interface between the system controller 101 and the page printer 110. A system bus 118 connects the system controller 101 to various components. An image bus is used for transmitting the pixel data. A SYNC denotes a line synchronization signal from the page printer 110.

The construction of the decoder 106 is similar to that shown in FIG. 8. The time which is necessary to decode a line of the code data is shorter than the time which is necessary to print a line of an image by the page printer 110. The decoder 106, which can operate under the above condition, can be made by means of a wired logic construction.

Figure 14:
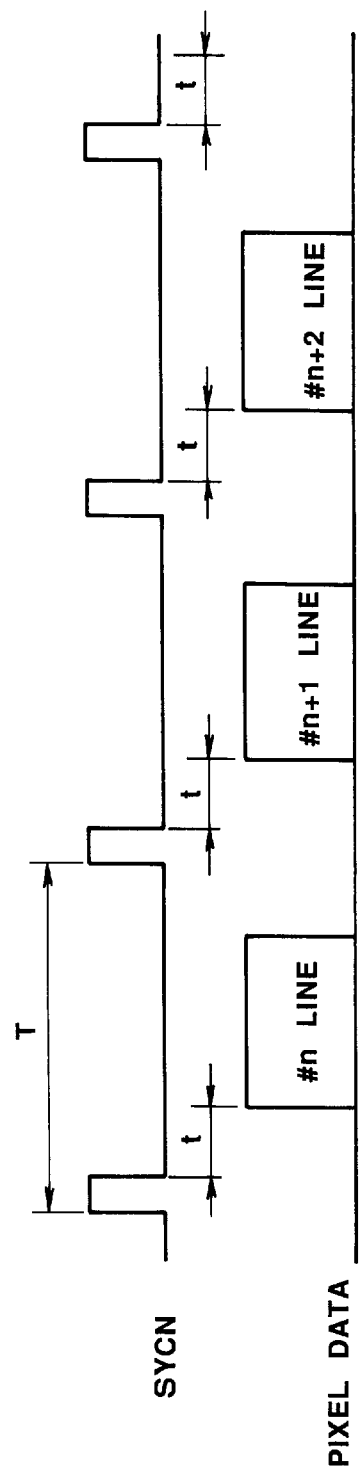
FIG. 14 is a timing chart which shows an operation of a page printer.

FIG. 14 is a timing chart which shows the operation of the page printer 110. The page printer 110 outputs the SYNC signal at T intervals, every time a line of an image is printed. The buffer controller 108 reads out a line of the pixel data from the line buffer 109 with a predetermined delay t, when the SYNC signal is inputted. Therefore, in this third embodiment, a line of the pixel data must be stored in the line buffer 109 within the time T.

FIG. 14 shows an example in which the resolution of the pixel data is equal to the print resolution of the page printer 110. However, in the case where the resolution of the pixel data is half of the print resolution, the same line of the pixel data is read out from the line buffer 109 twice.

The management memory 116 stores the management information as described below.

Figure 15:
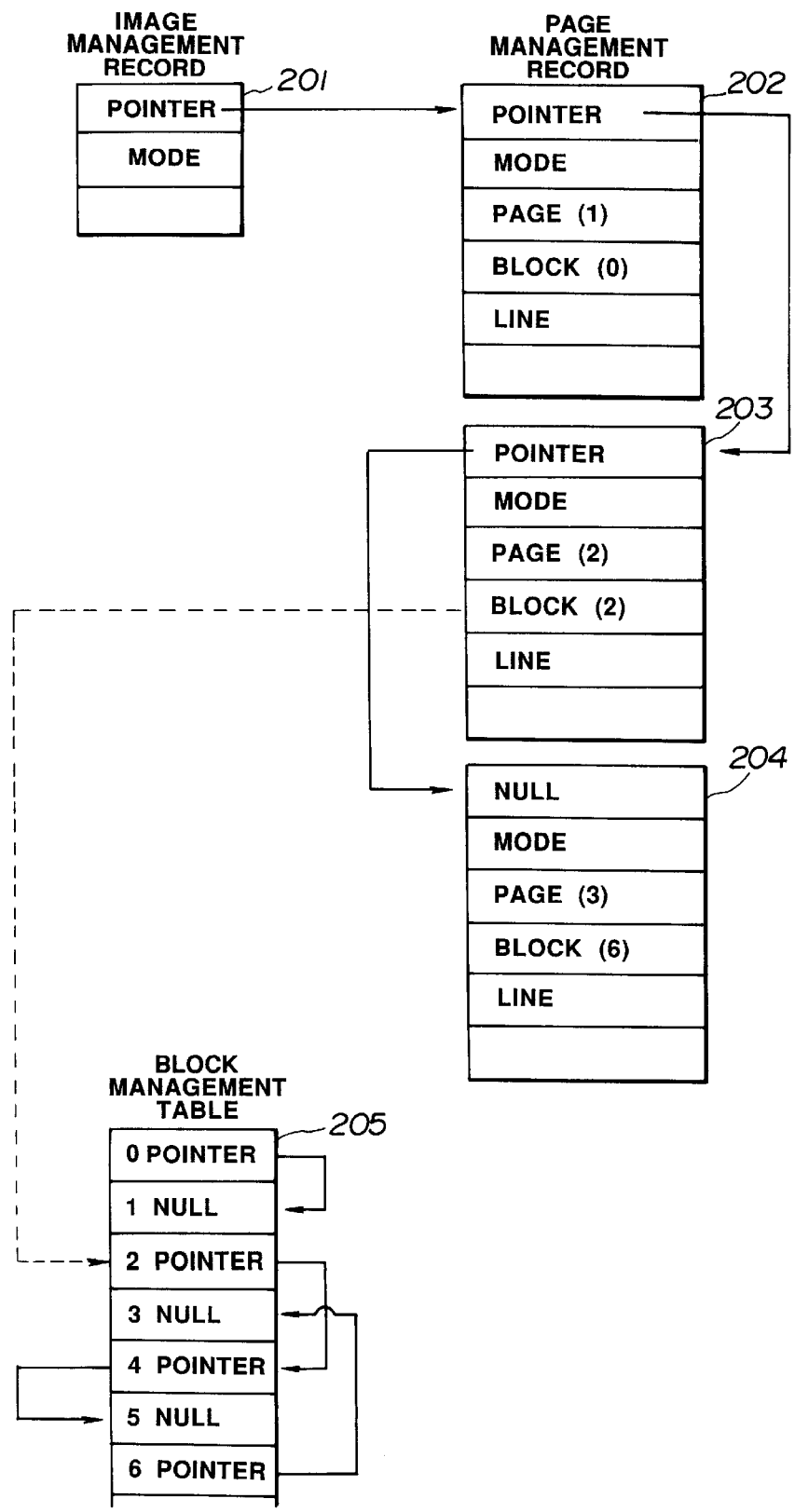
FIG. 15 is a drawing which shows a format of a management information.

FIG. 15 shows an example of a format of the management information in case where three pages of images are received at one reception.

An image management record 201 is generated whenever a communication is carried out and used for managing the received image stored in the image memory III. The image management record 201 comprises mode data representing the attribute of the image (received image, image to be transmitted, image to be transmitted via a memory or image to be copied) and pointer data representing the destination in a page management record.

The page management records 202, 203, 204 are generated whenever a page of an image is received and used for managing each page of the image. The page management record comprises pointer data representing the page management record corresponding to the next page, mode data such as an encoding method, the width of the main scanning or the resolution in the sub-scanning direction, the number of pages block information, the number of lines which is counted when the image is stored in the image memory III and a page completion code representing the completion of the storage of a page of the image. A null code (NULL) is set as the pointer data of the page management record corresponding to the last page.

The image memory III is divided into a plurality of memory blocks whose sizes are constant and memory block numbers are provided for the memory blocks. The block information set in the page management record is corresponding to the memory block number. Therefore, the system controller 101 can calculate the physical address in the system in accordance with the memory block number and the size of the memory block.

In a block management table 205, memory block information represents the memory block numbers corresponding to the memory blocks which stores a page of an image. The block management table 205 has a plurality of areas which are staticaly assigned to the memory blocks 1, //2, . . . //N. Each area stores pointer data representing a memory block which stores a continuation of an image in the same page. A null code (NULL) is stored in the area corresponding to the last memory block which stores the last part of the image. For example, a page of an image representing the page management record 204 is separately stored in the memory blocks 2, //4 and 5. By searching a vacant area in the block management table from the head of the area, the unused memory block in the image memory III can be determined.

According to the management method as shown in FIG. 15, in the case where a page of image data represented by the page management record 204 is read out from the image memory III, the system controller 101 obtains 2 as the block number on the basis of the block information of the page management record 204 and then reads out image data from the memory block 2 in the image memory III. After that, the system controller 101 reads out image data from the memory block 4 in accordance with the pointer data stored in the area 2 in the block management table 205. Finally the system controller 101 reads out image data from the memory block 5 in accordance with the pointer data stored in the area 4 in the block management table 205.// The receiving operation of the third embodiment will now be described.

Figure 16:
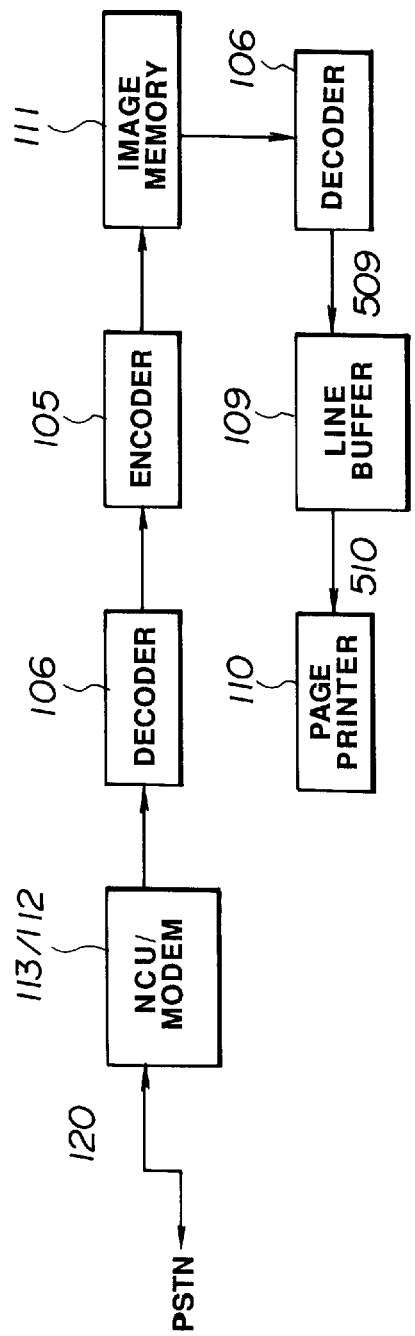
FIG. 16 is a flow diagram which shows a reception operation of a third embodiment.

FIG. 16 is a flow diagram of the receiving operation of the third embodiment. The speed of the data from the PSTN 120 does not match to that of the image print by the page printer 110, therefore the receiving process which stores the received data into the image memory III and the printing process which prints an image in accordance with the data stored in the image memory III are independently carried out.

In the receiving process, the decoder III decodes the code data received via the NCU 113 and the MODEM 112 one by one and the encoder 105 encodes the pixel data from the decoder III, except the pixel data contained in the error line, in accordance with the predetermined encoding method. The encoded data from the encoder is stored in the image memory III.

After the completion of the reception of a page of an image, the number of image lines contained in the stored image is counted and memorised. The completion of the reception of a page of an image is determined by means of the detection of the RTC signal (CCITT-T.4) in the received data.

It is because the size of the received image is determined prior to the image printing that the number of the normal lines is counted and memorised. Namely, if the size of the image to be printed is larger than that of a pre-cut paper sheet, then the received image is separately printed on an appropriate number of the pre-cut sheets. Accordingly, the number of the pre-cut sheets on which the received image is separately printed is determined in accordance with the number of the normal lines.

At the same time, the management information shown in FIG. 15 is generated and stored in the management memory 116.

When a page of the received image to be printed is stored in the image memory III, the printing process is initialised. Accordingly, the printing process is carried out in parallel with the receiving process.

In the printing process, the system controller 101 monitors the size of the recording paper (pre-cut paper) mounted in the page printer 110 via the command/status controller 117 and monitors the number of image lines in the page management record stored in the management memory 116. The system controller 101 determines whether or not the special process such as a separation print, a reduction print or a cut off print.

For example, it is assumed that the number of image lines contained in the stored image is N[line] the length of the recording paper is M[line] and the reduction rate is R[%].
(1) in case where N<M
A page of the stored image is printed on a sheet at the same size as the original document.
(2) in case where N>M and N<M×(100/R)
A page of the stored image is reduced and printed on a single sheet.
(3) in case where N>M×(100/R)
A page of the stored image is separated and printed on two or more sheets at the same size as the original document.

Moreover, if the page printer 110 mounts a plurality of sizes of the recording sheets, the system controller 101 selects an appropriate size via the command/status controller 117.

For example, it is assumed that the number of image lines contained in the stored image is N [line], the lengths of the recording sheets are M1, M2, . . . Mn [line] (M1<M2<. . . <Mn) and the reduction rate is R[%].
(1) in case where N<M1 (M1 is the minimum size)
A page of the stored image is printed on a recording sheet whose size is M1 at the same size as the original document.
(2) in case where N>M1 and N<M2
A page of the stored image is printed on a recording sheet whose size is M2 at the same size as the original document.
(3) in case where N<Mn×(100/R) and N>Mn (Mn is the maximum size)
A page of the stored image is reduced and printed on a recording sheet whose size is Mn.
(4) in case where N>Mn×(100/R)
A page of the stored image is separated and printed on two or more recording sheets at the same size as the original document.

On the other hand, in case where Mi<N<Mi+1 (Mi<Mi+1), the construction, in which the operator can select either the reduction print on the small size (Mi) recording sheet or the normal print on the large size (Mi+2) recording sheet, may be adopted.

Besides, by providing a memory area which stores the reduction rate R[%] with the register memory 115, the reduction rate R may be changed by the operator via the operation console 114.

Figure 17:
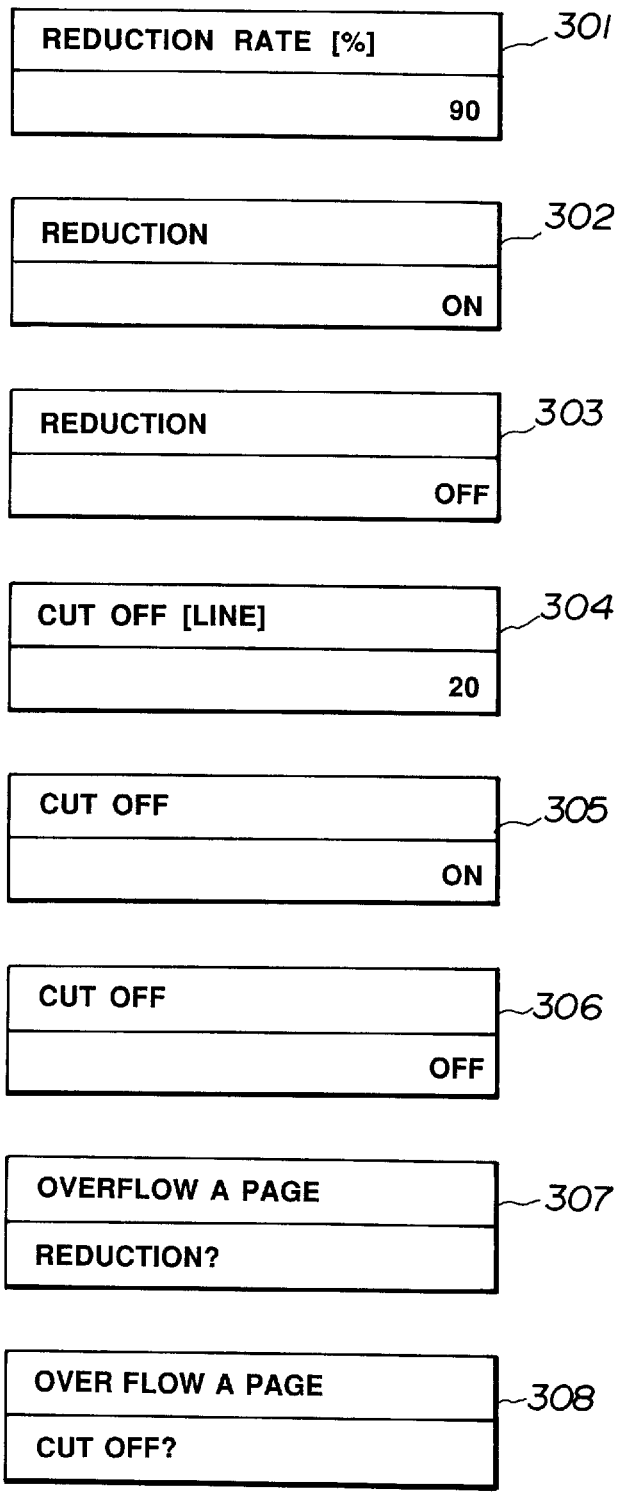
FIG. 17 is a drawing which shows some examples of display content.

FIG. 17 shows some examples of display content displayed at the operation console 114.

The display content 301 shows the reduction rate which has been set by the operator and stored in the register memory 115.

Alternatively, by providing a memory area which stores data indicating whether or not the reduction print is carried out with the register memory 115, the data may be changed by the operator. In FIG. 17, the display contents 302, 303 show the set conditions of the memory area.

The reduction rate may be automatically changed stepwise or linearly from Rmin to 100[%] on the basis of the number of image lines and the length of the recording sheet. Thereby the reduction print which is suitable for the size of the recording sheet can be carried out.

In the above described reduction print, the image may be subjected to the reduction process in both the main scanning direction and the sub-scanning direction so as not to change the aspect ratio. Alternatively, in case where the image can be printed at the same size as the original document in the main scanning direction, the image may be subected to the reduction process in the sub-scanning direction only (for example, in case where the A4 size of an image is printed on the A4 size, the Letter size or the Legal size).

If the cut off print is selected, the following operation is carried out.

For example, it is assumed that the number of image lines contained in the stored image is N [line], the length of the recording sheet si M [line] and the amount of the trailing edge to be cut down is L [line].
(1) in case where N<M
All lines contained in a page of the stored image are printed on a recording sheet.
(2) In case where N>M and N<M+L
M lines (1 1 //N) are not printed.//
(3) in case where N>M+L
A page of the stored image is separated and printed on two or more recording sheets at the same size as the original document. Moreover, by providing a memory area which stores the amount of (L) of the trailing edge to be cut off with the register memory 115, the amount L may be changed by the operator via the operation console 114. In FIG. 17, the display content 304 shows the amount to be cut off which has been set by the operator.

Alternatively, by providing a memory area which stores data indicating whether or not the cut off print is carried out with the register memory 115, the data may be changed by the operator. In FIG. 17, the display contents 305, 306 show the set conditions of the memory area.

The printing operation of the third embodiment will now be described.

The storage positions in the image memory III which stores the a page of the code data can be determined by searching the block management table 205 on the basis of the block informations in the page management records 202, 203, 204.

First, the received code data stored in the image memory III is decoded by the decoder 106 and the decoding result (pixel data) is stored in the line memory 104 one by one. A line of the pixel data in the line memory 104 is converted into serial pixel data by the P/S converter 107 and transferred to the buffer controller 108. Then the buffer controller 108 stores the serial pixel data in the line buffer 109.

This series of processes (decoding—P/S conversion—storage) is carried out whenever the line buffer 109 has enough space to store further pixel data.

On the other hand, in parallel with the above processes, the buffer controller 108 sequentially reads out the pixel data line by line from the line buffer 109 in synchronism with the line synchronization signal SYNC (BD signal) which requests the outputting of a line of the pixel data and is outputted from the page printer 120. At this time, if necessary, the same line of the pixel data is repeatedly read out from the line buffer 109 at a plurality of times in accordance with the resolution of the received image.

The decoding operation of the decoder 106 is temporarily suspended, when the code data corresponding to the length of the recording paper which has been monitored prior to the printing operation is decoded.

The aforementioned parallel process of the decoding operation and the printing operation is carried out by using an interrupt function of the system controller 101.

Figure 18:
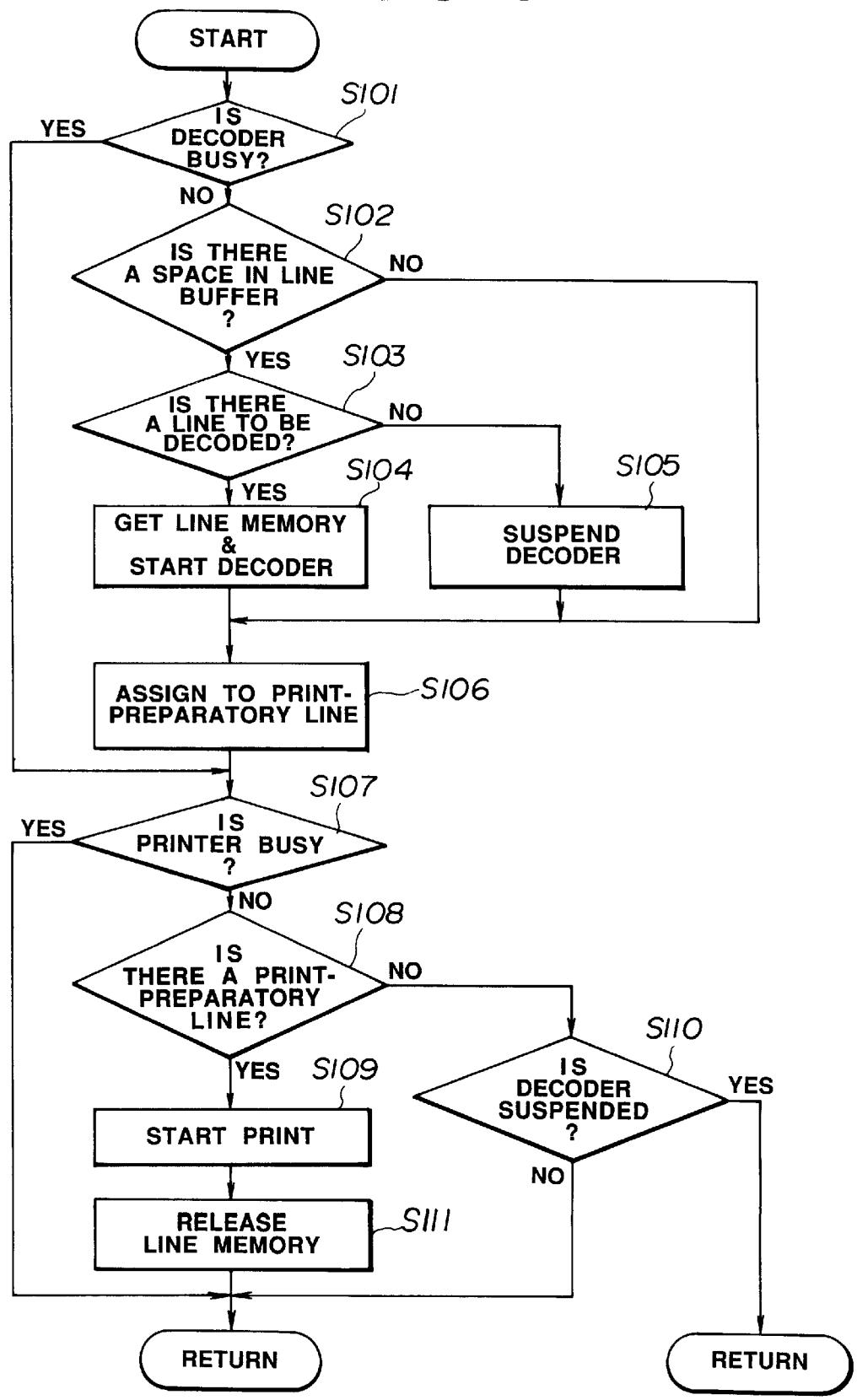
FIG. 18 is a flow chart which shows a parallel process.

FIG. 18 is a flow chart which shows the parallel process of the decoding operation and the printing operation by using an interrupt function. The interruption is carried out at a predetermined interval which is shorter than the time necessary to print a line of an image.

FIG. 19 shows formats of management tables which are formed for using each of line memories in the line buffer 109 during the parallel process. In FIG. 19, (A) shows the format of a line buffer management table and (B) shows the format of a ring queue buffer. The table (A) and the buffer (B) is provided with a RAM in the system controller 101.

Figures 19A, 19B:
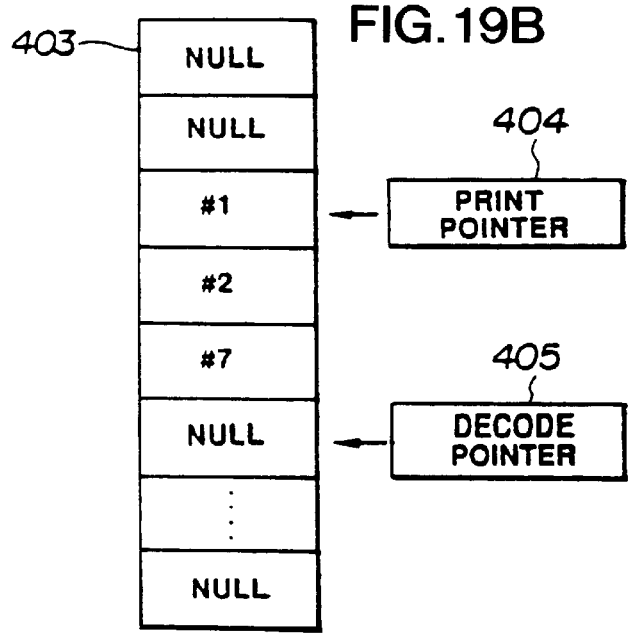
FIGS. 19(A) and 19(B) are drawings which show formats of management table.

In FIG. 19(A), the operation state in the decoder area 401 indicates whether the decoder 105 is operating (ON state) or on suspense (OFF state). The line O, line //1, ... , line //N indicate the state of each line memory in the line buffer 109. "OFF" represents that the line memory is vacant so that the line memory can be used for the next decoding operation, "REF" represents that the pixel data stored in the line memory is being used as the reference line which is referred to decode two dimensional code and "CODE" represents that the pixel data obtained by the decoding operation is being written into the line memory.

The operation state in the printer area 402 indicates whether the page printer 110 is operating (ON state) or suspending (OFF state). The line O, line 1, ... , line //N indicate the state of each line memory. "OFF" represents that the line memory is vacant, "ON" represents that the line memory stores the valid pixel data for printing image and "PRN" represents that the pixel data in the line memory is being used for printing an image.

In FIG. 19(B), the ring queue buffer 403 is used for controlling the writing/reading of pixel data in/from the line memory so as to print an image by using the pixel data in the right order. The decoding line is managed by the decode pointer 405 and the print line is managed by the print pointer 404.

Namely, whenever a line of the code data is decoded, the line number representing the lin memory, which stores the pixel data obtained by the decoding operation, is written in the area pointed by the decode pointer 405 and then the decode pointer 405 is shifted to the next area. On the other hand, the pixel data stored in the line memory represented by the line number in the ring queue buffer 403, which is indicated by the print pointer 404, is read out for the printing operation. Whenever a line of an image is printed in accordance with the read out pixel data, a NULL code which indicates that the area is vacant is written in the area indicated by the print pointer 404 and then the print pointer 404 is shifted to the next area.

In the ring queue buffer 403, the print pointer 404 cannot overtake the decode pointer 405 and the decoding operation cannot be initiated unless the NULL code is stored in the area next to the area pointed by the decode pointer 405.

At the initial stage, the operation state areas in the decoder area 401 and the printer area 402 are set for "OFF" and the line number areas in the decoder area 401 and the printer area 402 are set for "OFF". Every area in the ring queue buffer 403 is set for "NULL". When the printing operation is started, the operation state areas in the decoder area 401 and the printer area are set for "ON".

The printing operation will now be described by reference to the flow chart shown in FIG. 18.

When the interruption is generated by a timer (not drawn), the system controller 101 determines whether or not the decoder 106 is decoding the code data (step S101). If the decoder 106 is decoding the code data and the decoder 106 is busy, steps S102 S106 are skipped. However, in this embodiment, the time which is necessary to decode the code data is shorter than the interval of the interruption, so the steps S102 S106 may not be skipped.

If the decoder 106 is not decoding the code data, the system controller 101 searches a vacant line memory in the line buffer 109 (step S102). Namely, the system controller 101 searches the line memory in the line buffer 104 whose line number areas in both the decoder area 401 and the printer area 402 of the line buffer management table (FIG. 19(A)) has been set for "OFF".

If there is a vacant line memory in the line buffer 104, the system controller 101 determines whether or not there is a line of the code data to be decoded (step S103). Namely, the system controller 101 determines whether a page of the code data stored in the image memory III has been decoded (whether or not the number of lines which has been decoded is equal to the number of the normal lines memorised) and determines whether or not the number of lines which has been decoded is equal to the number of lines corresponding to the length of the recording paper.

If the number of lines which has been decoded is equal to the number of the normal lines memorised or the number of lines corresponding to the length of the recording sheet, the system controller 101 sets the operation state area 401 in the line buffer management table for "OFF" so as to suspend the decoding operation of the decoder 106 (step S105).

However, if the number of lines which has been decoded does not reach either number, the system controller 101 gets the vacant line memory in the line buffer 109 and outputs a start trigger signal to the decoder 106 so as to start the further decoding operation (step S104).

At the same time, the system controller 101 writes "CODE" representing that the line memory is being used for the decoding operation in the line number area corresponding to the line memory which is got by the system controller 101 in the decoder area 401. Then the system controller 101 writes "REF" representing that the line memory is being used for the reference line in the area corresponding to the line memory in which the pixel data was written at the former decoding operation. The system controller 101 also writes "OFF" in the area corresponding to the line memory which was used for the reference line at the former decoding operation.

In step S106, the system controller 101 assigns the line memory in which the pixel data was written at the former decoding operation to the print-preparatory line. Namely, the line number representing the line memory is SET in the area pointed by the decode pointer 405 in the ring queue buffer 403 and hen the decode pointer 405 is shifted to the next area. At this time, the system controller 101 writes "ON" representing that the line memory can be used for the printing operation in the area corresponding to the line memory in the print area 402 of the line buffer management table.

Next, the system controller 101 determines whether or not the page printer 110 is printing an image (step S107). If the page printer 110 is printing an image, steps S108 S111 are skipped.

On the other hand, if the page printer 110 is not printing an image, the system controller 101 determines whether or not there is the print-preparatory line (step S108). Namely, the system controller 101 determines whether or not "NULL" is stored in the area pointed by the print pointer 404 in the ring queue buffer 403.

If there is the print-preparatory line, the pixel data is read out from the line memory in the line buffer 109 which is represented by the line number stored in the area pointed by the print pointer 404 and the printing operation is started (step S109). At this time, the system controller 101 writes "PRN" representing that the line memory is being used for the printing operation in the line number area in the printer area 402. After a line of an image is printed, the system controller 101 advances to step SIII.

On the other hand, if there is not the print-preparatory line, the system controller 101 determines whether or not the decoder 106 has been suspended. If the decoder 106 has been suspended, the system controller 101 determines that a page of an image has already printed on a recording paper.

However, if the decoder 10 has not been suspended, the system controller 101 completes the interruption process and returns to prepare for the further interruption.

In step SIII, the system controller 101 releases the line memory in the line buffer 109 which has been used for the printing operation and writes "OFF" representing that the line memory is vacant in the line number area corresponding to the line memory which stores the pixel data used for the former printing operation in the printer area 402 of the line buffer management table.

In case where the separation print is carried out, the above mentioned process may be repeated. However, when the code data stored in the image memory III is obtained by the two-dimension encoding method such as MR or MMR, the pixel data of the last line in the line buffer 109 should be managed as the reference line which is referred for decoding the first line of the next image.

As described above, the print speed of the page printer 110 is constant, so the pixel data should not run out and should always exist in the line buffer 109 during the printing operation. In this embodiment, the error lines are removed when the code data is received. Accordingly, even if the decoding operation of the code data and the printing operation based on the pixel data obtained by the decoding operation are carried out at the same time, the interruption of the printing operation due to the occurrence of the error line does not happen. Therefore, the received image can be printed by the page printer which prints an image at a constant speed without providing a large memory such as a page buffer. The aforementioned control may be adapted for the copying operation.

The pixel data outputted from the reader 102 is converted into parallel data by the S/P converter 103 and the parallel data is sequentially stored in the line memory 104.

The encoder 105 sequentially encodes the pixel data stored in the line memory 104 and stores the encoded data in the image memory III. According to this operation, the whole documents are stored in the image memory III in the form of compressed and encoded data (code data).

In the same way as the reception of the code data, the management information of the images stored in the image memory III is generated and stored in the management memory 116.

The printing operation is carried out on the basis of the code data stored in the image memory III in the same way as the printing operation described above.

In the copying operation, after reading the original document, if the number of image lines contained in a page of an image which is stored in the image memory III satisfies the condition under which the reduction process may be carried out, the indicator device may be provided to indicate the fact that the image should be reduced to the operator prior to the printing operation. Furthermore, the operator may select whether or not the reduction process is carried out. In FIG. 17, the display content 307 shows the example of such an indication.

On the other hand, if the number of image lines contained in a page of an image which is stored in the image memory III satisfies the condition under which the cut off print may be carried out, the indicator device may be provided to indicate the fact that the image should be cut off to the operator prior to the printing operation. Furthermore, the operator may select whether or not the cut off print is carried out. In FIG. 17 the display content 308 shows the example of such an indication.

As described above, according to the third embodiment, the pixel data obtained by decoding the received code data is encoded and stored in the image memory except the error line of pixel data. Then, the printing operation is carried out on the basis of the pixel data obtained by decoding the code data stored in the image memory.

Therefore, the error line never occurs during the decoding operation for printing an image.

Accordingly, the decoding operation for converting the code data to the pixel data and the printing operation for printing an image on the basis of the pixel data by the page printer can be carried out at the same time without using a large memory such as a page memory. Therefore, the facsimile apparatus using a page printer can be produced at a low cost.

The fourth embodiment of the present invention will now be described by reference to the drawings.

In the above described embodiments, a laser beam printer (LBP) shown in FIG. 7 is used as the page printer 110. The printing operation of the LBP will be described.

Figure 20:
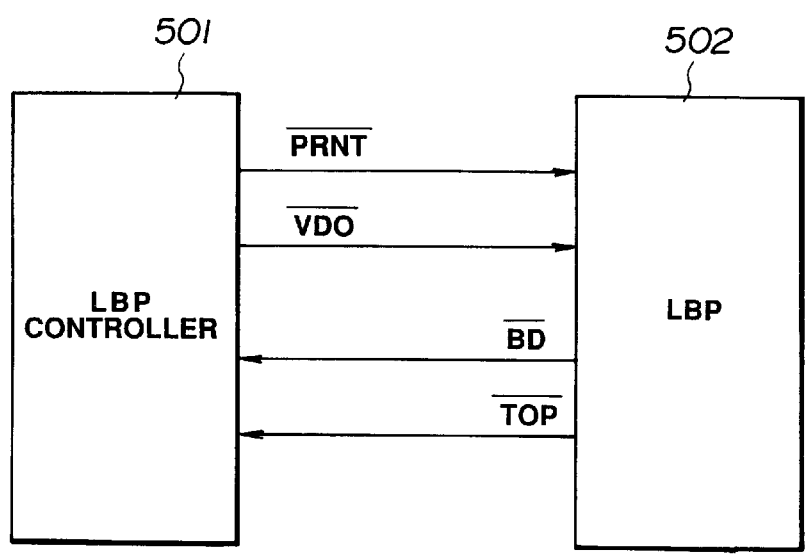
FIG. 20 is a timing chart which shows signals transferred between a LBP and a LBP controller.

FIG. 20 shows the signals which are transferred between a LBP controller 501 and a LBP 502 in the page printer 110 (FIG. 13) of the facsimile apparatus.

In FIG. 20, the LBP controller 501 instructs the LBP 502 to start or continue the printing operation by using a PRNT signal. When the PRNT signal is asserted, the LBP 502 feeds the recording paper 607 from the feed cassette 608 to the registration roller 603 by the feed roller 604. A VDO signal represents the pixel data to be used for printing an image. A BD signal represents the line synchronization signal which indicates that the laser beam arrives at the main scanning start point. A TOP signal represents the sub-scanning synchronization signal which indicates that the recording paper 607 fed from the feed cassette 608 arrives at the predetermined position. The LBP controller 501 supplies the VDO signal in synchronism with the BD signal after a predetermined time elapses from the reception of the TOP signal.

Figure 21:
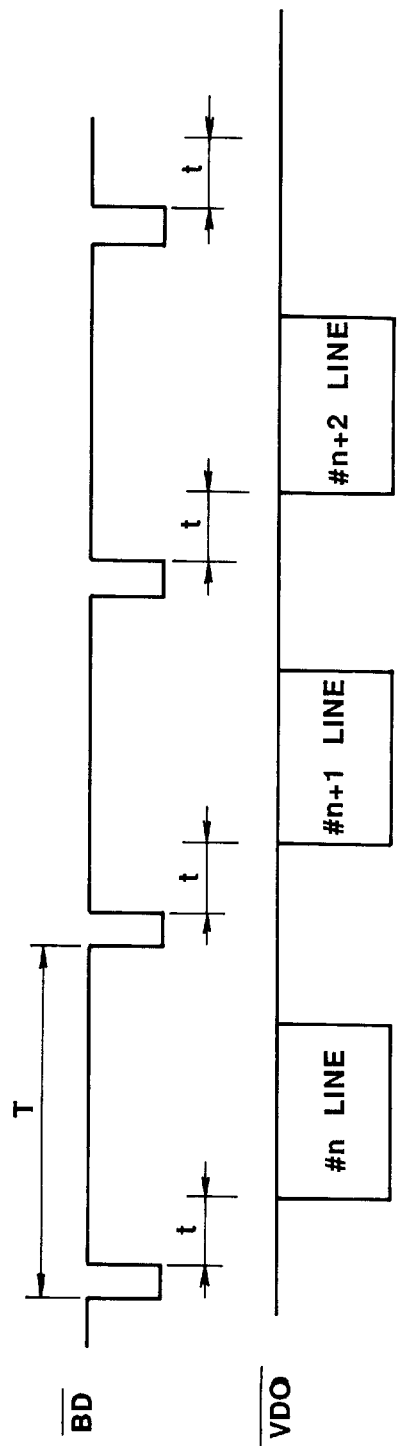
FIG. 21 is a timing chart which shows a time relation between VDO signal and BD signal.

FIG. 21 is a timing chart which shows the time relation between the VDO signal and the BD signal. The BD signal is outputted at the period T and the VDO signal is outputted after a predetermined time (t) since the output of the BD signal and completed within the period T.

FIG. 22 is a timing chart which shows the time relation among the PRNT signal, the TOP signal and the VDO signal. A T1 time and a T2 time which are counted after the TOP signal is asserted are particular times which are determined based on the length of the transport pass, the transport speed of the recording sheet and so on. Namely, if the PRNT signal is asserted in the T1 time, the LBP 502 feeds a further recording sheet at the minimum interval. On the other hand, if the PRNT signal is negated in the T2 time, the LBP 502 is inhibited from feeding a further recording sheet at the minimum interval.

Accordingly, as shown in FIG. 22(A), if the PRNT signal which has been assented for the former printing operation (#N page) is negated in the T2 time and the PRNT signal is kept in the negated state until the T1 time elapses, the recording sheet for the next printing operation (#N+1 page) is not fed unless the PRNT signal is asserted.

As shown in FIG. 22(B), if the PRNT signal which has been asserted for the former printing operation (#N page) is negated in the T2 time and then the PRNT signal is asserted in the T1 time, the recording sheet for the next printing operation (#N+1 page) is successively fed at the minimum interval.

On the other hand, in case where the PRNT signal which has been asserted for the former printing operation is not negated in the T2 time, even if the PRNT signal is negated after the T2 time, the recording sheet for the next printing operation is successively fed at the minimum interval.

Accordingly, if the LBP controller 501 does not negate the PRNT signal in the T2 time or asserts in the T1 time the PRNT signal which has been negated in the T2 time, the recording sheet is successively fed at the minimum interval. Therefore, the time which is necessary to print a plurality of pages of images can be reduced.

In FIG. 22, first the LBP controller 501 asserts the PRNT signal for the printing operation (#N page). After that, the TOP signal is negated by the LBP 502. The LBP controller 501 negates the PRNT signal after the reception of the TOP signal and then the LBP controller 501 supplies the VDO signal in synchronism with the BD signal from the LBP 502 after the predetermined time.

The PRNT signal should be negated in the T2 time after the reception of the TOP signal. Because if the PRNT signal is kept the asserted state until the T2 time elapsed, the LBP 502 feeds the recording paper for the next print operation whether or not the pixel data for the next printing operation is ready.

However, in case where the pixel data for the next printing operation has been ready, the LBP controller 501 asserts the PRNT signal in the T1 time after the reception of the TOP signal. According to this, the printing operation can be carried out at the maximum throughput.

Namely, in case where the pixel data for the next printing operation has been ready, the LBP controller 501 asserts the PRNT signal, which instructs the LBP 502 to continue the printing operation, during the current recording operation. According to this, the maximum ability of the LBP 502 (the number of pages printed per a unit time) can be drawn out.

The construction of the facsimile apparatus of the fourth embodiment is same as that of the third embodiment shown in FIG. 13. In the fourth embodiment, the received data is also encoded and stored in the image memory III and the encoded data stored in the image memory III is decoded and transferred to the line buffer 109 in the same way as the third embodiment. So the data transfer from the line buffer 109 to the LBP (page printer 110) will now be described.

After the start of the printing operation, the PRNT signal is asserted when a predetermined number of lines of the pixel data is stored in the line buffer 109. After that, the LBP controller 501 communicates with the LBP 502 by an interruption which occurs every few milliseconds.

Figure 23:
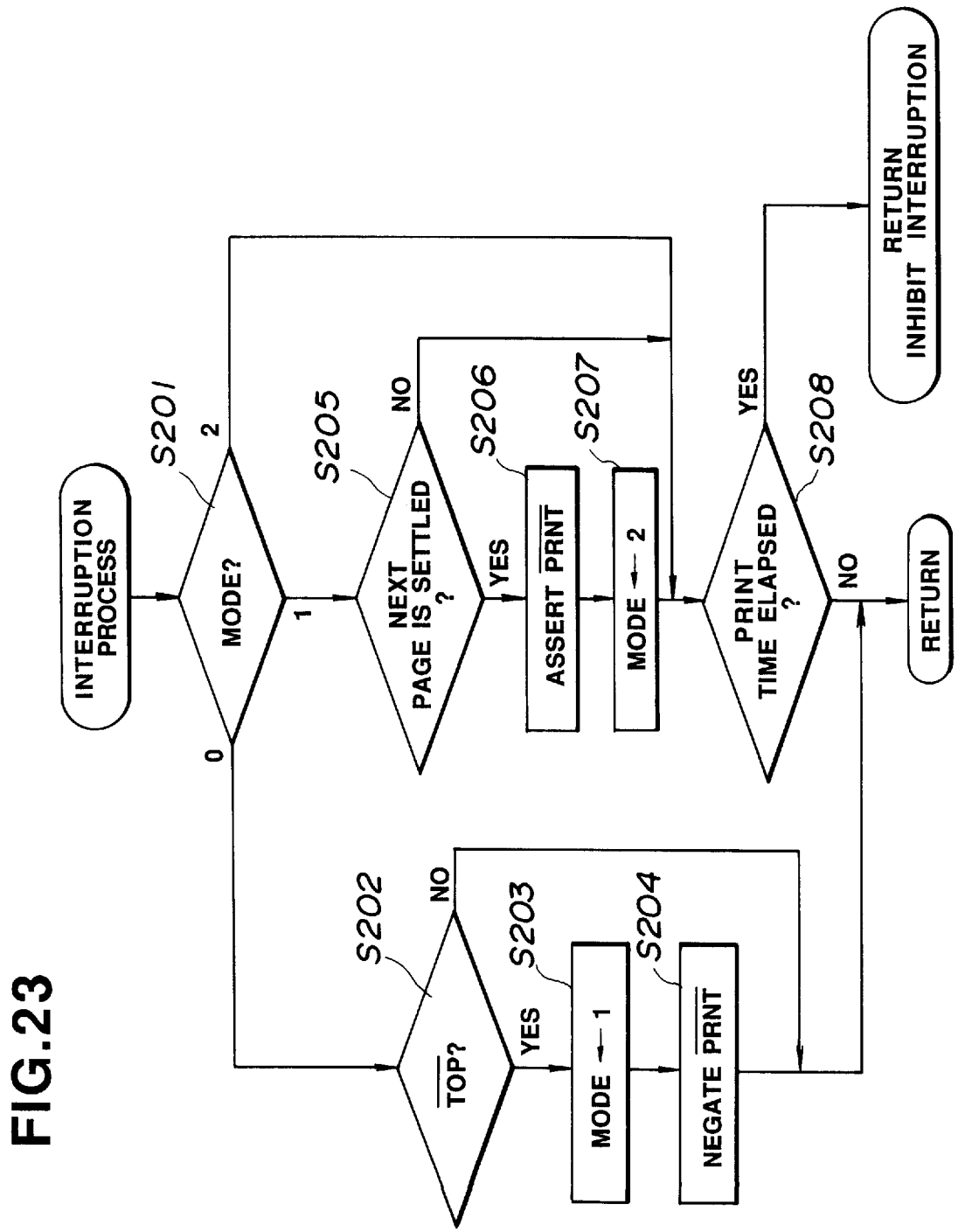
FIG. 23 is a flow chart which shows an interruption process.

FIG. 23 is a flow chart which shows the interruption process of the LBP controller 501.

After asserting the PRNT signal, the LBP controller 501 sets a control parameter MODE for "O" and enables the interruption process.

After that, whenever the interruption occurs, the LBP controller 501 monitors the value of the control parameter MODE (step S201). If the value is "O", the LBP controller 501 determines whether or not the TOP signal has been received (step S202). If the TOP signal has not been received, the LBP controller 501 returns from the interruption process. However, if the TOP signal has been received, the LBP controller 501 sets the control parameter MODE for "1" (step S203), negates the PRNT signal (step S204) and returns from the interruption process.

On the other hand, if the LBP controller 501 monitors that the control parameter MODE is "1" in the step S201, the LBP controller 501 determines whether or not the next page has been settled (step S205).

If the next page has been settled, the LBP controller 501 asserts the PRNT signal for the next print operation prior to the completion of the current printing operation (step S206). Then the LBP controller 501 sets the control parameter for "2" (step S207).

In case where the value of the control parameter MODE is "2" (step S201) or the next page has not been settled (step S205), the LBP controller 501 determines whether or not the print time which is necessary to print a page of an image has elapsed (step S208). If the print time has not elapsed, the LBP controller 501 returns from the interruption process. On the other hand, if the print time has elapsed, the LBP controller 501 returns from the interruption process and inhibits the interruption process.

The above described interruption process is repeated in the case where a plurality of pages of image are printed.

As described above, if the LBP controller 501 decides that the next page has been settled in the T1 time (step S205), the LBP controller 501 asserts the PRNT signal in the T1 time as shown in FIG. 22 (B). Namely, the PRNT signal is asserted prior to the completion of the current printing operation. Accordingly, the TOP signal for the next printing operation can be received quickly, so the received image can be printed with the maximum ability of the LBP 502.

The operation of the buffer controller 108 will now be described by reference to FIG. 21.

The line synchronization signal BD is outputted from the page printer 110 at the period T. After the predetermined time since the reception of the TOP signal, whenever the BD signal is received, the buffer controller 108 read out a line of the pixel data from the line buffer 109 with a predetermined time delay.

Therefore, a new line of the pixel data should be stored in the line buffer 109 in the predetermined time (t). FIG. 21 shows an example in case where the print resolution of the page printer 110 is equal to the resolution of the original document represented by the received code data. On the other hand, in case where the resolution of the original document is a half of the print resolution, each line of the pixel data may be read out twice from the line buffer 109.

Another operation of the LBP controller 501 will now be described.

As shown in FIG. 24(A), the LBP controller 501 does not negate the PRNT signal even if the TOP signal is received. Then, if the LBP controller 501 decides that the NULL code is not written in the page management record of the page (#N) which is currently printed, the page management record is connected to the further page management record of the next page (#N+1) by the pointer and the page settlement code is written in the page management record of the next page prior to the elapse of the T2 time, the LBP controller 501 keeps the PRNT signal the asserted state so as to instruct the LBP 502 to continue the printing operation.

Therefore the LBP 502 feeds the recording paper for the next printing operation (#N+1 page) at the minimum interval.

However, if the LBP controller 501 does not decide the above described conditions prior to the elapse of T2' time which is little shorter than the T2 time, the LBP controller 501 may negate the PRNT signal as shown in FIG. 24(B).

As described above, the T2 time defines a period in which the printing operation can be stopped after the completion of the current printing operation by negating the PRNT signal after the reception of the TOP signal. Namely, even if the PRNT signal is negated after the elapse of the T2 time, the LBP 502 feeds the recording paper for the next printing operation whether or not the pixel data for the next printing operation is ready.

Accordingly, in case where the pixel data for the next printing operation is not ready in the T2 time, the LBP controller 502 negates the PRNT signal. After that, if the pixel data for the next printing operation is not ready in the T2 time, the LBP controller 502 negates the PRNT signal. After that, if the pixel data for the next printing operation is ready, the LBP controller 502 asserts the PRNT signal so as to feed the recording paper for the next printing operation.

Figure 25:
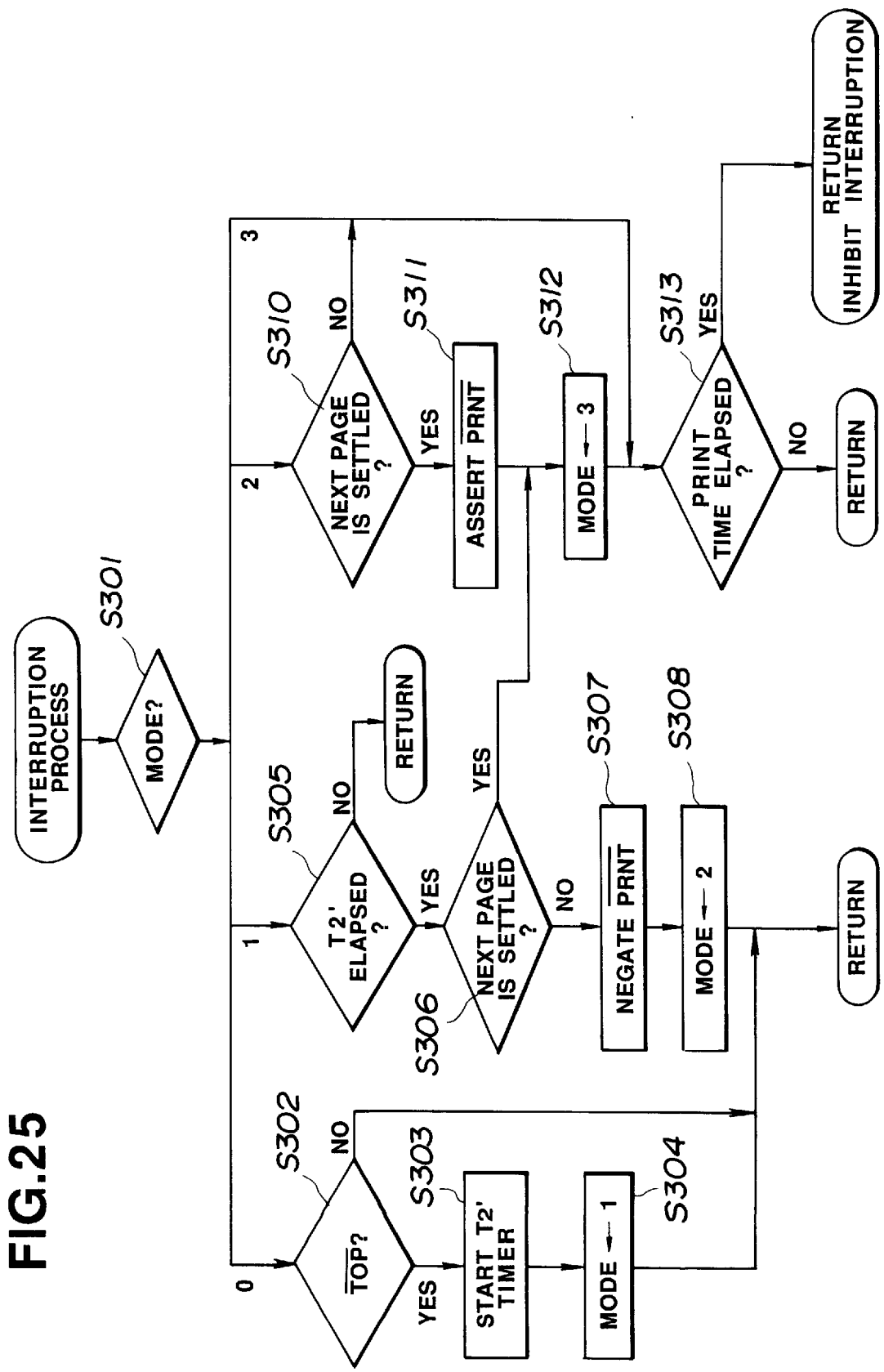
FIG. 25 is a flow chart which shows an interruption process.

FIG. 25 is a flow chart which shows the interruption process of another operation of the LBP controller 501.

Whenever the interruption occurs, the LBP controller 501 monitors the value of the control parameter MODE (step S301) and diverges to associated processes. If the value is "0", the LBP controller 501 determines whether or not the TOP signal has been received (step S302). If the TOP signal has not been received, the LBP controller 501 returns from the interruption process. However, the TOP signal has been received, the LBP controller 501 starts a T2' timer which counts the T2' time which is little shorter than the T2 time (step S303), sets the control parameter MODE for "1" (step S304) and returns from the interruption process.

On the other hand, if the LBP controller 501 monitors that the value of the control parameter MODE is "1" in the step S301, the LBP controller 501 determines whether or not the T2' timer has counted up (step S305). If the T2' timer has not counted up, the LBP controller 501 returns from the interruption process. However, if the T2' timer has counted up, the LBP controller 501 determines whether or not the next page has been settled (step S306).

If the next page has been settled, the LBP controller 501 advances to a step S312 without negating the PRNT signal which has been already assented. Accordingly, prior to the completion of the current printing operation, the recording sheet for the next printing operation is fed at the minimum interval.

However, if the next page has not been settled, the LBP controller 501 negates the PRNT signal (step S307), sets the control parameter MODE for "2" step S308) and returns from the interruption process.

On the other hand, if the LBP controller 501 monitors that the value of the control parameter MODE is "2", the LBP controller 501 determines whether or not the next page has been settled (step S310). If the next page has been settled, the LBP controller asserts the PRNT signal so as to feed the recording paper for the next printing operation prior to the completion of the current printing operation (step S311) and sets the control parameter MODE for "3" (step S312).

However, in case where the next page has not been settled (step S310) or the value of the control parameter MODE is "3" (step S301), the LBP controller 501 determines whether or not the print time which is necessary to print a page of an image has elapsed (step S313). If the print time has not elapsed, the LBP controller 501 returns from the interruption process. On the other hand, if the print time has elapsed, the LBP controller 501 returns from the interruption process and inhibits the interruption process.

As described above, in the case where the readiness of the next page for printing is quickly achieved in the T2 time, the received image can be printed with the maximum ability of the LBP. Therefore, the print operation can be efficiently carried out at the print speed suitable for the transfer speed of the received image.

In the fourth embodiment, the LBP is used as the page printer. However, a thermal transfer printer, an ink-jet printer or a heat sensitive printer may be used as the page printer. In these types of printers, it is not necessary to print an image at a constant speed. However, according to the construction of the above described embodiment, an image can be printed at a constant speed by using these types of printers. Therefore, the quality of an image printed on a recording paper can be improved.

Figure 26:
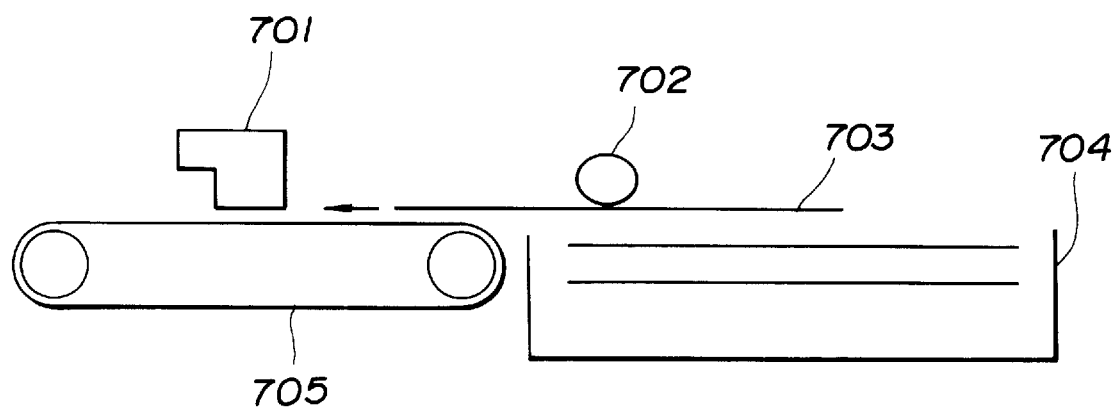
FIG. 26 is a drawing which shows a construction of an ink-jet printer.

FIG. 26 shows a construction of the ink-jet printer.

A recording paper 703 is fed by a feed roller 702 from a feed cassette 704 and transported at a constant speed by a transport belt 705. An ink-jet cartridge 701 ejects an ink drop in accordance with supplied pixel data and prints an image on the recording paper 703.

In case where the construction of the above embodiment is adopted to the ink-jet printer, if the code data of the next page is ready prior to the completion of the current printing operation, the recording paper for the next printing operation can be fed immediately after the completion of the current printing operation or the preparatory operation such as the position adjustment of the ink-jet cartridge (head) can be carried out in advance.

In the description of the fourth embodiment, the reception operation is mainly described. However, the memory copy operation, which stores in the image memory pixel data obtained by reading an original document with a scanner and prints images on a plurality of recording papers in accordance with the number set by keys on the operation console, may be carried out in the same way.

In the memory copy operation, the LBP controller may determine whether or not the next page has been settled by determining whether the count value, which is set by the key and is decreased every time the image is printed on a recording paper, is "0" or not.

As described above, the decoding operation and the printing operation can be carried out in parallel by providing a small capacity memory, so the facsimile apparatus having a page printer can be provided at a low cost.

A fifth embodiment of the present invention will now be described.

Figure 27:
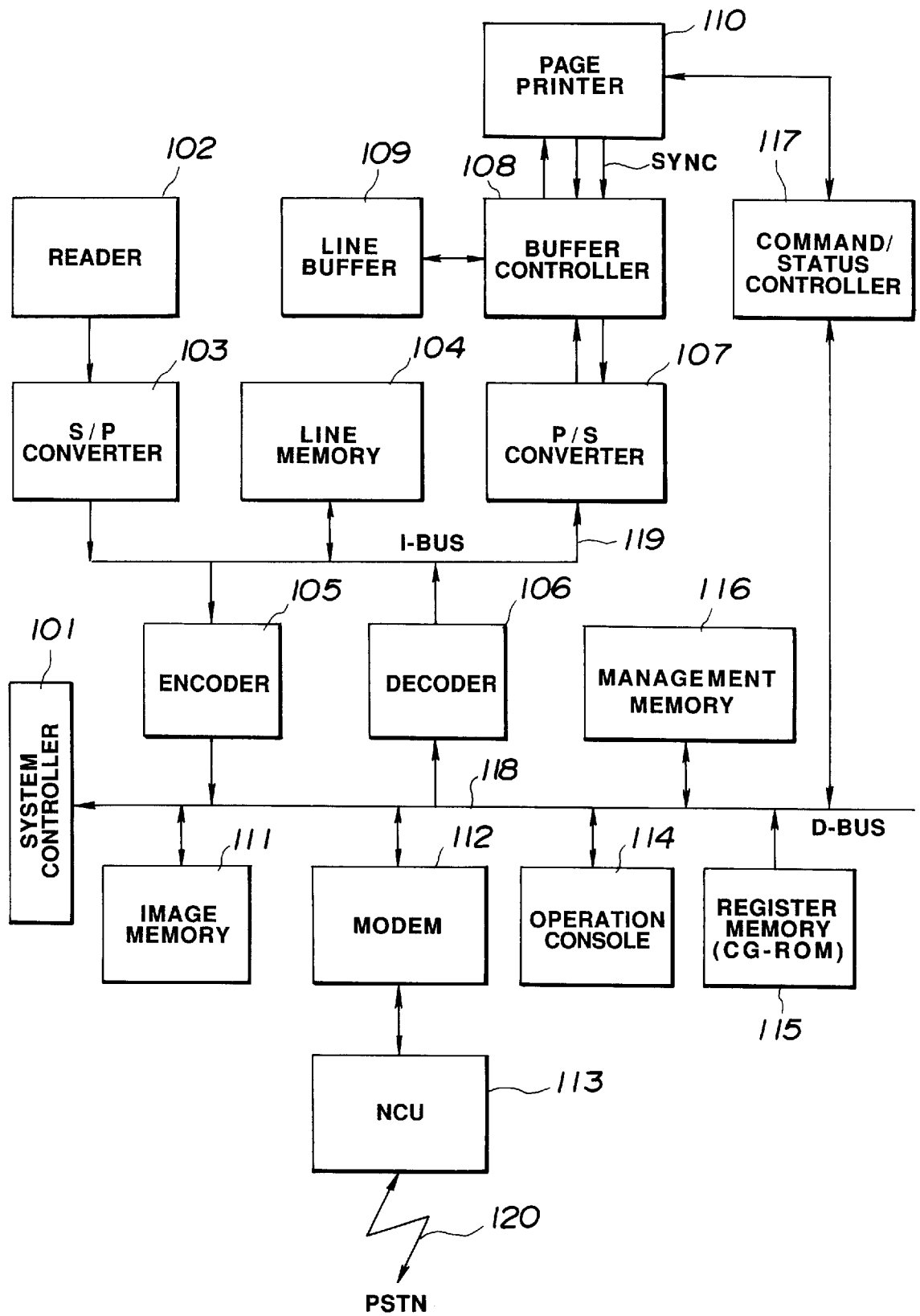
FIG. 27 is a block diagram which shows a structure of a facsimile apparatus of a fifth embodiment.

FIG. 27 is a block diagram which shows a structure of a facsimile apparatus of the fifth embodiment. The construction shown in FIG. 27 is almost the same as that shown in FIG. 13.

A decoder 106 is similar to the decoder 3 shown in FIG. 8, but does not include the P/S converter 825 and the output controller 826. These two components are included in a P/S converter 107 in FIG. 27.

A buffer controller 108 and a line buffer 109 are the same as the buffer controller 4 and the line buffer 5 shown in FIG. 9.

First, the reading operation will now be described.

Pixel data obtained by reading an original document with a reader 102 is converted into parallel pixel data by a S/P converter 103. The parallel pixel data is sequentially stored in a line memory 104.

A decoder 105 sequentially encodes the pixel data stored in the line memory 104 and stores the encoded pixel data (code data) in an image memory III.

According to the above process, the whole image of the original document is stored in the image memory III. The detailed operation will be described by reference to FIG. 28.

Figure 28:
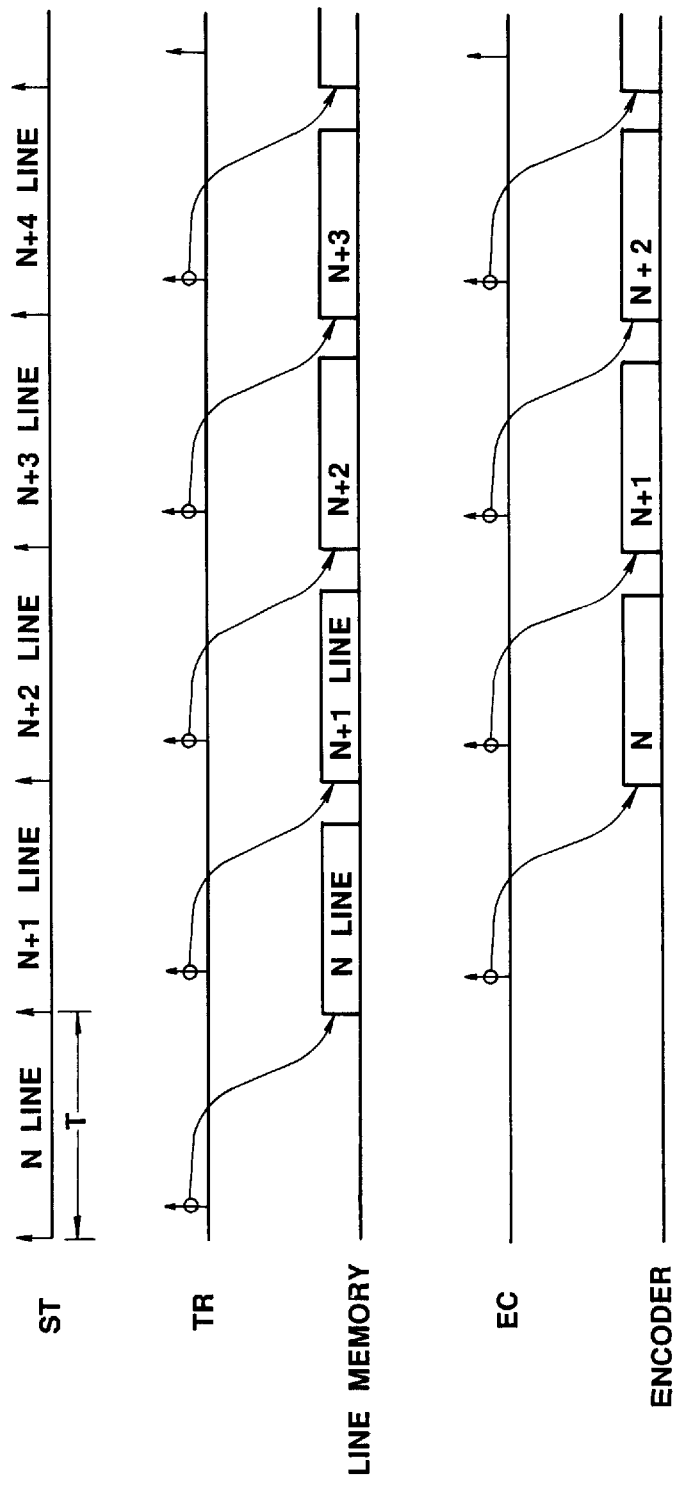
FIG. 28 is a timing charge which shows a reading operation.

FIG. 28 is a timing chart which shows the reading operation. T denotes the storage period of a CCD in the reader 102.

In response to the read instruction from the system controller 101, the reader 102 determines whether or not the line memory 104 has a space. In case where the space are there in the line memory 104, storage start signal ST is generated at the period T so as to initiate the storage operation of the CCD. During the period in which the storage operation of #N line is being carried out, the reader 102 outputs a transfer instruction TR to the line memory 104.

In the next period, the storage operation of N+1 line is carried out and the pixel data of N line is transferred to the line memory 104 via the S/P converter 103. At this time, the S/P converted 103 outputs an encoding start signal EC to the encoder 105.

Then, during the period in which #N+2 line is being read and the storage operation of #N+2 line is being carried out, the reader 102 transfers the pixel data of #N+1 line to the line memory 104 via the S/P converter 103. At the same time, the line memory 104 transfers the pixel data of #N line to the encoder 105 and the encoder 105 transfers the encoded pixel data of N line to the image memory III.

Next, the memory transfer operation will be described.

The original document is read in the aforementioned reading operation method. When the communication route to the receiver is set up, the decoder 106 decodes the encoded pixel data stored in the image memory III and stores the pixel data in the line memory 104. The pixel data stored in the line memory 104 is encoded by the encoder 105 in according to the encoding method corresponding to the ability of the receiver. Then, the encoded pixel data is transmitted via the MODEM 112 and the NCU 113.

Next, the reception operation will be described.

The speed of the reception of the code data from the PSTN is different from that of the printing of the page printer 110, so the reception operation is carried out by the following two independent processes.

(1) The process for storing the received code data in the image memory III.
(2) The process for printing an image on the basis of the code data stored in the image memory III.

Figure 29:
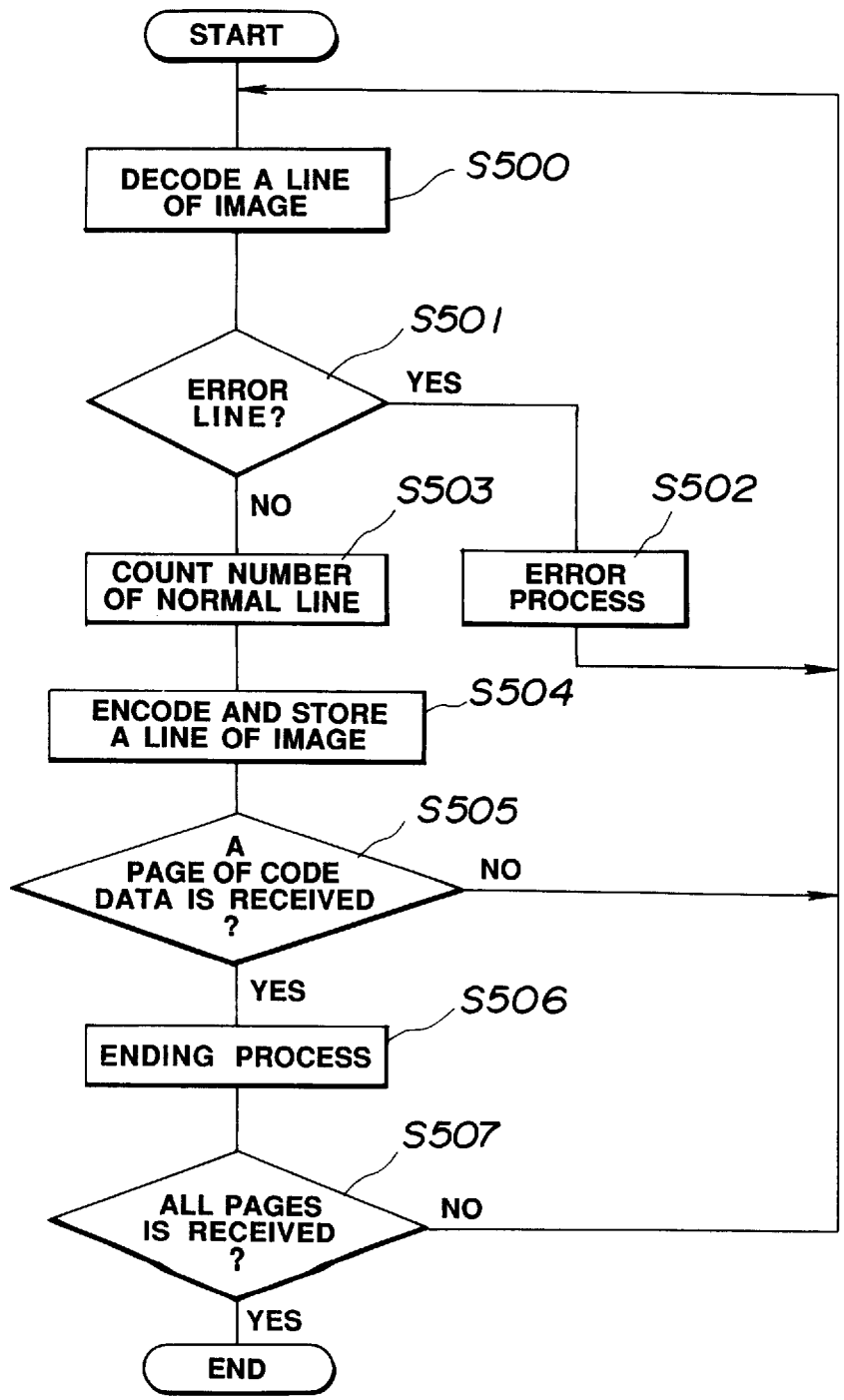
FIG. 29 is a flow chart which shows a storing process.

FIG. 29 is a flow chart which shows the process (1).

The system controller 101 sequentially decodes the code data which is received via the NCU 113 and the MODEM 112 (step S500). The system controller 101 determines whether or not the image line obtained by the decoding operation is an error line (step S501).

In case where the image line is not an error line, the number of normal lines is increased and memorised (step S503). On the other hand, in case where the image line is an error line, an error process is performed (step S502).

The pixel data of the normal line is sequentially encoded by the system controller 101 in accordance with the predetermined encoding method and thus obtained code data is stored in the image memory III (step S504).

It is because the size of the received image is determined prior to the image printing that the number of the normal lines is counted and memorized. Namely, if the size of the image to be printed is larger than that of a pre-cut sheet, the received image is separately printed on a plurality of the pre-cut sheets. Accordingly, the number of the pre-cut sheets on which the received image is to be printed is determined in accordance with the number of the normal lines.

After that, if the system controller 101 decided that the reception of a page of the code data is completed (step S505), an ending process is performed (step S506). In case where the system controller 101 decides that all pages of the code data has been received (step S507), the storing process (1) is completed.

After a page of the received image is stored in the image memory III, the above process (2) is initiated.

The code data stored in the image memory III is decoded by the decoder 106 and the pixel data obtained is sequentially stored in the line buffer 109. The decoding operation of the code data, the storage operation of the pixel data in the line buffer 109 and the transfer operation of the pixel data from the line buffer 109 to the page printer 110 are carried out in the same ways as the first embodiment described by reference to FIGS. 8, 9 and 2. A SYNC signal in FIG. 27 corresponds to the signal (d) shown in FIG. 2 or the BD signal shown in FIG. 9.

A PRINT signal which requests to print a page of an image is outputted from the system controller 101 to the page printer 110 via the command/status controller 117.

The page printer 110 starts feeding the recording paper in response to the PRINT signal and outputs a leading edge synchronization signal TOP when the leading edge of the recording paper is detected by a paper sensor which is provided at a predetermined position on a paper transport pass. The page printer 110 also outputs a line synchronization signal SYNC upon receiving the PRINT signal.

Figure 30:
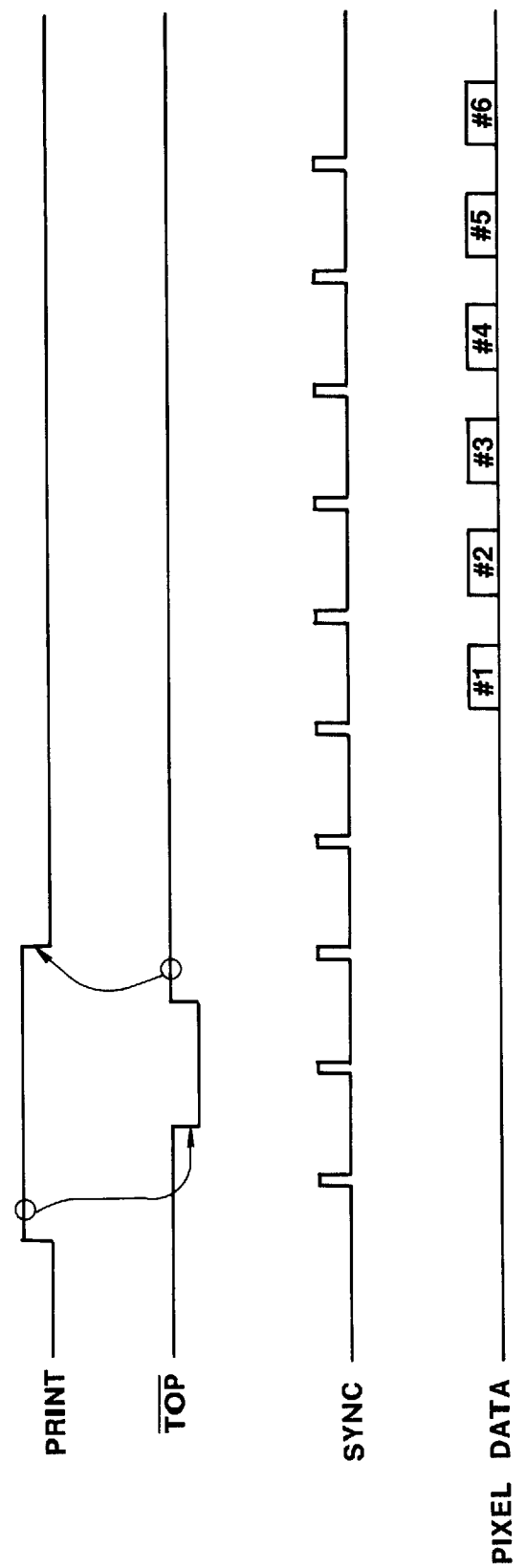
FIG. 30 is a timing chart which shows a registration operation.

The buffer controller 108 watches the TOP signal and the SYNC signal (BD) and supplied the pixel data to the page printer 110 when a predetermined number of the SYNC signals are detected after the detection of the leading edge of the TOP signal. In this way, the leading edge of the recording paper and the image printing position are registered. FIG. 30 is a timing chart which shows the above registration operation. The pixel data stored in the line buffer 109 is supplied to the page printer in the same way as described above by reference to FIG. 14.

The copying operation will be described.

The operation, which stores in the image memory III the code data obtained by reading an original document and encoding pixel data, is carried out in the same way as the reading operation described above. The operation, which prints an image on the basis of the code data stored in the image memory III, is carried out in the same way as the process (z) of the reception operation.

The report printing operation will now be described.

The report printing operation which prints character image of an activity report which informs the result of a transaction, such as the date and time of the transaction, the name and telephone number of the sending or receiving party or the number of pages of the document, will be described by reference to FIG. 31.

The system controller 101 reads out activity report data from the management memory 116 and analyses it (step S600). Next, the system controller 101 extracts pixel data corresponding to the activity report data from the register memory (CG-ROM) 115 in order to form image corresponding to the activity report data (step S601).

The system controller 101 makes the decoder 107 the through mode, which outputs the input data without applying the decoding operation, and stores the pixel data from the register memory 115 in the line memory 104 (step S602). In this way, a line of an image representing the activity report is sequentially formed in the line memory 104.

Whenever a line of an image is formed, the system controller 101 makes the encoder 105 encode the pixel data in the line memory 104 (step S603). Then, the code data obtained by the encoder 105 is stored in the image memory III (step S604).

The steps S601–604 are repeated until the whole activity report is encoded and stored in the image memory III (step S605).

After the whole activity report is stored in the image memory III, the activity report is printed by the page printer on the basis of the code data stored in the image memory III in the same way as the process (2) of the reception operation (step S606).

Next, the report printing operation, which prints an error transmission report formed by merging a report image representative of the facsimile number of the other party with an image of the first page of the undelivered document, will now be described.

The error transmission report may be printed in one of the following two ways. In case where the error transmission report is printed, it may be a problem that the resolution of the report image and the size of the recording paper on which the error transmission report is printed are not always same as the resolution and the size of the undelivered document.

In a first way to print the error transmission report, a page of an image which is composed of the report image and the undelivered document image is previously formed in the image memory III, in accordance with the resolution of the report image and the size of the recording paper.

Namely, the system controller 101 forms the report image on the basis of the activity report data stored in the management memory 116 and stores it in the image memory III. After that, the decoder 106 decodes the code data representing the undelivered document which is stored in the image memory III and stores the pixel data representing the undelivered document in the line memory 104. Then, the encoder 105 encodes the pixel data stored in the line memory 104 while converting the resolution and the size of the undelivered document into the resolution of the report image and the size of the recording paper. The encoded undelivered document is stored in the image memory III so as to merge the undelivered document with the report image already stored.

In this case, if the resolution of the undelivered document is lower than that of the report image, the same line of the undelivered document is repeatedly encoded. On the contrary, if the resolution of the undelivered document is higher than that of the report image, the pixel data obtaned by decoding the code data of the undelivered document is thinned out at a line unit and the thinned out pixel data is encoded and stored in the image memory III.

On the other hand, the size of the report image is generally decided on the assumption that the report image is printed on the recording paper having a minimum width. Accordingly, the case where the size of the undelivered document is larger than that of the recording paper may occur. In this case, the pixel data of the undelivered document from the line memory 104 is encoded by the encoder 105 while reducing the size of the undelivered image in the main scanning direction.

According to this, a page of an image which is composed of the report image and the undelivered document image is formed in the image memory III. The error transmission report is printed on the code data stored in the image memory III in the same way as the process (2) of the reception operation as described above.

In a second way to print the error transmission report, the report image is formed and stored in the image memory III independently of the undelivered document. The decoder 106 decodes the report image and the undelivered document independently, and the pixel data representing the report image and the pixel data representing the undelivered document are merged during the print operation.

The advantage of the second way is that the memory space using for printing the error transmission report is smaller than the first way. The differences in the resolution and the size between the report image and the undelivered document are adjusted by repeating or thinning out of the image line which is transferred from the decoder 106 to the P/S converter 107 and thinning out of the pixel data at the P/S converter 107.

Figure 32:
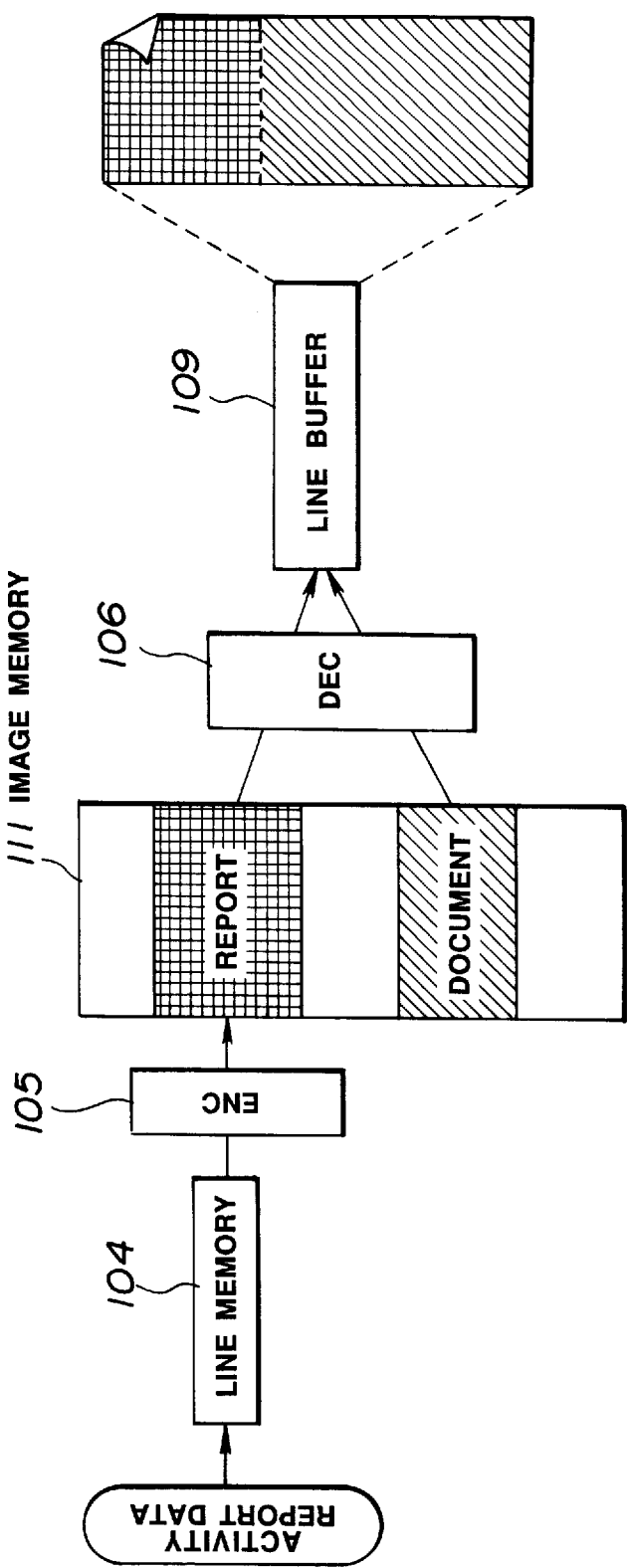
FIG. 32 is a drawing which shows a way to print an error transmission report.

FIG. 32 is a drawing which shows the second way to print the error transmission report.

First, a line of pixel data is formed on the basis of the activity report data and stored in the line memory 104. The pixel data stored in the line memory 104 is encoded by the encoder 105 and the encoded pixel data (code data) is stored in the image memory III.

Next, the code data representative of the report image stored in the image memory III is sequentially decoded by the decoder 106 and the pixel data representative of the report image is transferred to the line buffer 109. The page printer 110 prints the report image on the recording paper in accordance with the pixel data from the line buffer 109.

After the completion of transferring the pixel data representative of the report image to the line buffer 109, the code data representative of the undelivered document stored in the image memory III is processed in the same way. The page printer 110 prints the undelivered document image following to the report image on the identical recording paper.

Next, the recording printing operation which prints a footnote representative of the reception conditions, such as the date and time of the reception or the number of pages of the received document, at the bottom of the pre-cut and fixed length recording paper, will now be described.

The footnote is generally printed in the following way. Namely, a part of the received document image corresponding to the length determined by deducting the length necessary for the footnote from the length of the recording paper is stored in a page buffer, and then the footnote image is stored following to the received document image in the page buffer.

In this way, a page of an image which is composed of the received image and the footnote image is stored in the page buffer. After that, the pixel data is read out from the page buffer in synchronism with the synchronization signal from the page printer and the received document image is printed together with the footnote.

The report printing operation, which prints the received document image together with the footnote using line buffer instead of the page buffer, will now be described.

As described above, the facsimile apparatus, which prints an image on a pre-cut and fixed length recording paper, may print a page of a document on a plurality of recording papers separately. If the footnote is added to every received document, the footnote is added to the last page only among a plurality of separated document images.

On the other hand, in case where the received image is reduced and printed, the footnote image is also reduced.

In view of the above inconveniences, in this embodiment, the footnote image is encoded and stored in the image memory III.

After that, the code data representative of the received document image stored in the image memory III is decoded and the pixel data representative of the received document image is stored in the line buffer 109. Then, the pixel data is transferred from the line buffer 109 to the page printer 110 until a part of the received document image corresponding to the length determined by deducting the length necessary for the footnote from the length of the recording paper has been printed.

Next, the code data representative of the footnote image already stored in the image memory III is decoded and the pixel data representative of the footnote image is stored in the line buffer 109. Then, the pixel data is transferred from the line buffer 109 to the page printer 110.

According to this embodiment, the footnote image to be printed can be formed regardless of the print speed of the page printer 110 and the foot image can be printed on each page into which the received document is divided.

The above report printing operation is carried out by independent two processes because the speed of the reception of the code data from the PSTN is different from that of the printing of the page printer 110.

In the first process (reception process), the code data received via the NCU 113 and the MODEM 112 is decoded by the decoder 106 one by one. At the same time, the error line is detected and the number of the normal lines is counted and memorised.

The pixel data of the normal lines is sequentially encoded by the encoder 105 in accordance with a predetermined encoding method and thus obtained code data is stored in the image memory III.

It is because the size of the received image is determined prior to the image printing that the number of the normal lines is counted and memorised. Namely, if the size of the image to be printed is larger than that of a pre-cut recording sheet, the received image is separately printed on a plurality of the pre-cut sheets. Accordingly, the number of the sheet on which the received image is separately recorded is determined in accordance with the number of the normal lines.

After the code data representative of a page of the received document image is stored in the image memory III, the second process (printing process) is performed in parallel with the first process.

In the second process, the system controller 101 reads out from the management memory 116 the footnote data, such as the date and time of the reception, the page of the received document or the page of the separated image, and forms the footnote image line by line in a form of pixel data.

The formed pixel data is sequentially encoded by the encoder 105 and the encoded pixel data is stored in the image memory III as a footnote image file.

After that, the code data representative of the received document image stored in the image memory III is decoded by the decoder 106. Thus obtained pixel data is converted into serial pixel data by the P/S converter 107 and transferred to the buffer controller 108 so as to store in the line buffer 109.

The above operation which converts the pixel data into parallel data and stores it in the line buffer 109 is carried out whenever the line buffer 109 has a space for storing further pixel data.

The printing process described above is temporarily terminated when the code data representative of a part of the received document image corresponding to the length determined by deducting the length necessary for the footnote from the length of the recording paper has been decoded. Then the object of decoding is changed to the footnote image file stored in the image memory III.

On the other hand, in parallel with the storage operation which stores the pixel data obtained by decoding the code data from the P/S converter 107 into the line buffer 109, the buffer controller 108 sequentially reads out the pixel data representative of the received image from the line buffer 109 in synchronism with the line synchronization signal SYNC which is output at a constant period from the page printer 110 to request for outputting a line of the pixel data. At this time, if this is necessary, the same line of the pixel data is repeatedly read out according to the resolution of the received document image.

Figure 33:
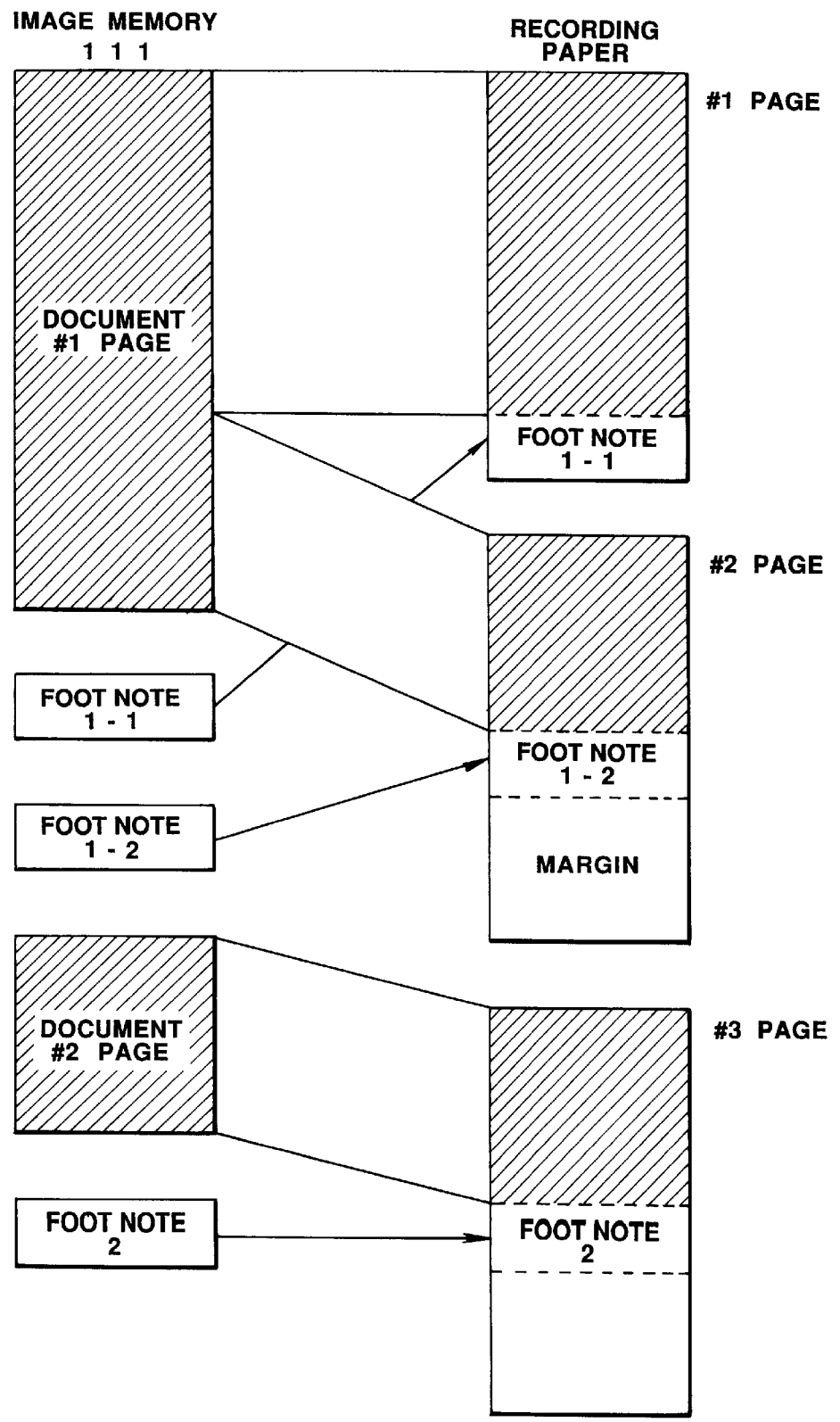
FIG. 33 is a drawing which shows a footnote printing operation.

FIG. 33 is a drawing which shows the printing operation to separate and print the received document image together with the footnote image.

In case where the 1 page of the received document image is longer than the recording sheet, the received document image is printed on two sheets separately and the footnote images 1-1 and 1-2 are added to each separated image. The 2 page of the received document image is treated as a 3 page of the printing image and the footnote image 2 is added to it.

FIG. 34 shows examples of the footnote images 1-1, 1-2,2. Each footnote image includes a reception reference number, reception start time, a reception page number, a total page number and a print page number. Wherein the total page number is printed only if the substitute memory reception is carried out. The print page number is printed so as to indicate the recording paper on which the received image is printed because the reception page number is not equal to the print page number if the received image is divided and printed on a plurality of recording papers separately.

Incidentally, the footnote image 1-2 may be printed on the bottom of the recording paper instead of the end of the received image. For example, all white line data corresponding to the margin of the recording paper is stored prior to the footnote image in the image memory III.

Furthermore, by forming the footnote image file whenever the received image is printed on each recording paper, the memory capacity for temporarily storing the footnote image file can be reduced.

In case where the footnote image does not include the print page number, the footnote image 1-1 may be used as the footnote image 1-2 and it may not be necessary to form the footnote image 1-2.

The operation of the fifth embodiment will now be described in detail by reference to flow charts shown in FIGS. 35–42.

In this embodiment, the operation is controller under multi-task control procedure. Accordingly, a plurality of tasks included in the multi-task is carried out in a time-sharing basis.

Figure 35:
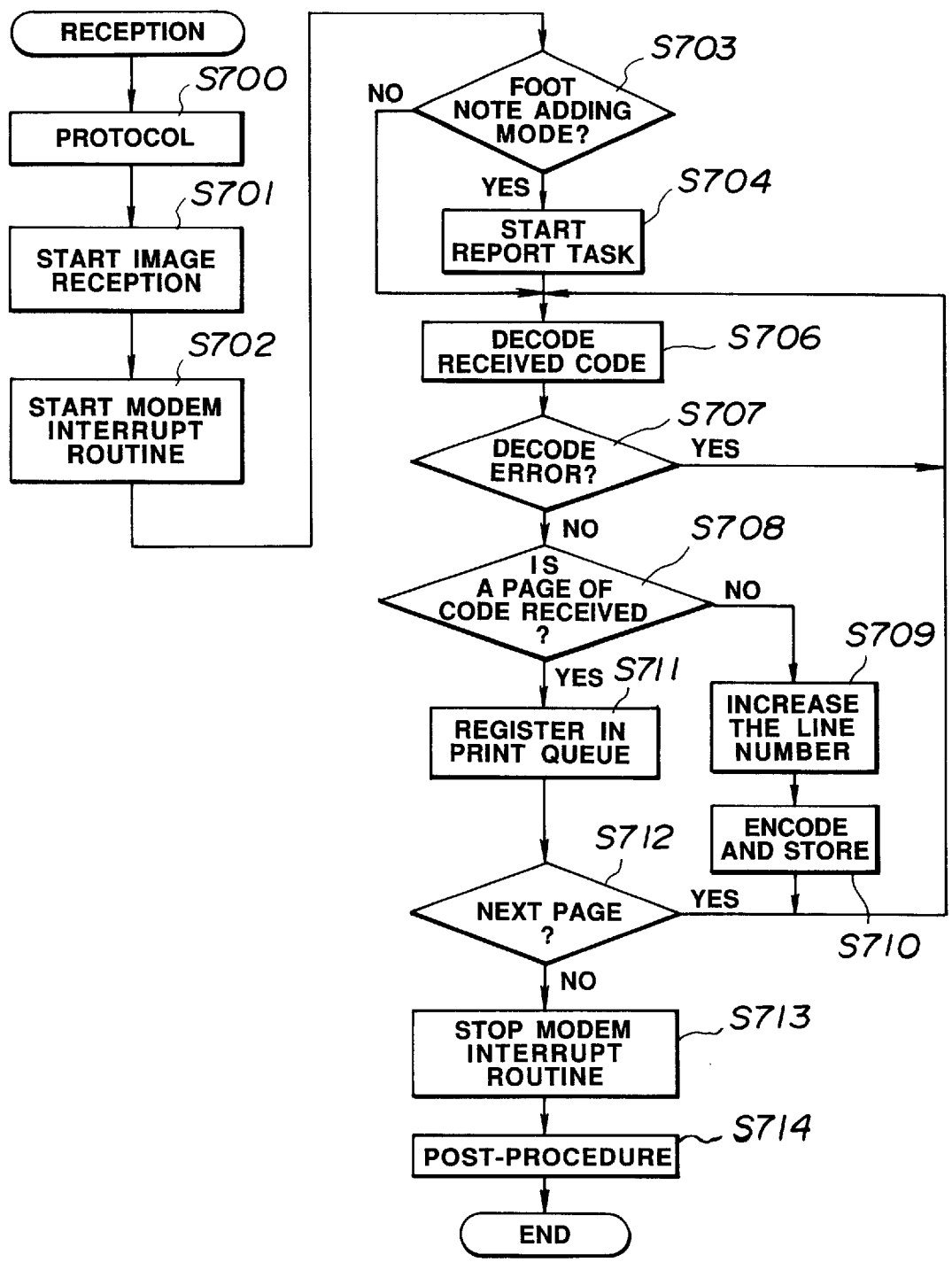
FIG. 35 is a flow chart which shows a reception task.

FIG. 35 is a flow chart of a reception task which is started when the reception operation performs.

The system controller 101 performs a transmission protocol in accordance with G3 transmission procedure etc. (step S700). Then the system controller 101 sets the reception mode and determines whether or not the image can be received under the set reception mode. If the image can be received, the image reception is started (step S701).

After that, the system controller 101 stats a MODEM interrupt routine by which data supplied by the MODEM in a byte unit is stored in a reception (RX) buffer (step S702).

Next, the system controller 101 determines whether or not the footnote adding mode has been set (step S703). If the footnote adding mode has been set, a report task (shown in FIG. 36) is started (step S704). Accordingly, the reception task and the report task are carried out in a time-sharing basis.

A line of code data stored in the RX buffer is decoded one by one (step S706). If a line of code data is decoded without error (step S707), the system controller 101 determines whether or not a page of code data has been received by detecting the protocol signal representative of the end of a page, such as RTC signal including consecutive six EOL signals, from the transmission side (step S708).

If a page of code data has not been received, the number of lines is increased by one (step S709) and the decoded data is encoded again and stored in the image memory III (step S710).

If a page of code data has been received, the page is registered in a print queue in order to print an image of the page (step S711). In case where the page is registered in the print queue, a print task (shown in FIG. 37) is started and the control for the printing operation is carried out.

After that, the system controller 101 determines whether or not the next page of code data is received (step S712). If the next page is received, the next page of code data is processed in the same way (step S706–S711).

If the next page is not received, the system controller 101 stops the MODEM interrupt routine (step S713) and performs a post-procedure of the facsimile transmission (step S714). According to this, the reception task is finished.

In the reception task, when the footnote adding mode is set, the footnote image is stored in the image memory III before the completion of the reception of a page of code data and the footnote image is registered in the print queue together with the page of received image (step S711).

Figure 36:
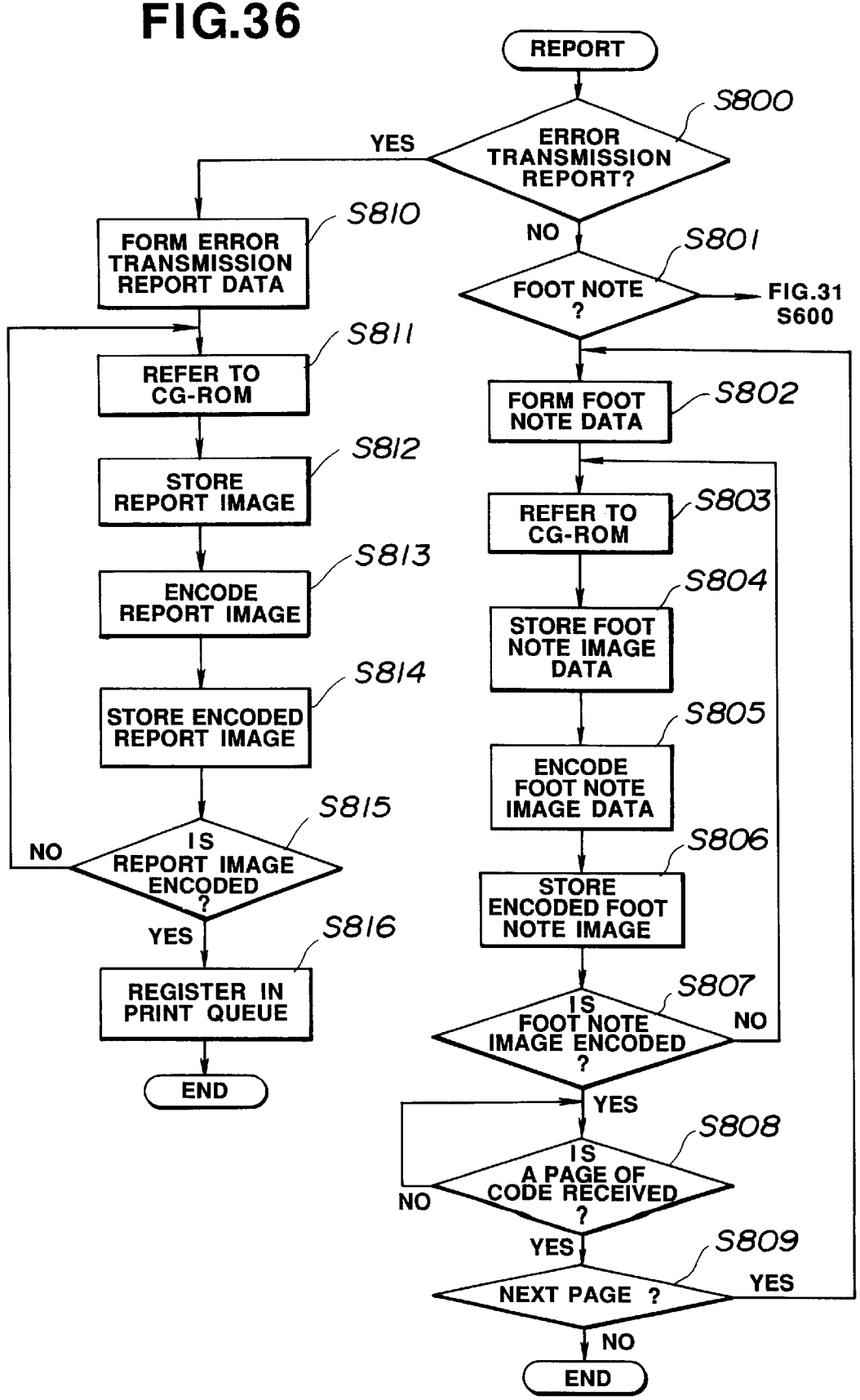
FIG. 36 is a flow chart which shows a report task.

FIG. 36 is a flow chart of a report task.

When the report task is started, the system controller 101 determines whether or not the error transmission report should be printed (step S800) and whether or not the footnote should be printed (step S801). Namely, in case where the image stored in the image memory III has not been transmitted and the report task is started, the system controller 101 determines that the error transmission report should be printed. On the other hand, in case where the report task has been started in accordance with the reception task, the system controller 101 determines that the footnote should be printed.

Figure 31:
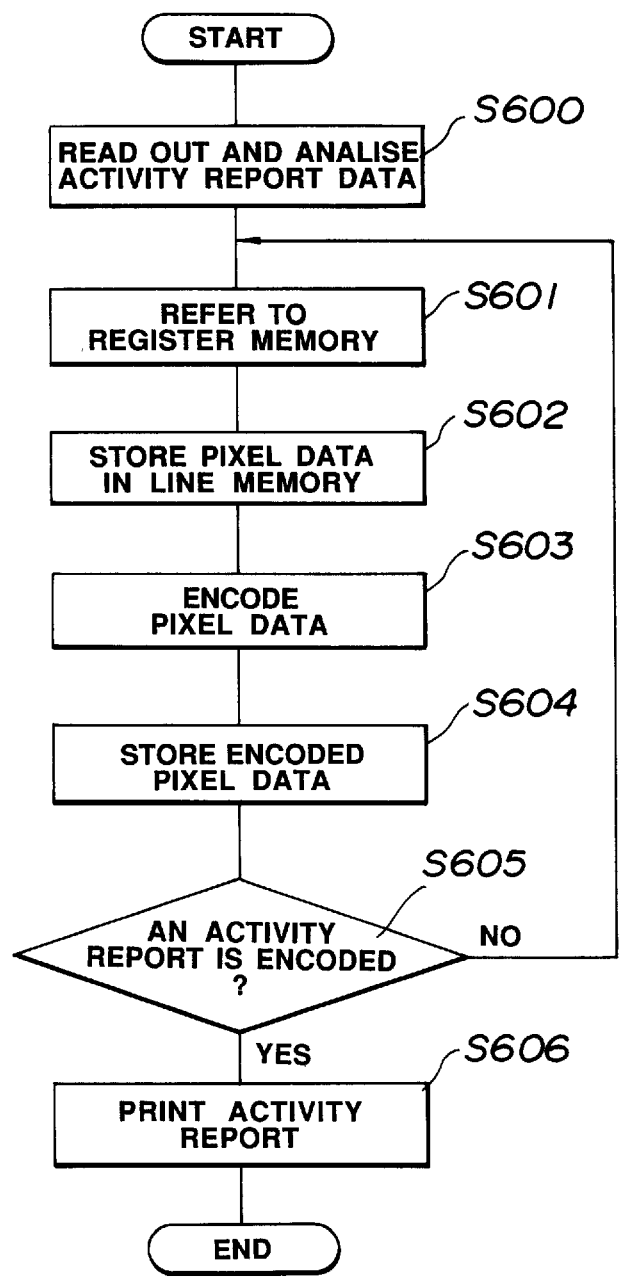
FIG. 31 is a flow chart which shows a report printing operation.

In case where the report task has been started in accordance with other instructions, the system controller 101 determines that the activity report should be printed and performs the report printing operation as shown in FIG. 31.

When the foot image is printed, the footnote data representative of the date and time of the reception, the reception page number etc. is formed (step S802). Then, the footnote data is converted into the pixel data (footnote image) by reference to the CG-ROM in the register memory 115 (step S803) and the footnote image is stored in the line memory 104 (step S804).

The footnote image stored in the line memory 104 is encoded by the encoder 105 (step S805) and the encoded footnote image is stored in the image memory III (step S806).

If the formation of the footnote image is completed (step S807), the system controller 101 waits for the completion of the reception of a page of an image (step S808).

After that, the system controller 101 determines whether or not the next page of code data is received (step S809). If the next page is received, the footnote image for the next page is formed in the same way (step S802–S808). If the next page is not received, the system controller 101 finishes the report task.

In case where the error transmission report is printed, the error transmission report data is formed (step S810). Then, the error transmission report data is converted into the pixel data (report image) by reference to the CG-ROM (step S811) and the report image is stored in the line memory 104 (step S812).

The report data stored in the line memory 104 is encoded by the encoder 105 (step S813) and the encoded report data is stored in the image memory III (step S814).

If the formation of the report image is completed (step S815), the system controller 101 registers the report data in the print queue together with the undelivered document image and finishes the report task.

For forming the error transmission report, the report task is started in accordance with the instruction which is output when the image stored in the image memory III is not transmitted in a transmission task (not drawing).

Figure 37:
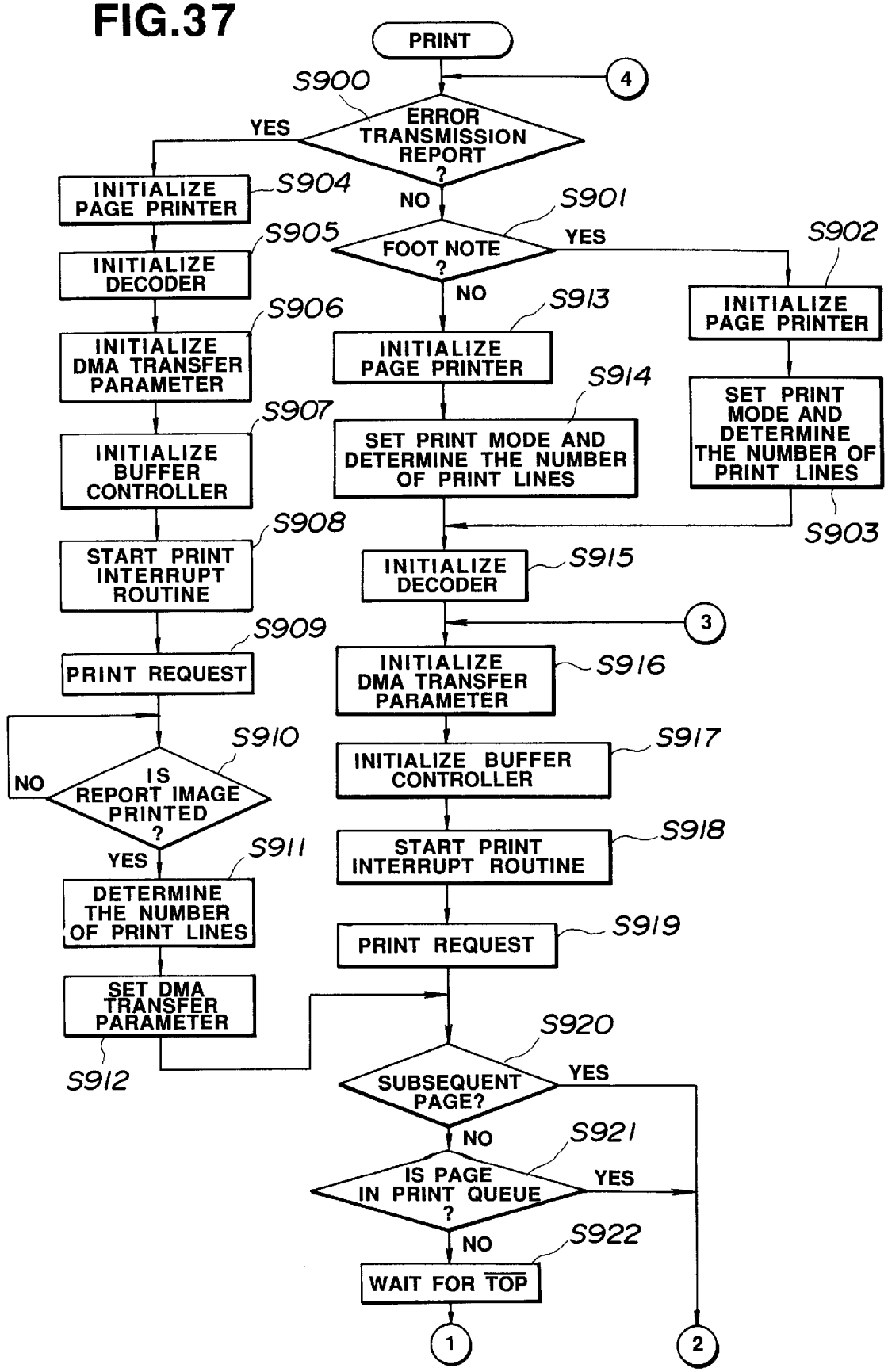
FIGS. 37 and 38 are flow charts which show a print task.
Figure 38:
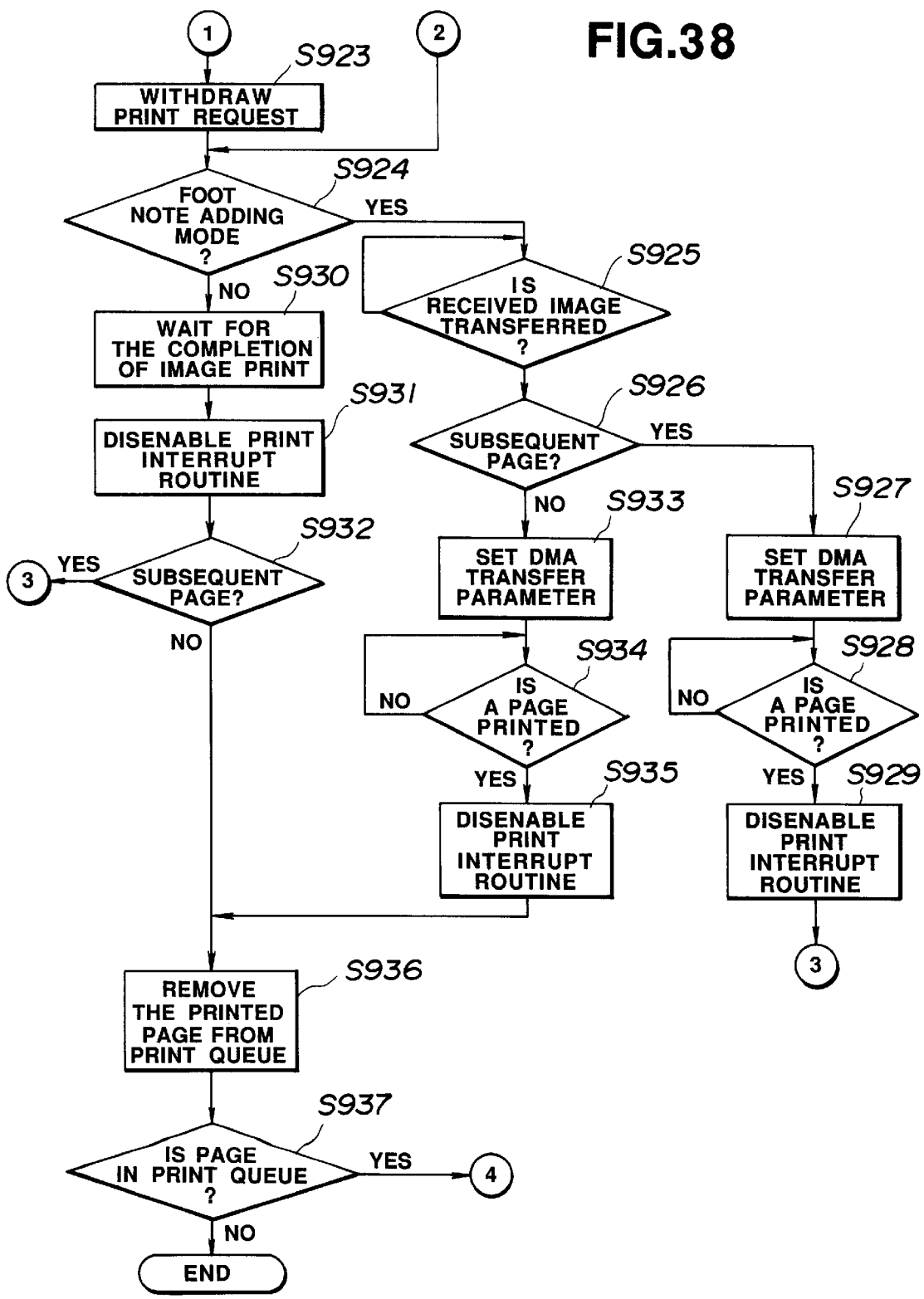

FIGS. 37 and 38 are flow charts of a print task which is started in accordance with the registration in the print queue.

In case where the received image is normally printed or the activity report is printed, the system controller 101 advances to step S913 and initializes the page printer 110 so as to select the size of the recording paper etc.

Next, the print mode is determined in accordance with the number of image lines which are counted in step S709 (FIG. 35). Namely, one to one size print, a reduction print or a separation print is set and the number of print lines is determined in accordance with the size of the recording paper (step S914).

The decoder 106 is initialized so as to set the decoding method and the size of an image to be decoded (step S915).

Then, the system controller 101 initializes the DMA transfer parameter for transferring the code data from the image memory III to a decoder 106 (step S916) and initializes the buffer controller 108 (step S917).

After that, the system controller 101 starts a print interrupt routine (step S918). This print interrupt routine is a timer interrupt routine which performs at a predetermined period which is shorter than the main scanning period of the page printer 110. For example, the main scanning period is 2.7 msec and the period of the timer interrupt routine is 2.0 msec. Then, the system controller 101 outputs the print request by asserting the PRNT signal (step S919).

In case where the error transmission report is printed, the system controller 101 advances to step S904 so as to initialize the page printer 110, set the print mode and determine the number of print lines in the same way as the steps S913 and S914.

Then the system controller 101 initializes the decoder 106 (step S905), the DMA transfer parameter (step S906) and the buffer controller (step S907) so as to transfer the report image data from the image memory III to the decoder 106.

After that, the system controller 101 starts the print interrupt routine (step S908) and outputs the print request (step S909).

The system controller 101 waits for the completion of the print of the report image (step S910). When the report image has been printed, the number of print lines for printing the undelivered document image is determined by deducting the number of image lines of the report image from the number of image lines corresponding to the length of the recording paper (step S911). Then, the DMA transfer parameter is set again for transferring the undelivered document image data (step S912).

On the other hand, in case where the footnote image is printed, the system controller 101 advances to step S902 so as to initialize the page printer 110 (step S902). Then the print mode is set and the number of print lines for printing the received image is determined by deducting the number of image line of the footnote image from the number of image lines corresponding to the length of the recording paper (step S903). After that, the system controller 101 advances to the step S915.

In a step S920, the system controller 101 determines whether or not there is a subsequent page to be printed which has been obtained by dividing a page of a document image. If there is the subsequent page to be printed, the system controller 101 advances to a step S924.

If there is not the subsequent page, the system controller 101 determines whether or not there is a page which is ready for printing by monitoring the print queue (step S921).

If there is not a page which is ready for printing in the print queue, the system controller 101 waits for the TOP signal to be asserted by the page printer (LBP) 11 (step S922).

When the TOP signal is asserted, the system controller 101 negates the PRNT signal in order to withdraw the print request (step S923). Therefore, the page printer 110 does not start the next print operation.

In case where there is a page which is ready for printing in the print queue, the system controller 101 advances to the step S924. Accordingly, if there is a page which is ready for printing, the PRNT signal is kept in its asserted condition so that the page printer 101 prints the next page of an image continuously.

The system controller 101 determines whether or not the footnote adding mode has been set (step S924). This determination is made by determining whether or not the footnote has been registered in the print queue together with the received image to be printed.

If the footnote adding mode has been set, the system controller 101 determines whether or not the received image corresponding to the number of print lines determined in the step S903 has been transferred to the line buffer 109 (step S925). After the received image has been transferred, the system controller 101 determines whether or not there is a subsequent page to be printed which has been obtained by dividing a page of a document image (step S926).

If there is the subsequent page, the DMA transfer parameter is set for transferring the footnote image data from the image memory III to the decoder 106 (step S927) and the system controller 101 waits for the completion of the print of a page of the received image (step S928).

When the received image has been printed, the system controller 101 disenables the print interrupt routine (step S929) and returns to the step S916.

If there is not the subsequent page, the DMA transfer parameter is set for transferring the footnote image data from the image memory III to the decoder 106 (step S933) and the system controller 101 waits for the completion of the print of a page of the received image (step S934).

After that, the system controller 101 disables the print interrupt routine (step S935) and advances to a step S936. On the other hand, in case where the footnote adding mode has not been set, the system controller 101 waits for the completion of the print of a page of the received image (step S930). Then, the print interrupt routine is disabled (step S931).

The system controller 101 determines whether or not there is a subsequent page to be printed which has been obtained by dividing a page of a document image (step S932). If there is a subsequent page, the system controller 101 returns to the step S916 in order to print an image of the subsequent page under the same print mode.

On the other hand, if there is not the subsequent page, the system controller 101 removes the printed page from the print queue (step S936) and determines whether or not there is a page which is ready for printing by monitoring the print queue (step S937). If there is a page which is ready for printing, the system controller 101 returns to the step S900.

Figure 39:
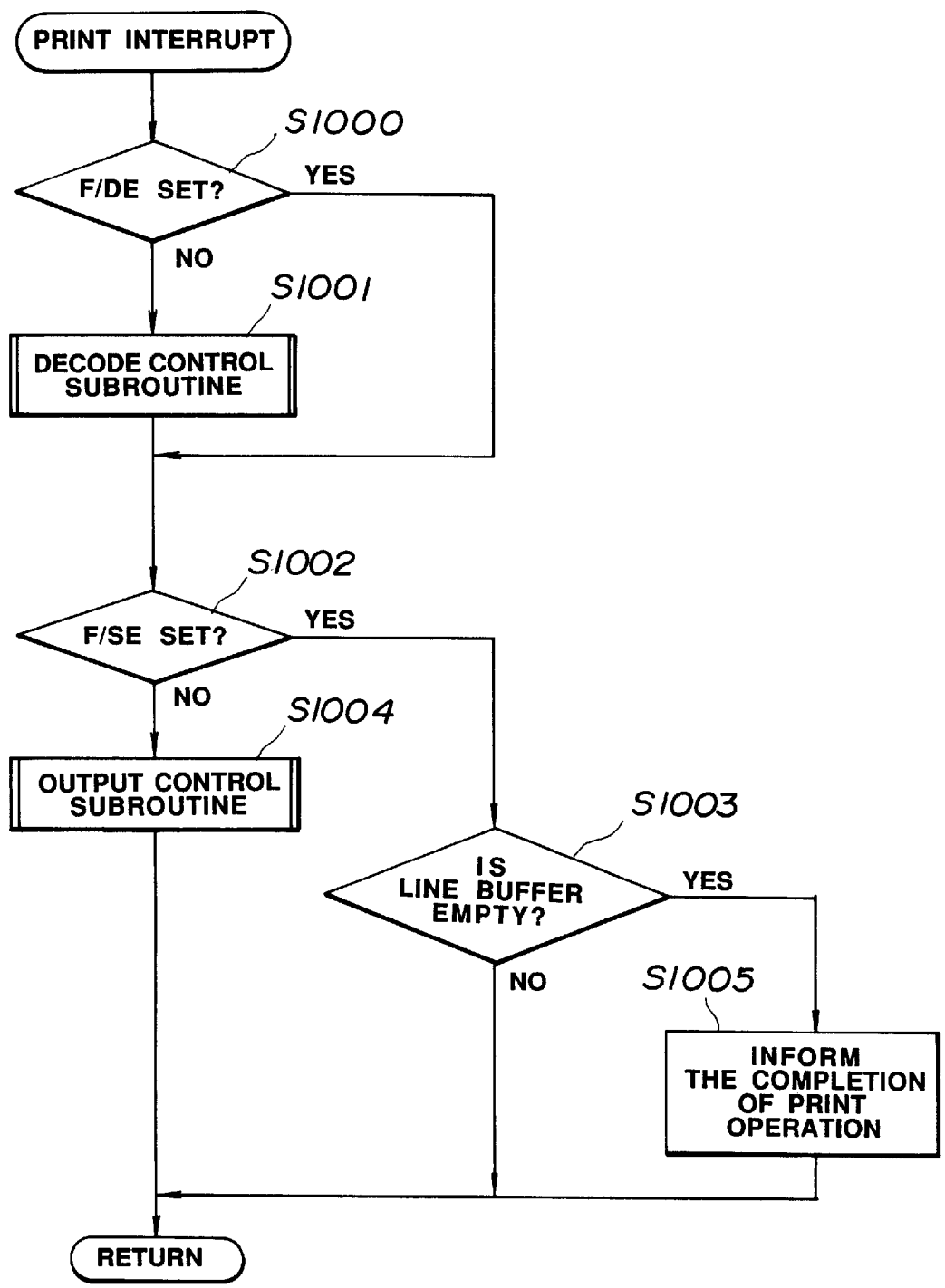
FIG. 39 is a flow chart which shows a print interrupt routine.

FIG. 39 is a flow chart of the print interrupt routine.

The system controller 101 determines whether or not a decode end flag F/DE, which represents that a page of code data has been decoded, has been set (step S1000).

Figure 40:
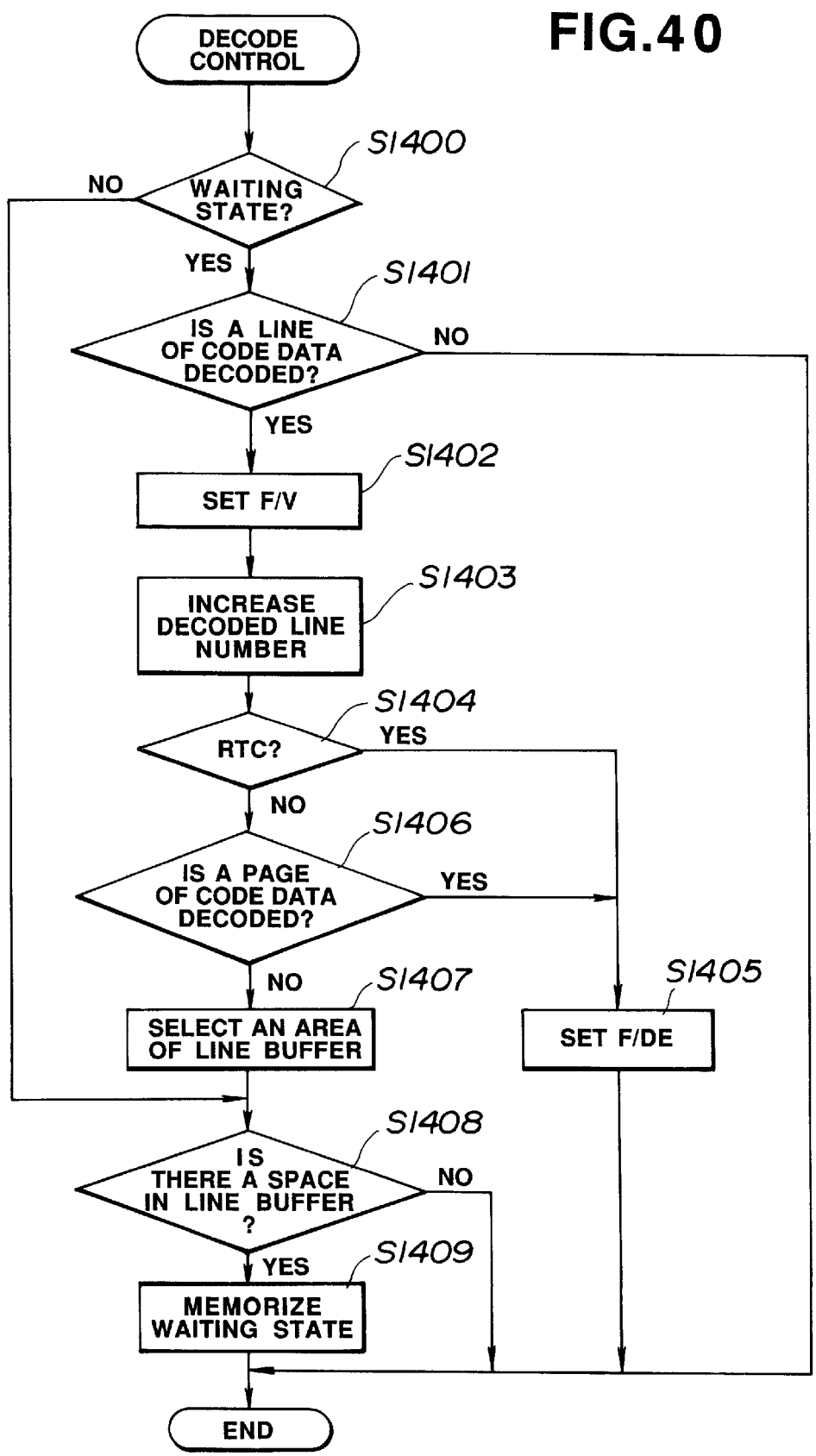
FIG. 40 is a flow chart which shows a decode control subroutine.

If the F/DE has not been set, the system controller 101 performs a decode control subroutine shown in FIG. 40 (step S1001).

After that, the system controller 101 determines whether or not a serial output end flag F/SE, which represents that a line of pixel data has been outputted, has been set (step S1002).

If the F/SE has been set, the system controller 101 determines whether or not all pixel data has been transferred from the line buffer 109 to the page printer 110 by the buffer controller 101 (the line buffer 109 is empty or not) (step S1003). If the line buffer 109 is empty, the completion of the print operation is informed to the main task (step S1005).

Figure 41:
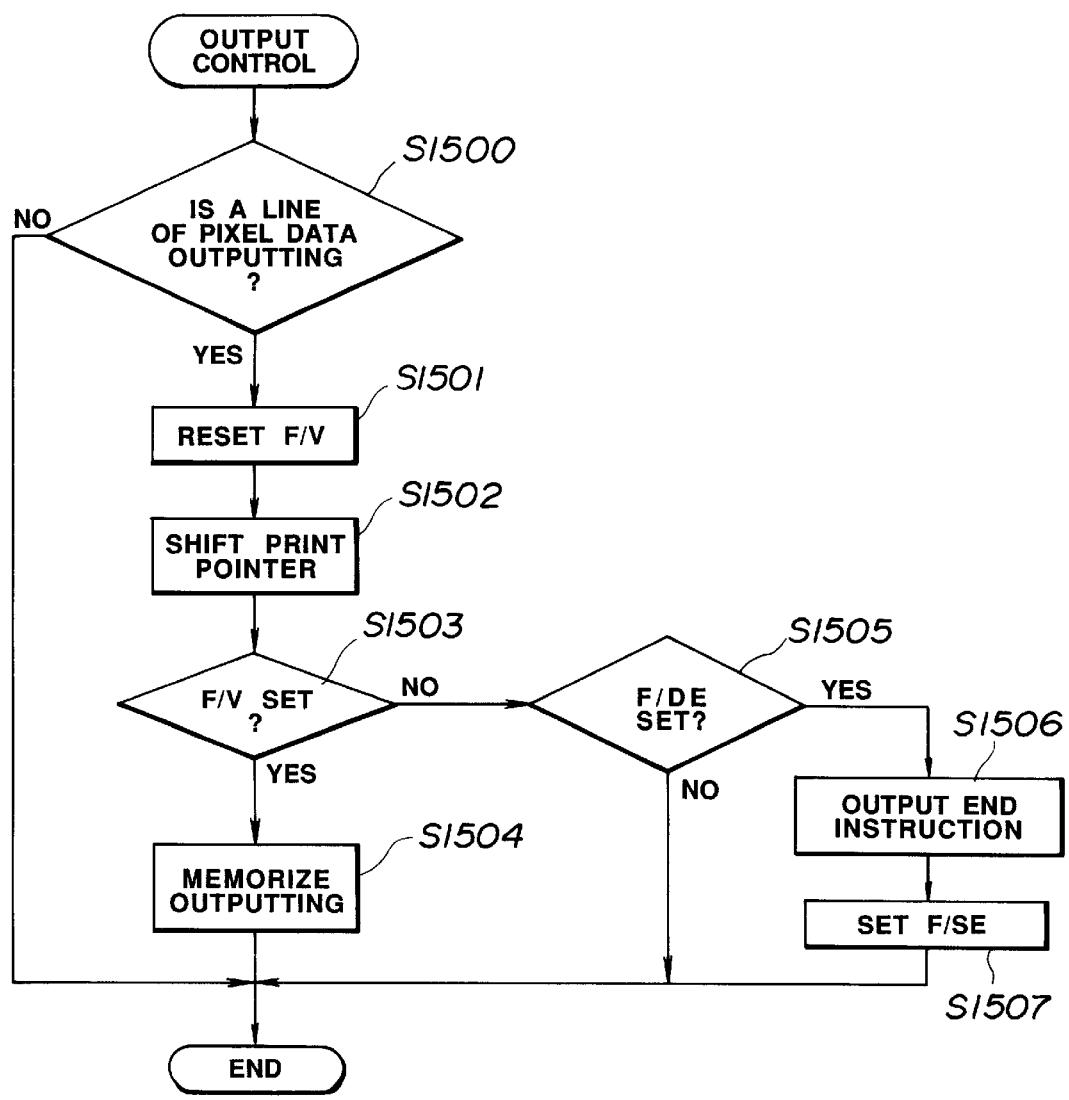
FIG. 41 is a flow chart which shows an output control subroutine.

If the F/SE has not been set, the system controller 101 performs an output control subroutine shown in FIG. 41 (step S1004) and returns to the main task.

FIG. 40 is a flow chart of the decode control subroutine.

The system controller 101 determines whether or not the current state is a waiting state in which the completion of the decoding operation for a line of code data is waited for (step S1400).

If the current state is the waiting state, the system controller 101 determines whether or not a line of code data has been decoded by monitoring the state of the decoder 106 (step S1401).

If a line of code data has not been decoded, the system controller 101 advances to the step S1002 (FIG. 39).

On the other hand, if a line of code data has been decoded, a valid flag F/V is set in an area indicating an area of the line buffer 109 in which a line of pixel data has been stored (step S1402) and the number of decoded lines is increased (step S1403).

After that, the system controller 101 determines whether or not the RTC which represents the end of a page is detected (step S1404). If the RTC is detected, the system controller 101 sets the decode end flag F/DE (step S1405) and returns to the step S1002 (FIG. 39).

If the RTC is not detected, the system controller 101 determines whether or not a page of code data has been decoded on the basis of the counted number of decoded lines (step S1406).

If a page of code data has been decoded, the F/DE is set (step S1405). However, if a page of code data has not been decoded, the system controller 101 selects an area of the line buffer 109 for storing pixel data which will be obtained by the next decoding operation (step S1407).

The system controller 101 determines whether or not there is enough space to store the pixel data in line buffer 109 (step S1408). If there is enough space, the system controller 101 memorizes the fact that the state is the waiting state in which the completion of the decoding operation for a line of code data by the decoder 106 (step S1409).

FIG. 41 is a flow chart of the output control subroutine for monitoring the output of a line of pixel data from the buffer controller 108 to the page printer 110.

The system controller 101 determines whether or not the buffer controller 108 is outputting a line of pixel data (step S1500).

If a line of pixel data has been output, the F/V in an area indicating an area of the line buffer 109 which stores the pixel data output is reset (step S1501) and the print pointer is shifted (step S1502).

Next, the system controller 101 determines whether or not the F/V has been set in the area indicated by the print pointer (step S1503). If the F/V has been set, the system controller 101 memorizes the fact that a line of pixel data is outputted from the area of the line buffer indicated by the print pointer (step S1504).

If the F/V has not been set, the system controller 101 determines whether or not the F/DE has been set (step S1505).

In case where the F/DE has been set, the system controller 101 decides that a page of pixel data has been outputted and outputs the end instruction to the buffer controller 108 (step S1506). Then, the F/SE is set (step S1507).

The above described subroutines shown in FIGS. 40 and 41 are provided for monitoring the operations of the decoder 106 and the buffer controller 108. The decoding operation and the pixel data output operation are carried out by the hardware constructions as shown in FIGS. 8 and 9.

Figure 42:
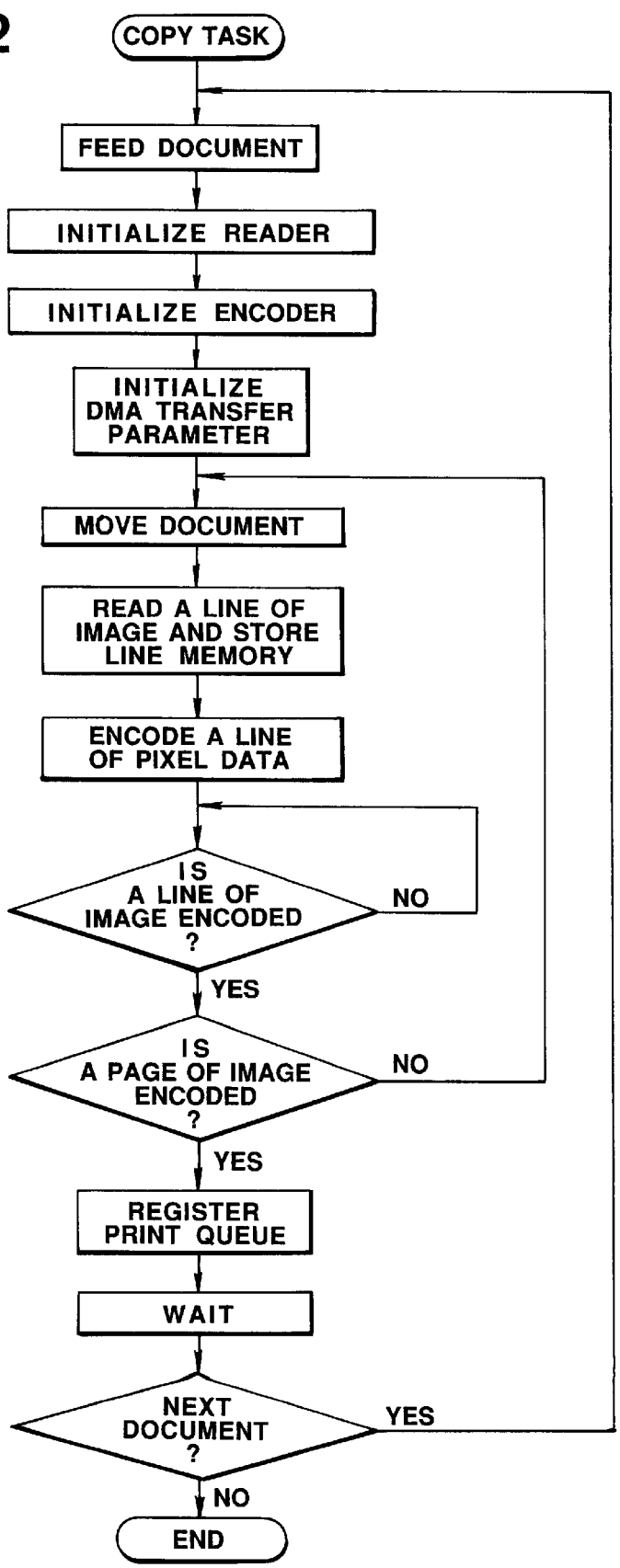
FIG. 42 is a flow chart which shows a copy task.

FIG. 42 is a flow chart of a copy task for performing a copying operation.

In the copy task, the pixel data, which is obtained by reading an original document image by the reader 102 is encoded by the encoder 105 and the encoded pixel data is stored in the image memory III.

When a page of the original document has been read, the page is registered in the print queue in order to print the image on the basis of the encoded pixel data stored in the image memory III.

The copy task shown in FIG. 42 is started in accordance with a copy instruction.

As described above, in the fifth embodiment, a document image to be transmitted or copied, a received image and a report image are encoded and stored in the image memory III, and every image stored in the image memory III is processed in accordance with a common program for printing an image and printed by the page printer 110.

Accordingly, various kinds of images can be efficiently printed without providing a plurality of programs for printing various kinds of images.

The present invention has been explained above with reference to some preferred embodiments, but the present invention is not limited to these embodiments and various modifications and changes are possible.

We claim:

1. Image processing apparatus comprising:
    decoding means for decoding code data to generate pixel data;
    line buffer memory means for storing a plurality of lines of the pixel data from said decoding means; and
    page printing means for printing each line of the pixel data, read from said line buffer memory means, for a page of an image, said page printing means printing each line in a constant time per line regardless of an information content of each line, wherein the decoding means decodes the code data for each line within a respective time shorter than the constant time regardless of the information content of each line.

2. A communication apparatus capable of outputting a report of results of communication, comprising:
    code memory means for storing coded image data to be printed;
    communication management data storage means for storing communication management data;
    encoding means for generating coded management data based on the communication management data stored in said communication management data storage means;
    decoding means for decoding both the coded image data as read out from said code memory means and the coded management data to generate lines of pixel data;
    line buffer memory means for storing a plurality of lines of pixel data from said decoding means;
    page printing means for printing each line of the pixel data, read from said line buffer memory means, for a page of an image, said page printing means printing each line in a constant time per line regardless of an information content of each line, wherein said decoding means decodes the coded data for each line within a respective time shorter than the constant time regardless of the information content of each line; and
    output means for successively outputting the coded management data and the coded image data to said decoding means, said output means combining the coded management data and coded image data for the page of the image.

3. The apparatus according to claim 2, wherein said code memory means further stores the coded management data.

4. The apparatus according to claim 3, wherein the image is a received document image, and said code memory means stores coded image data representing the received document image and coded management data encoded from communication management data for the received document image.

5. The apparatus according to claim 3, wherein said code memory means stores coded image data representing an undelivered document image and coded management data encoded from communication management data for the undelivered document image.

6. The apparatus according to claim 3, wherein said page printing means includes a laser beam printer.

7. The apparatus according to claim 3, wherein said communication apparatus is a facsimile apparatus.

8. An image processing method comprising the steps of:
    decoding code data to generate pixel data;
    storing a plurality of lines of the pixel data from said decoding step in line buffer memory means; and
    printing each line of the pixel data, read from the line buffer memory means, for a page of an image using page printing means, said printing step printing each line in a constant time per line regardless of an information content of each line, wherein the decoding step decodes the code data for each line within a respective time shorter than the constant time regardless of the information content of each line.

9. A communication method capable of outputting a report of results of communication in a communication apparatus, comprising the steps of:
    storing coded image data to be printed in code memory means;
    storing communication management data;
    generating coded management data based on the stored communication management data;
    decoding both the coded image data as read out from the code memory means and the coded management data to generate lines of pixel data;
    storing a plurality of lines of pixel data from said decoding step in line buffer memory means;
    printing each line of the pixel data, read from the line buffer memory means, for a page of an image using page printing means, said printing step printing each line in a constant time per line regardless of an information content of each line, wherein said decoding step decodes the coded data for each line within a respective time shorter than the constant time regardless of the information content of each line; and successively outputting the coded management data and the coded image data to said decoding step, said output step combining the coded management data and coded image data for the page of the image.

10. The method according to claim 9, wherein the code memory means further stores the coded management data.

11. The method according to claim 10, wherein the image is a received document image, and the code memory means stores coded image data representing the received document image and coded management data encoded from communication management data for the received document image.

12. The method according to claim 10, wherein the code memory means stores coded image data representing an undelivered document image and coded management data encoded from communication management data for the undelivered document image.

13. The method according to claim 10, wherein said printing step uses a laser beam printer.

14. The method according to claim 10, wherein the communication apparatus is a facsimile apparatus.

* * * * *

UNITED STATES PATENT AND TRADEMARK OFFICE
CERTIFICATE OF CORRECTION

PATENT NO. : 5,854,888

DATED : December 29, 1998

INVENTOR(S) : YUJI ISHIKAWA ET AL.

It is certified that error appears in the above-identified patent and that said Letters Patent is hereby corrected as shown below:

<u>COLUMN 10</u>

Line 23, "decode 3" should read --decoder 3--.

<u>COLUMN 14</u>

Line 21, "staticaly" should read --statically--.

<u>COLUMN 29</u>

Line 13, "foot" should read --footnote--.

Signed and Sealed this

Sixteenth Day of November, 1999

Attest:

Q. TODD DICKINSON

*Attesting Officer*     *Acting Commissioner of Patents and Trademarks*